US006965400B1

(12) United States Patent
Haba et al.

(10) Patent No.: US 6,965,400 B1
(45) Date of Patent: Nov. 15, 2005

(54) VIDEO INPUT APPARATUS AND IMAGE PICKUP SYSTEM INCLUDING THE APPARATUS

(75) Inventors: Yoshito Haba, Tokyo (JP); Kan Ito, Tokyo (JP); Ichiko Miyasaka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/017,833

(22) Filed: Feb. 3, 1998

(30) Foreign Application Priority Data

| | | |
|---|---|---|
| Feb. 7, 1997 | (JP) | 9-025173 |
| Feb. 19, 1997 | (JP) | 9-035056 |
| Feb. 21, 1997 | (JP) | 9-037709 |
| Feb. 21, 1997 | (JP) | 9-052510 |
| Jun. 17, 1997 | (JP) | 9-160197 |

(51) Int. Cl.[7] ................ H04N 5/228
(52) U.S. Cl. ................ 348/222.1
(58) Field of Search ................ 348/211.99, 72, 348/222.1, 207.1, 138, 222, 211, 212, 143, 537, 211.14, 139, 159

(56) References Cited

U.S. PATENT DOCUMENTS

| | | | | |
|---|---|---|---|---|
| 4,232,339 A | * | 11/1980 | Smiley et al. | 348/222.1 |
| 4,477,164 A | | 10/1984 | Nakai et al. | |
| 4,905,085 A | * | 2/1990 | Faulhaber | 348/537 |
| 5,038,163 A | | 8/1991 | Hirasawa | |
| 5,040,068 A | * | 8/1991 | Parulski et al. | 348/376 |
| 5,434,637 A | | 7/1995 | Ohta | |
| 5,479,206 A | | 12/1995 | Ueno et al. | |
| 5,486,853 A | * | 1/1996 | Baxter et al. | 348/222.1 |
| 5,550,586 A | | 8/1996 | Kudo et al. | |
| 5,561,518 A | | 10/1996 | Parker et al. | |
| 5,572,317 A | | 11/1996 | Parker et al. | |
| 5,627,583 A | * | 5/1997 | Nakamura et al. | 348/72 |
| 5,802,407 A | * | 9/1998 | Wakabayashi et al. | 396/287 |

FOREIGN PATENT DOCUMENTS

| | | |
|---|---|---|
| DE | 40 30 148 A1 | 3/1992 |
| EP | 0 326 009 A1 | 8/1989 |
| EP | 0 369 785 A2 | 5/1990 |
| EP | 0 481 418 A2 | 4/1992 |
| EP | 0 483 822 A2 | 5/1992 |
| EP | 0 497 376 A1 | 8/1992 |

(Continued)

OTHER PUBLICATIONS

Murata et al., "A Totally Digital Camera System Using Digital Triaxial Transmission," *SMPTE Journal*, vol. 105, No. 10, Oct. 1996, pp. 647–652.

JP 06205412 (Abstract).

Imaide et al., "A Multimedia Color Camera Providing Multi–Format Digital Images," *IEEE Transactions on Consumer Electronics*, vol. 39, No. 3 (1993), pp. 467–472.

Japanese Office Action mailed Oct. 8, 2004.

*Primary Examiner*—Aung Moe
*Assistant Examiner*—Rashawn N Tillery
(74) *Attorney, Agent, or Firm*—Morgan & Finnegan, LLP

(57) ABSTRACT

A video input apparatus and image pickup system having a camera section having a camera unit, and a video processing section for processing an image signal from the camera section so as to supply to a host terminal. The camera section outputs a multiplexed signal on which synchronizing signals of an image signal are multiplexed on the image signal, to the video processing section through a cable. The video processing section separates the image signal and the synchronizing signals from the multiplexed signal and processes the image signal to output a video signal. The camera unit in the camera section is exchangeable, and the video processing section detects the type of the camera unit based on the separated synchronizing signals and processes the image signal in accordance with the detected type of the camera unit.

10 Claims, 81 Drawing Sheets

FOREIGN PATENT DOCUMENTS

| | | | |
|---|---|---|---|
| EP | 0 578 183 | A2 | 1/1994 |
| EP | 0-674-435 | A1 | 9/1995 |
| EP | 0 690 616 | A2 | 1/1996 |
| EP | 0 715 453 | A2 | 6/1996 |
| EP | 0 748-132 | A2 | 12/1996 |
| JP | 56-144674 | | 11/1981 |
| JP | 2-220571 | | 9/1990 |
| JP | 2-243066 | | 9/1990 |
| JP | 6-6656 | | 1/1994 |
| JP | 6-121215 | | 4/1994 |
| WO | WO 94/24813 | | 10/1994 |
| WO | WO 96/27979 | | 9/1996 |

* cited by examiner

DISPLAY EXAMPLE OF MONITOR SCREEN FOR OPERATING TRIPOD HEAD SECTION

FIG.34A

Video adapter (ROUND DIN 8 pin)

| Pin# | Signal | I/O |
|---|---|---|
| 1 | RTS | Out |
| 2 | CTS | In |
| 3 | TXD | Out |
| 4 | GND | ··· |
| 5 | RXD | In |
| 6 | GND | ··· |
| 7 | NC | |
| 8 | NC | |
| | | |

FIG.34B

HOST (D-sub 9 pin)

| Pin# | Signal | I/O |
|---|---|---|
| 1 | DCD | In |
| 2 | RXD | In |
| 3 | TXD | Out |
| 4 | DTR | Out |
| 5 | SG | ··· |
| 6 | DSR | In |
| 7 | RTS | Out |
| 8 | CTS | In |
| 9 | RI | In |

FIG.34C

| Video adapter | | | HOST | |
|---|---|---|---|---|
| Pin# | Signal | Direction | Signal | Pin# |
| 1 | RTS | → | CTS | 8 |
| 2 | CTS | ← | RTS | 7 |
| 3 | TXD | → | RXD | 2 |
| 4 | GND | ··· | SG | 5 |
| 5 | RXD | ← | TXD | 3 |
| 6 | GND | ··· | SG | 5 |
| 7 | NC | | DSR | NC |
| 8 | NC | | RI | NC |

FIG.42A

IMAGE PROCESSING SECTION COMMAND

| HOST SECTION→IMAGE PROCESSING SECTION | | IMAGE PROCESSING SECTION→HOST SECTION | |
|---|---|---|---|
| CID bit0-3 | COMMAND NAME | CID bit0-3 | COMMAND NAME |
| | | 03h | ERROR NOTIFICATION |
| 04h | STATE REQUEST | 04h | STATE RESPONSE |
| 10h | WHITE BALANCE REQUEST | 10h | WHITE BALANCE RESPONSE |
| 11h | FADE REQUEST | 11h | FADE RESPONSE |
| 17h | CONTROL MODE SWITCHING REQUEST | 17h | CONTROL MODE SWITCHING RESPONSE |

FIG.42B

CAMERA SECTION COMMAND

| HOST SECTION→IMAGE PROCESSING SECTION | | IMAGE PROCESSING SECTION→HOST SECTION | |
|---|---|---|---|
| CID bit0-3 | COMMAND NAME | CID bit0-3 | COMMAND NAME |
| 03h | | 03h | ERROR NOTIFICATION |
| 04h | STATE REQUEST | 04h | STATE RESPONSE |
| 10h | FOCUS REQUEST | 10h | FOCUS RESPONSE |
| | | 11h | FOCUS LIMIT NOTIFICATION |
| 12h | ZOOM REQUEST | 12h | ZOOM RESPONSE |
| | | 13h | ZOOM NOTIFICATION |
| 14h | EXPOSURE REQUEST | 14h | EXPOSURE RESPONSE |
| 18h | | 18h | SWITCH OPERATION |

FIG.42C

PAN TILTING SECTION COMMAND

| HOST SECTION→IMAGE PROCESSING SECTION | | IMAGE PROCESSING SECTION→HOST SECTION | |
|---|---|---|---|
| CID bit0-3 | COMMAND NAME | CID bit0-3 | COMMAND NAME |
| 03h | | 03h | ERROR NOTIFICATION |
| 04h | STATE REQUEST | 04h | STATE RESPONSE |
| 10h | SETUP REQUEST | 10h | SETUP RESPONSE |
| 11h | HOME POSITION REQUEST | 11h | HOME POSITION RESPONSE |
| 12h | PAN TILTING REQUEST | 12h | PAN TILTING RESPONSE |
| | | 16h | LIMIT NOTIFICATION |
| 17h | REMOTE CONTROLLER CONTROL REQUEST | 17h | REMOTE CONTROLLER CONTROL RESPONSE |
| | | 18h | REMOTE CONTROLLER NOTIFICATION |
| 19h | LED REQUEST | 19h | LED RESPONSE |
| 1Bh | | 1Bh | POWER SUPPLY NOTIFICATION |

FIG.43A

| CODE | TYPE OF ERROR | CODE | TYPE OF ERROR |
|---|---|---|---|
| 00h | V-α I/F CABLE OMISSION | 10h | COMMAND FOR UNCONNECTED MODULE |
| 01h | V-α COMMUNICATION ERROR | 11h | UNDEFINED COMMAND |
| 02h | | 12h | UNDEFINED PARAMETER |
| 03h | M-α COMMUNICATION ERROR | 13h | COMMAND STATE MISMATCH |
| 04h | RS232C COMMUNICATION ERROR | 14h | PARAMETER STATE MISMATCH |
| 05h | | 15h | |
| 06h | | 16h | TIME-OUT |
| 07h | | 17h | |
| 08h | | 18h | |
| 09h | | 19h | |
| 0Fh | | 1Fh | |

FIG.43B

| CODE | ERROR REASON |
|---|---|
| 00h | NACK RECEPTION(TYPE OF NACK IS ADDED TO NEXT OCTET) |
| 01h | ACK RECEPTION TIME-OUT |
| 02h | |
| 03h | PAN TILTING SECTION BUSY |
| 04h | UNRECOVERABLE ERROR |
| 05h | SEQUENCE ERROR |
| 06h | LENGTH ERROR |
| 07h | BUFFER BUSY |
| 08h | |

FIG.44

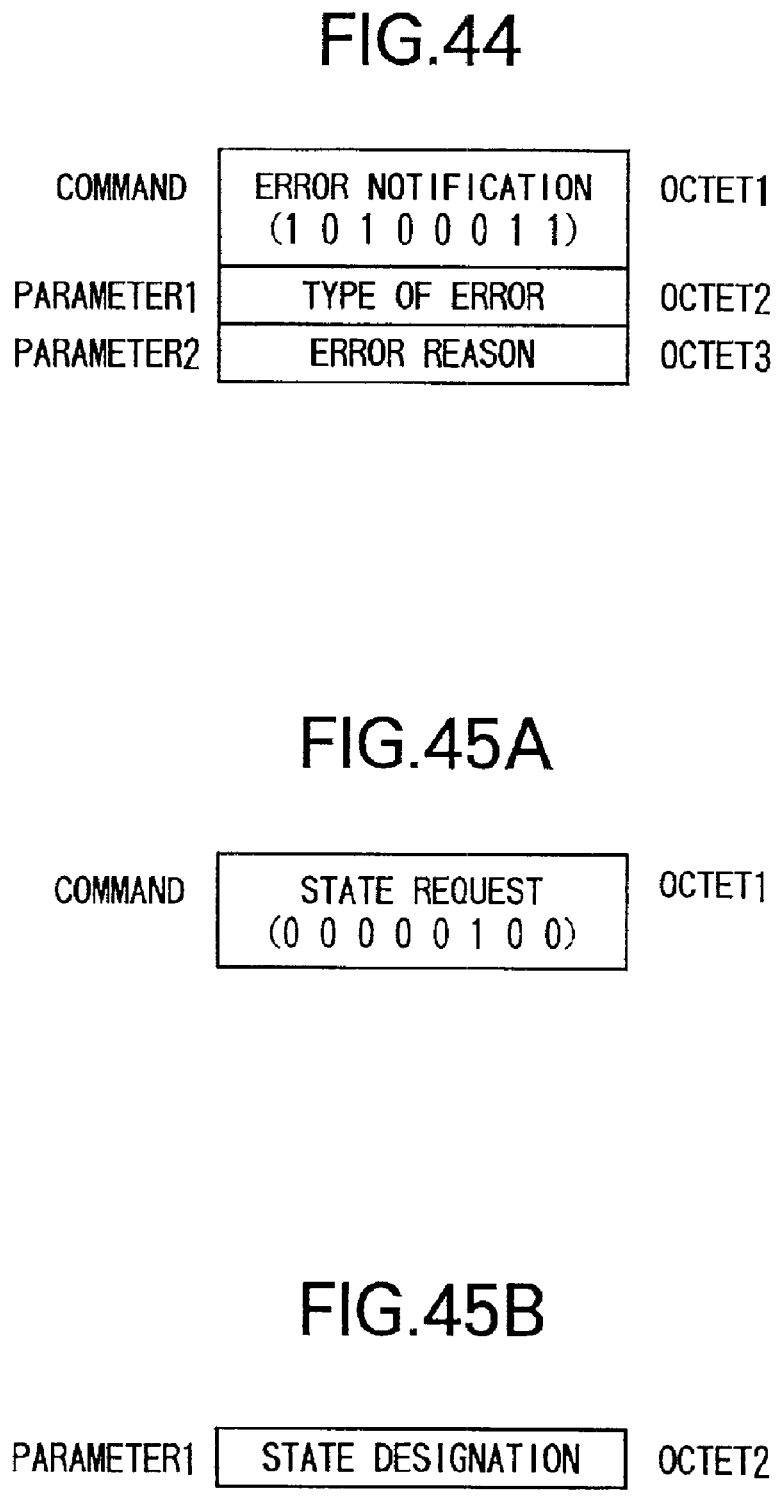

| | | |
|---|---|---|
| COMMAND | ERROR NOTIFICATION (1 0 1 0 0 0 1 1) | OCTET1 |
| PARAMETER1 | TYPE OF ERROR | OCTET2 |
| PARAMETER2 | ERROR REASON | OCTET3 |

FIG.45A

| | | |
|---|---|---|
| COMMAND | STATE REQUEST (0 0 0 0 0 1 0 0) | OCTET1 |

FIG.45B

| | | |
|---|---|---|
| PARAMETER1 | STATE DESIGNATION | OCTET2 |

FIG.46

| | | |
|---|---|---|
| COMMAND | STATE RESPONSE (1 0 0 0 0 1 0 0) | OCTET1 |
| PARAMETER | SYSTEM (00h) | OCTET2 |
| | PRODUCT CODE | OCTET4 |
| | PRODUCT VERSION | OCTET5 |

FIG.47

| | | |
|---|---|---|
| COMMAND | STATE RESPONSE (1 0 0 0 0 1 0 0) | OCTET1 |
| PARAMETER | WHITE BALANCE (01h) | OCTET2 |
| | R GAIN SETTING | OCTET4 |
| | B GAIN SETTING | OCTET5 |

FIG.48

| | | |
|---|---|---|
| COMMAND | STATE RESPONSE (1 0 0 0 0 1 0 0) | OCTET1 |
| PARAMETER | FADE (02h) | OCTET2 |
| | SPEED(High) | OCTET3 |
| | SPEED(Low) | OCTET4 |
| | FADE GAIN | OCTET5 |
| | FADE LEVEL | OCTET6 |

FIG.49A

| | | |
|---|---|---|
| COMMAND | STATE RESPONSE (1 0 0 0 0 1 0 0) | OCTET1 |

FIG.49B

| | | |
|---|---|---|
| PARAMETER | SYSTEM (03h) | OCTET2 |
| | SET STATE | OCTET3 |

FIG.50A

| | | |
|---|---|---|
| COMMAND | WHITE BALANCE REQUEST/RESPONSE (x r 0 1 0 0 0 0) | OCTET1 |
| PARAMETER | OPERATION | OCTET2 |
| | PARAMETER1 | OCTET3 |
| | PARAMETER2 | OCTET4 |
| | PARAMETER3 | OCTET5 |

FIG.50B

| OPERATION | | PARAMETER1 | | PARAMETER2 | | PARAMETER3 | |
|---|---|---|---|---|---|---|---|
| CODE | MEANING | CODE | MEANING | CODE | MEANING | CODE | MEANING |
| 01h | WHITE BALANCE MODE DESIGNATION | 00h | AUTO MODE | | | | |
| | | 01h | CORRECTION MODE | | | | |
| | | 02h | MANUAL MODE | | | | |
| | | 03h | HIGH-SPEED AUTO MODE | | | | |
| 02h | CORRECTION DESIGNATION | xxh | 00 (RED) TO FF (BLUE) | | | | |
| 03h | MANUAL | 01h | Read | | | | |
| | | 02h | Write | xxh | GAIN OF R | xxh | GAIN OF B |

FIG.52A

| | | |
|---|---|---|
| COMMAND | FOCUS REQUEST/RESPONSE (x r 0 1 0 0 0 0) | OCTET1 |
| PARAMETER | OPERATION | OCTET2 |
| | PARAMETER1 | OCTET3 |
| | PARAMETER2 | OCTET4 |
| | PARAMETER3 | OCTET5 |
| | PARAMETER4 | OCTET6 |

FIG.52B

| OPERATION | | PARAMETER1 | | PARAMETER2 AND 3 | | PARAMETER4 AND 5 | |
|---|---|---|---|---|---|---|---|
| CODE | MEANING | CODE | MEANING | CODE | MEANING | CODE | MEANING |
| 01h | FOCUS MODE DESIGNATION | 00h | AF MODE | | | | |
| | | 01h | MF MODE | | | | |
| 02h | MF START | 00h | FAR | | | | |
| | | 01h | NEAR | | | | |
| 03h | POSITION DESIGNATION | 01h | Read | xxxxh | POSITON(RESPONSE) | | |
| | | 02h | Write | xxxxh | POSITION | | |
| | | 03h | Limit read | xxxxh | Min POSITION(RESPONSE) | xxxxh | Max POSITION |
| 04h | MF STOP | | | | | | |
| 05h | SPEED | 01h | Read | xxh | SET VALUE(RESPONSE) | | |
| | | 02h | Write | xxh | SET VALUE | | |
| 06h | ONE PUSH AF | | | | | | |

FIG.55A

| | | |
|---|---|---|
| COMMAND | ZOOM<br>REQUEST/RESPONSE<br>(x r 0 1 0 0 1 0) | OCTET1 |
| PARAMETER | OPERATION | OCTET2 |
| | PARAMETER1 | OCTET3 |
| | PARAMETER2 | OCTET4 |
| | PARAMETER3 | OCTET5 |

FIG.55B

| OPERATION | | PARAMETER1 | | PARAMETER2 AND 3 | |
|---|---|---|---|---|---|
| CODE | MEANING | CODE | MEANING | CODE | MEANING |
| 01h | START | 00h | TELE | | |
| | | 01h | WIDE | | |
| 02h | POSITION DESIGNATION | 01h | Read | xxxxh | POSITON(RESPONSE) |
| | | 02h | Move | xxxxh | POSITION |
| | | 03h | Max read | xxxxh | MAX VALUE(RESPONSE) |
| 03h | STOP | | | | |
| 04h | SPEED | 01h | Read | xxh | SET VALUE(RESPONSE) |
| | | 02h | Write | xxh | SET VALUE |

| | | |
|---|---|---|
| COMMAND | ZOOM LIMIT NOTIFICATION (1 0 1 1 0 0 1 1) | OCTET1 |
| PARAMETER | POSITION | OCTET2 |
| PARAMETER | POSITION | OCTET3 |

FIG.58A

| | | |
|---|---|---|
| COMMAND | EXPOSURE REQUEST/RESPONSE (x r 0 1 0 1 0 0) | OCTET1 |
| PARAMETER | OPERATION | OCTET2 |
| | PARAMETER1 | OCTET3 |
| | PARAMETER2 | OCTET4 |
| | PARAMETER3 | OCTET5 |

FIG.58B

| OPERATION | | PARAMETER1 | | PARAMETER2 | |
|---|---|---|---|---|---|
| CODE | MEANING | CODE | MEANING | CODE | MEANING |
| 01h | EXPOSURE MODE DESIGNATION | 00h | AE MODE | | |
| | | 01h | MANUAL MODE | | |
| 02h | TYPE-OF-AE DESIGNATION | 00h | FULL AUTOMATIC AE | | |
| | | 01h | SHUTTER SPEED PRIORITY AE | xxh | SHUTTER SPEED |
| | | 02h | IRIS PRIORITY AE | xxh | IRIS VALUE |
| 03h | AE LOCKING | 00h | OFF | | |
| | | 01h | ON | | |
| 04h | AE TARGET VALUE CORRECTION | xxh | SET VALUE | | |
| 06h | SHUTTER SPEED | 00h | CONVERSION MODE | xxh | SHUTTER SPEED |
| 07h | AGC GAIN | 00h | CONVERSION MODE | xxh | AGC |
| 08h | IRIS | 00h | CONVERSION MODE | xxh | IRIS |

FIG.59

| Hex | 1/sec | Hex | 1/sec | Hex | 1/sec | Hex | 1/sec | Hex | 1/sec |
|---|---|---|---|---|---|---|---|---|---|
| 00 | 60.4 | 1E | 115 | 3C | 214 | 5A | 362 | 78 | 1175 |
| 01 | 61.4 | 1F | 118 | 3D | 217 | 5B | 371 | 79 | 1269 |
| 02 | 62.8 | 20 | 120 | 3E | 220 | 5C | 380 | 7A | 1381 |
| 03 | 64.1 | 21 | 123 | 3F | 223 | 5D | 389 | 7B | 1514 |
| 04 | 65.4 | 22 | 125 | 40 | 226 | 5E | 399 | 7C | 1675 |
| 05 | 67.1 | 23 | 128 | 41 | 230 | 5F | 409 | 7D | 1874 |
| 06 | 68.6 | 24 | 131 | 42 | 233 | 60 | 420 | 7E | 2128 |
| 07 | 70.1 | 25 | 134 | 43 | 237 | 61 | 432 | 7F | 2460 |
| 08 | 71.4 | 26 | 137 | 44 | 240 | 62 | 444 | 80 | 2916 |
| 09 | 73.0 | 27 | 140 | 45 | 244 | 63 | 457 | 81 | 3579 |
| 0A | 74.8 | 28 | 143 | 46 | 248 | 64 | 471 | 82 | 4633 |
| 0B | 76.2 | 29 | 146 | 47 | 252 | 65 | 485 | 83 | 6565 |
| 0C | 78.1 | 2A | 149 | 48 | 256 | 66 | 501 | 84 | 11261 |
| 0D | 79.7 | 2B | 153 | 49 | 260 | 67 | 517 | | |
| 0E | 81.4 | 2C | 156 | 4A | 265 | 68 | 535 | | |
| 0F | 83.1 | 2D | 159 | 4B | 269 | 69 | 554 | | |
| 10 | 85.3 | 2E | 163 | 4C | 274 | 6A | 574 | | |
| 11 | 87.2 | 2F | 166 | 4D | 279 | 6B | 596 | | |
| 12 | 88.7 | 30 | 170 | 4E | 284 | 6C | 619 | | |
| 13 | 90.7 | 31 | 174 | 4F | 289 | 6D | 645 | | |
| 14 | 92.9 | 32 | 178 | 50 | 294 | 6E | 672 | | |
| 15 | 95.1 | 33 | 182 | 51 | 300 | 6F | 702 | | |
| 16 | 97.5 | 34 | 186 | 52 | 306 | 70 | 735 | | |
| 17 | 100 | 35 | 191 | 53 | 312 | 71 | 771 | | |
| 18 | 101 | 36 | 195 | 54 | 318 | 72 | 811 | | |
| 19 | 103 | 37 | 198 | 55 | 325 | 73 | 855 | | |
| 1A | 106 | 38 | 200 | 56 | 332 | 74 | 904 | | |
| 1B | 108 | 39 | 203 | 57 | 339 | 75 | 960 | | |
| 1C | 110 | 3A | 208 | 58 | 346 | 76 | 1022 | | |
| 1D | 112 | 3B | 211 | 59 | 354 | 77 | 1093 | | |

FIG.60

| Hex | dB | Hex | dB | Hex | dB | Hex | dB | Hex | dB |
|---|---|---|---|---|---|---|---|---|---|
| 03 | 0. 00 | 21 | 5. 08 | 3F | 10. 1 | 5D | 15. 2 | 7B | 20. 3 |
| 04 | 0. 16 | 22 | 5. 25 | 40 | 10. 3 | 5E | 15. 4 | 7C | 20. 4 |
| 05 | 0. 33 | 23 | 5. 41 | 41 | 10. 5 | 5F | 15. 5 | 7D | 20. 6 |
| 06 | 0. 50 | 24 | 5. 58 | 42 | 10. 6 | 60 | 15. 7 | 7E | 20. 8 |
| 07 | 0. 67 | 25 | 5. 75 | 43 | 10. 8 | 61 | 15. 9 | 7F | 21. 0 |
| 08 | 0. 84 | 26 | 5. 92 | 44 | 11. 0 | 62 | 16. 0 | | |
| 09 | 1. 01 | 27 | 6. 09 | 45 | 11. 1 | 63 | 16. 2 | | |
| 0A | 1. 18 | 28 | 6. 26 | 46 | 11. 3 | 64 | 16. 4 | | |
| 0B | 1. 35 | 29 | 6. 43 | 47 | 11. 5 | 65 | 16. 5 | | |
| 0C | 1. 52 | 2A | 6. 60 | 48 | 11. 6 | 66 | 16. 7 | | |
| 0D | 1. 69 | 2B | 6. 77 | 49 | 11. 8 | 67 | 16. 9 | | |
| 0E | 1. 86 | 2C | 6. 94 | 4A | 12. 0 | 68 | 17. 1 | | |
| 0F | 2. 03 | 2D | 7. 11 | 4B | 12. 1 | 69 | 17. 2 | | |
| 10 | 2. 20 | 2E | 7. 28 | 4C | 12. 3 | 6A | 17. 4 | | |
| 11 | 2. 37 | 2F | 7. 45 | 4D | 12. 5 | 6B | 17. 6 | | |
| 12 | 2. 54 | 30 | 7. 62 | 4E | 12. 7 | 6C | 17. 7 | | |
| 13 | 2. 70 | 31 | 7. 79 | 4F | 12. 8 | 6D | 17. 9 | | |
| 14 | 2. 87 | 32 | 7. 95 | 50 | 13. 0 | 6E | 18. 1 | | |
| 15 | 3. 04 | 33 | 8. 12 | 51 | 13. 2 | 6F | 18. 2 | | |
| 16 | 3. 21 | 34 | 8. 29 | 52 | 13. 3 | 70 | 18. 4 | | |
| 17 | 3. 38 | 35 | 8. 46 | 53 | 13. 5 | 71 | 18. 6 | | |
| 18 | 3. 55 | 36 | 8. 63 | 54 | 13. 7 | 72 | 18. 7 | | |
| 19 | 3. 72 | 37 | 8. 80 | 55 | 13. 8 | 73 | 18. 9 | | |
| 1A | 3. 89 | 38 | 8. 97 | 56 | 14. 0 | 74 | 19. 1 | | |
| 1B | 4. 06 | 39 | 9. 14 | 57 | 14. 2 | 75 | 19. 3 | | |
| 1C | 4. 23 | 3A | 9. 31 | 58 | 14. 3 | 76 | 19. 4 | | |
| 1D | 4. 40 | 3B | 9. 48 | 59 | 14. 5 | 77 | 19. 6 | | |
| 1E | 4. 57 | 3C | 9. 65 | 5A | 14. 7 | 78 | 19. 8 | | |
| 1F | 4. 74 | 3D | 9. 82 | 5B | 14. 9 | 79 | 19. 9 | | |
| 20 | 4. 91 | 3E | 9. 99 | 5C | 15. 0 | 7A | 20. 1 | | |

FIG.61

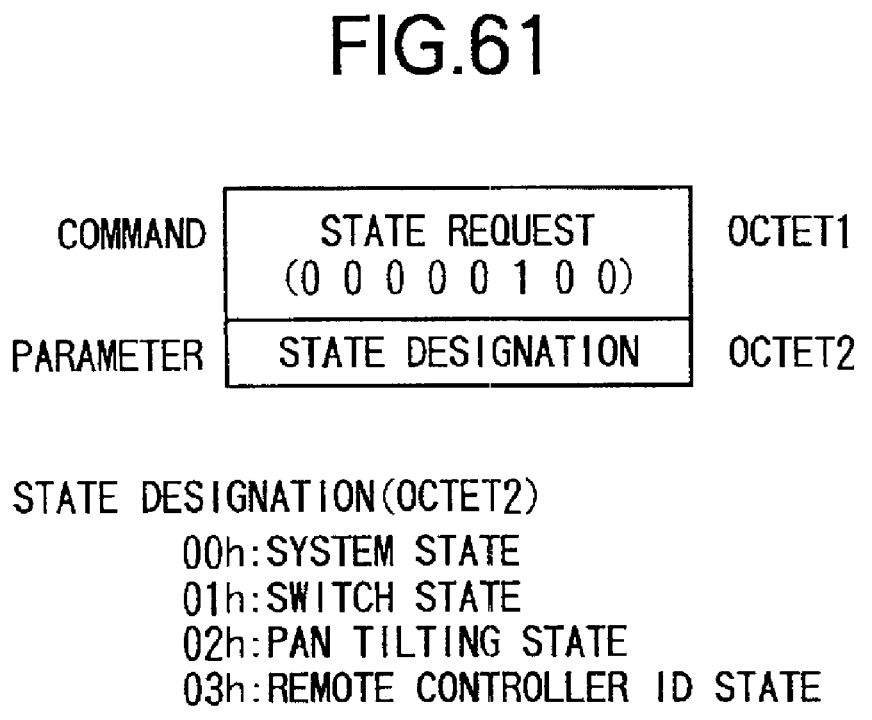

| | | |
|---|---|---|
| COMMAND | STATE REQUEST (0 0 0 0 0 1 0 0) | OCTET1 |
| PARAMETER | STATE DESIGNATION | OCTET2 |

STATE DESIGNATION(OCTET2)

00h:SYSTEM STATE
01h:SWITCH STATE
02h:PAN TILTING STATE
03h:REMOTE CONTROLLER ID STATE

FIG.62A

| | | |
|---|---|---|
| SYSTEM COMMAND | STATE RESPONSE (1 0 0 0 0 1 0 0) | OCTET1 |
| PARAMETER | SYSTEM (00h) | OCTET2 |
| | PRODUCT CODE | OCTET3 |
| | PRODUCT VERSION | OCTET4 |

FIG.62B

| | | |
|---|---|---|
| SWITCH COMMAND | STATE RESPONSE (1 0 0 0 0 1 0 0) | OCTET1 |
| PARAMETER | SWITCH (01h) | OCTET2 |
| | SWITCH NUMBER | OCTET3 |

FIG.62C

| | | |
|---|---|---|
| PAN TILTER COMMAND | STATE RESPONSE (1 0 0 0 0 1 0 0) | OCTET1 |
| PARAMETER | PAN TILTING (02h) | OCTET2 |
| | PAN SPEED | OCTET3 |
| | PAN POSITION(High) | OCTET4 |
| | PAN POSITION(Low) | OCTET5 |
| | TILT SPEED | OCTET6 |
| | TILT POSITION(High) | OCTET7 |
| | TILT POSITION(Low) | OCTET8 |

FIG.62D

| | | |
|---|---|---|
| REMOTE CONTROLLER ID COMMAND | STATE RESPONSE (1 0 0 0 0 1 0 0) | OCTET1 |
| PARAMETER | REMOTE CONTROLLER (03h) | OCTET2 |
| | REMOTE CONTROLLER ID | OCTET3 |

FIG.63

| | | |
|---|---|---|
| COMMAND | SETUP RESPONSE (1 r 0 1 0 0 0 0) | OCTET1 |
| PARAMETER | PAN POSITION High | OCTET2 |
| | PAN POSITION Low | OCTET3 |
| | TILT POSITION High | OCTET4 |
| | TILT POSITION Low | OCTET5 |

FIG.64A

| | | |
|---|---|---|
| COMMAND | PAN TILTING REQUEST/RESPONSE (x r 0 1 0 0 1 0) | OCTET1 |
| PARAMETER | OPERATION | OCTET2 |
| | PARAMETER1 | OCTET3 |
| | PARAMETER2 | OCTET4 |

FIG.64B

| OPERATION | | PARAMETER1 | | PARAMETER2 | | PARAMETER3 | | PARAMETER4 | | PARAMETER5 | |
|---|---|---|---|---|---|---|---|---|---|---|---|
| CODE | MEANING | CODE | MEANING | CODE | MEANING | CODE | MEANING | CODE | MEANING | CODE | MEANING |
| 01h | START | 00h | PAN IMMOBILE | 00h | TILT IMMOBILE | | | | | | |
| | | | | 01h | TILT UPWARD | | | | | | |
| | | | | 02h | TILT DOWNWARD | | | | | | |
| | | 01h | PAN RIGHTWARD | 00h | TILT IMMOBILE | | | | | | |
| | | | | 01h | TILT UPWARD | | | | | | |
| | | | | 02h | TILT DOWNWARD | | | | | | |
| | | 02h | PAN LEFTWARD | 00h | TILT IMMOBILE | | | | | | |
| | | | | 01h | TILT UPWARD | | | | | | |
| | | | | 02h | TILT DOWNWARD | | | | | | |
| 02h | STOP | | | | | | | | | | |
| 03h | SPEED | 01h | Read | | | | | | | | |
| | | 02h | Write | xxh | PAN SPEED | xxh | TILT SPEED | | | | |
| 04h | RELATIVE POSITION DESIGNATION | 01h | Read | | | | | | | | |
| | | 02h | Write | xxh | PAN High | xxh | PAN Low | xxh | TILT High | xxh | TILT Low |
| 05h | ABSOLUTE POSITION DESIGNATION | 01h | Read | | | | | | | | |
| | | 02h | Write | xxh | PAN High | xxh | PAN Low | xxh | TILT High | xxh | TILT Low |

FIG.66A

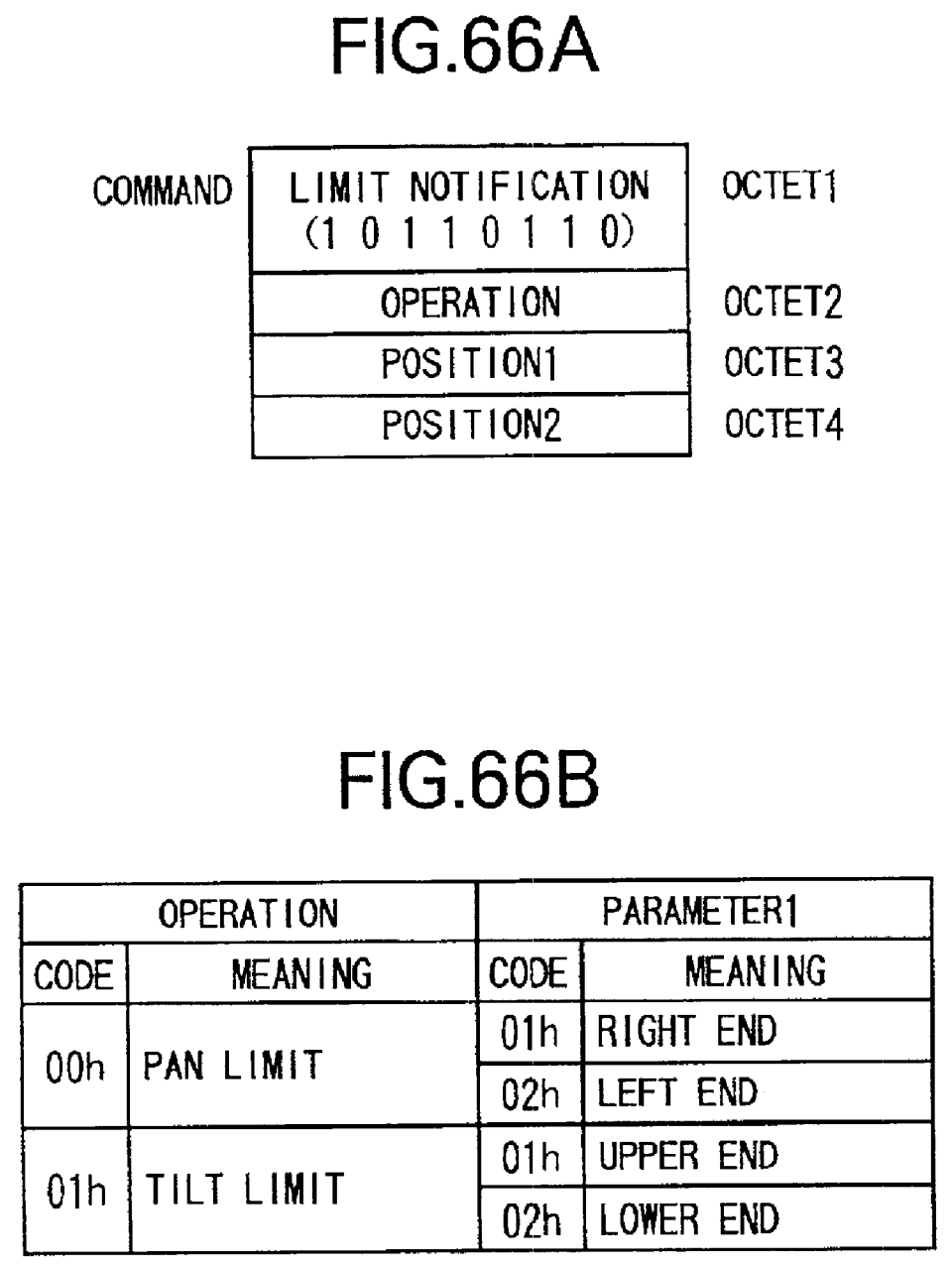

| | | |
|---|---|---|
| COMMAND | LIMIT NOTIFICATION (1 0 1 1 0 1 1 0) | OCTET1 |
| | OPERATION | OCTET2 |
| | POSITION1 | OCTET3 |
| | POSITION2 | OCTET4 |

FIG.66B

| OPERATION | | PARAMETER1 | |
|---|---|---|---|
| CODE | MEANING | CODE | MEANING |
| 00h | PAN LIMIT | 01h | RIGHT END |
| | | 02h | LEFT END |
| 01h | TILT LIMIT | 01h | UPPER END |
| | | 02h | LOWER END |

FIG.67A

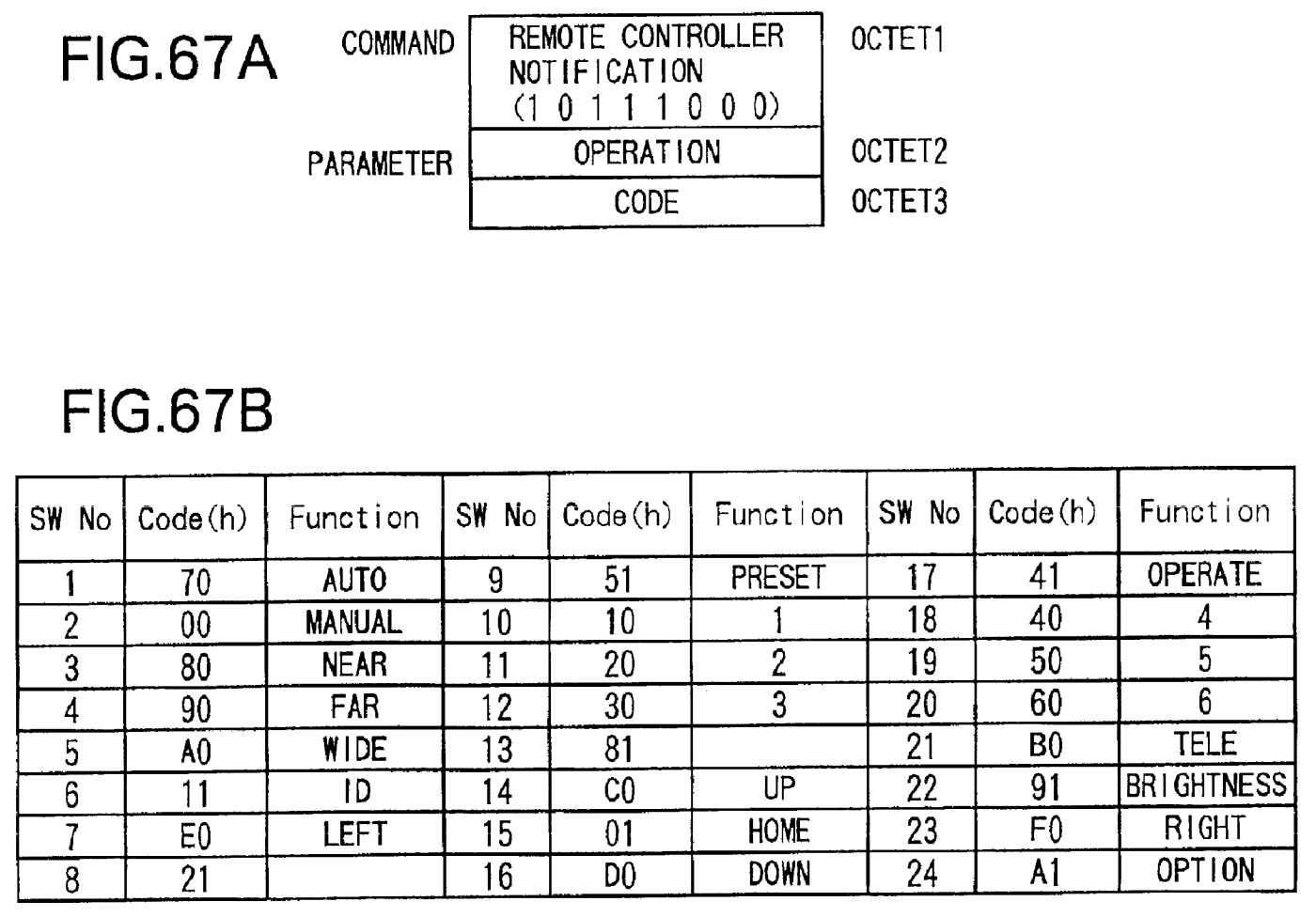

| | | |
|---|---|---|
| COMMAND | REMOTE CONTROLLER NOTIFICATION (1 0 1 1 1 0 0 0) | OCTET1 |
| PARAMETER | OPERATION | OCTET2 |
| | CODE | OCTET3 |

FIG.67B

| SW No | Code(h) | Function | SW No | Code(h) | Function | SW No | Code(h) | Function |
|---|---|---|---|---|---|---|---|---|
| 1 | 70 | AUTO | 9 | 51 | PRESET | 17 | 41 | OPERATE |
| 2 | 00 | MANUAL | 10 | 10 | 1 | 18 | 40 | 4 |
| 3 | 80 | NEAR | 11 | 20 | 2 | 19 | 50 | 5 |
| 4 | 90 | FAR | 12 | 30 | 3 | 20 | 60 | 6 |
| 5 | A0 | WIDE | 13 | 81 | | 21 | B0 | TELE |
| 6 | 11 | ID | 14 | C0 | UP | 22 | 91 | BRIGHTNESS |
| 7 | E0 | LEFT | 15 | 01 | HOME | 23 | F0 | RIGHT |
| 8 | 21 | | 16 | D0 | DOWN | 24 | A1 | OPTION |

FIG.68A

| | | |
|---|---|---|
| COMMAND | LED REQUEST/RESPONSE (x r 0 1 1 0 0 1) | OCTET1 |
| PARAMETER | OPERATION | OCTET2 |
| | LED DESIGNATION | OCTET3 |
| | FLICKER CYCLE | OCTET3 |

FIG.68B

| OPERATION | | PARAMETER1 | | PARAMETER2 | |
|---|---|---|---|---|---|
| CODE | MEANING | CODE | MEANING | CODE | MEANING |
| 00h | DEFAULT OPERATION | 01h | GREEN | | |
| | | 02h | RED | | |
| 01h | FORCED TURN-ON | 01h | GREEN | | |
| | | 02h | RED | | |
| 02h | FORCED TURN-OFF | 01h | GREEN | | |
| | | 02h | RED | | |
| 03h | FORCED FLICKER | 01h | GREEN | xxh | FLICKER CYCLE |
| | | 02h | RED | xxh | FLICKER CYCLE |

FIG.69

| VALUE(h) | CYCLE(sec) | VALUE(h) | CYCLE(sec) |
|---|---|---|---|
| 00 | 1 | 80 | 0. 8 |
| 01 | 1. 5 | 81 | 0. 6 |
| 02 | 2 | 82 | 0. 5 |
| 03 | 3 | 83 | 0. 4 |
| 04 | 4 | 84 | 0. 3 |
| 05 | 5 | 85 | 0. 2 |
| 06 | 6 | 86 | 0. 1 |

VIDEO INPUT APPARATUS AND IMAGE PICKUP SYSTEM INCLUDING THE APPARATUS

BACKGROUND OF THE INVENTION

The present invention relates to an image pickup system for transmitting image information, particularly to a video input apparatus and an image pickup system including the video input apparatus preferably used to a video telephone conference system for transferring images, voices and other multimedia information between remote points through a general public telephone network.

A conventional image pickup apparatus is constituted so as to mount a zooming or auto-focusing camera unit on a pan tilting head such as a tripod head, process a picked-up video signal by an image processing unit set in the camera unit, output the processed video signal in accordance with an NTSC signal format, and display the signal on a monitor or transmit the signal to a host terminal of a personal computer or the like.

Therefore, the above conventional pickup apparatus has problems that the entire camera unit including the image processing unit must be replaced in order to improve, for example, the resolution of a video signal and moreover, and the entire apparatus including the camera unit must be replaced in order to change the format of a video signal to be output from the NTSC format to, for example, the interface of IEEE 1394.

Moreover, because a computer and its communication art have advanced in recent years, the foundation for handling an image on a computer has spread and a video camera has been used as its main video input means. For example, in the case of a video telephone conference system, documents such as a material made by a speaker or used in the conference are input and transmitted to a remote other party.

Furthermore, because the number of video telephone conference systems using an ISDN line has increased, the structure and the terminal of an AV (Audio Visual) system of N-ISDN is recommended as ITU-T H. 320. Furthermore, by spreading the network of ISDN up to general public telephone lines, recommendation of a multimedia terminal for a low-bit-rate video telephone is advanced as H. 324.

A video camera for capturing an image is typically listed as a multimedia terminal of a video telephone conference system or a component of the system. Some of the video cameras are respectively mounted on a tripod head which can be rotated in the horizontal or vertical direction in accordance with an external control signal. Moreover, there is an integral-type video camera constituted by integrating the video camera with the tripod head.

By using the video camera and tripod head, a video telephone conference system makes it possible to control a remote video camera such as the video camera of a station on the other end of the line from a remote place. Moreover, some of the camera systems used for video telephone conference systems can be respectively divided into a camera head section including a CCD, TG (timing generator), AGC (auto gain control) circuit and a signal processing board section including an A-D (analog-to-digital) converter, signal processing section, and image and voice CODEC (encoder-decoder) section. By using the above type of camera system, it is possible to directly CODEC-process a digital image signal without converting the image signal into a video signal and moreover realize various camera systems by being available the signal processing board section in common and replacing only the camera head section.

Moreover, by making a tripod head section separable, it is possible to constitute various types of camera systems in accordance with the type of a CCD, difference of the single focus point or zoom of a lens, or presence or absence of a tripod head section. FIG. 76 shows a full view of a camera system in which a camera head ection 5100 mounting a zoom lens with a tripod head ection 5200.

SUMMARY OF THE INVENTION

In the case of the above camera system, to operate the tripod head section completely in accordance with the full spec of the original function of the tripod head section, more power is required due to the power consumption of a motor for driving the tripod head section. Even if the tripod head section is operated by supplying power from the host terminal of a PC (personal computer) or the like, it is impossible to operate the tripod head section completely in accordance with the full spec because it is impossible to supply a lot of power.

Moreover, in the case of the above camera system, to update the versions of the control information of the camera head section, tripod head section, and signal processing section, it has been necessary so far to separate the sections from each other and independently rewrite the control information of each section. Moreover, optimum control information has not been always obtained depending on the combination of the versions of the camera head section, tripod head section, and signal processing section and thus, a malfunction may have occurred.

Furthermore, some video input units generate the image pickup signal of an object and apply the video processing to the image pickup signal in accordance with a video processing parameter corresponding to an image pickup characteristic to generate a video signal.

A specific example of the video input unit is described below by referring to FIG. 77. FIG. 77 is a block diagram showing the structure of a conventional video input unit.

As shown in FIG. 77, the video input unit is provided with a video input unit body (hereafter referred to as body) 5400 to which a monitor 5500 for displaying a video is connected.

The body 5400 has a lens 5101 comprising an optical lens group provided with a focus adjustment mechanism and a zoom mechanism and an optical image captured by the lens 5101 is focused on the image pickup plane of a CCD (charge coupled device) 5103 through an iris 5102 for adjusting an amount of an incident light of the optical image.

The CCD 5103 converts the optical image focused on the image pickup plane into a corresponding electric signal by means of photoelectric conversion and outputs the electric signal. Operations of the CCD 5103 such as electric-charge storing operation, reading operation, and resetting operation are controlled by an image pickup device driving circuit (hereafter referred to as TG) 5105. A TG 5105 executes the electronic shutter function for changing shutter speeds by controlling the CCD 5103 and moreover, generates and outputs a video synchronizing signal 5112. The TG 5105 controls the CCD 5103 in accordance with the designation by a system control section 5401.

An electric signal output from the CCD 5103 is supplied to a sample-and-hold AGC circuit (hereafter referred to as S/H AGC) 5104. The S/H AGC 5104 applies the sample-and-hold processing to the electric signal, adjusts the gain of the electric signal, and outputs an analog image pickup signal 5114. The sample-and-hold processing reduces noises of stored electric charges. Operations of the S/H AGC 5104 are controlled by the system control section 5401.

The analog image pickup signal 5114 is input to a signal processing circuit 5106 and the signal processing circuit 5106 performs the video processing for converting the analog image pickup signal 5114 into a digital video signal according to a predetermined specification. The video processing controls white balance, adjusts color tone, and generates the above digital video signal according to the predetermined specification by calculating the exposure (brightness) data, white balance data, focus data of an object in accordance with the analog image pickup signal 5114 and adjusting these data values in accordance with their corresponding video processing parameters.

Each video processing parameter is set correspondingly to an image pickup characteristic determined in accordance with each structure of the above image pickup section and used to absorb the difference between image pickup characteristics caused by the fluctuation of the performance of the CCD 5103 constituting the image pickup section. The value of each video processing parameter is set at the time of shipping from a factory in accordance with the characteristic of the image pickup section connected to the body 5400 and each set value is written in an EEPROM in the system control section 5401. The signal processing circuit 5106 properly reads a video processing parameter from the EEPROM in the system control section 5401.

The signal processing circuit 5106 generates an interrupt signal for transmitting the exposure data, white balance data, and focus data of an object to the system control section 5401 synchronously with a vertical synchronizing signal. When the system control section 5401 recognizes the interrupt signal, it captures each data value from the signal processing circuit 5106 according to necessity and writes the captured data in a RAM in the system control section 5401.

A digital video signal output from the signal processing circuit 5106 is input to an encoder 5204. The encoder 5204 performs the processing for converting the digital video signal into a multiplexed composite signal and the composite signal is output to a connector 5210.

The monitor 5500 connects with the connector 5210 through a cable 5501 and displays a digital video signal transmitted from the video input unit through the cable 5501.

In the case of the above conventional video input unit, however, the value of each video processing parameter set in accordance with the characteristic of an image pickup section connected to the body 5400 is normally written in an EEPROM in the system control section 5401 when the video input unit is shipped from a factory. Therefore, to replace the image pickup section previously connected to the body 5400 with another image pickup section, it is necessary to set the value of each video processing parameter in accordance with the characteristic of the new image pickup section at the factory again. However, the above operation requires a lot of time and it is troublesome.

Moreover, when the above image pickup section is constituted so as to be separable from the body, a user can optionally combine the image pickup section with the body. However, the user must adjust the newly purchased image pickup section and moreover, he or she cannot determine whether or not the additionally purchased image pickup section has been already adjusted. Furthermore, when a plurality of sets of image pickup section and the body are present, it is impossible to determine whether set of an image pickup section and a body is adjusted. Therefore, when the additionally purchased image pickup section is not adjusted, signal processing is performed in accordance with default adjustment data and as a result, a disadvantage occurs that a video having an undesirable color reproducibility is output.

SUMMARY OF THE INVENTION

It is an object of the present invention to provide a video input apparatus and an image pickup system including the apparatus solving the above conventional problems, particularly the problem occurs deviation of synchronization when constituting cameras having different sensors with numbers of pixels such that image frames are interchangeable.

The present invention is made by noticing the above problems and its another object is to provide an image pickup system capable of properly operating a video input apparatus in accordance with the situation in a video telephone conference system or the like.

It is still another object of the present invention to provide a video input apparatus making it possible to easily obtain a video having a desirable color reproducibility even if combining any image pickup device with a body.

It is still another object of the present invention to provide a video input apparatus capable of realizing a function corresponding to a requested function by dividing the structure of an image pickup apparatus into units respectively independent for each function and connecting the units each other so as to be replaceable, and an image pickup system including the apparatus.

It is still another object of the present invention to provide a video input apparatus capable of controlling the operation of each divided unit by individually transmitting an operation command to each unit in order to realize the function for each divided unit, and an image pickup system including the video input apparatus.

It is still another object of the present invention to provide a video input apparatus of controlling operations of the apparatus by a connected host terminal and making the monitoring of each divided unit unnecessary.

It is still another object of the present invention to provide a video input apparatus capable of automatically detecting the type of a connected image pickup apparatus and setting a processing mode corresponding to the type of the image pickup apparatus, and an image pickup system using the apparatus.

It is still another object of the present invention to provide an image pickup system for performing an operation corresponding to supplied power.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principle of the invention.

FIG. 23 is a flow chart showing operations of the video input unit of the ninth embodiment after a power supply is turned on;

FIGS. 34A to 34C are illustrations showing pin arrangements of a connector for connecting the host terminal with the image processing section of the tenth embodiment;

FIGS. 42A to 42C are illustrations for explaining various commands of the image pickup apparatus of the tenth embodiment, in which FIG. 42A shows image-processing-section commands, FIG. 42B shows camera-section commands, and FIG. 42C shows pan-tilting-section command;

FIG. 43A is an illustration showing types of errors of the image pickup apparatus of the tenth embodiment and FIG. 43B is an illustration for explaining reasons of serial communication errors;

FIG. 44 is an illustration showing the structure of the parameter of an error communication command;

FIGS. 45A and 45B are illustrations for explaining the parameters of state request commands;

FIG. 46 is an illustration for explaining the parameter of a response command in which a system state is set to the state designation parameter of a state request command;

FIG. 47 is an illustration for explaining the parameter of a response command in which a white balance state is set to the state designation parameter of a state request command;

FIG. 48 is an illustration for explaining the parameter of a response command in which a fading state is set to the state designation parameter of a state request command;

FIGS. 49A and 49B are illustrations for explaining the parameter of a response command in which a switching state is set to the state designation parameter of a state request command;

FIGS. 50A and SOB are illustrations for explaining the parameters of white balance request/response commands;

FIGS. 52A and 52B are illustrations for explaining the parameters of a focus request/response command;

FIGS. 55A and 55B are illustrations for explaining the parameters of a zoom request/response command;

FIGS. 58A and 58B are illustrations for explaining the parameters of an exposure request/response command;

FIG. 59 is an illustration showing the correspondence of shutter speeds;

FIG. 60 is an illustration showing the correspondence between code values and diaphragms;

FIG. 61 is an illustration for explaining the parameter of a state request command;

FIGS. 62A to 62D are illustrations for explaining the parameters of a state response command;

FIG. 63 is an illustration for explaining the parameters of a setup response command;

FIGS. 64A and 64B are illustrations for explaining the parameters of a pan tilting request/response command;

FIGS. 66A and 66B are illustrations for explaining the parameters of a limit notification command;

FIGS. 67A and 67B are illustrations for explaining the parameters of a remote control notification command;

FIGS. 68A and 68B are illustrations for explaining the parameters of an LED request/response command;

FIG. 69 is an illustration for explaining the flickering cycle setting parameters of an LED request command;

DETAILED DESCRIPTION OF THE PREFERRED EMBODIMENTS

First Embodiment

Figures 1A, 1B:
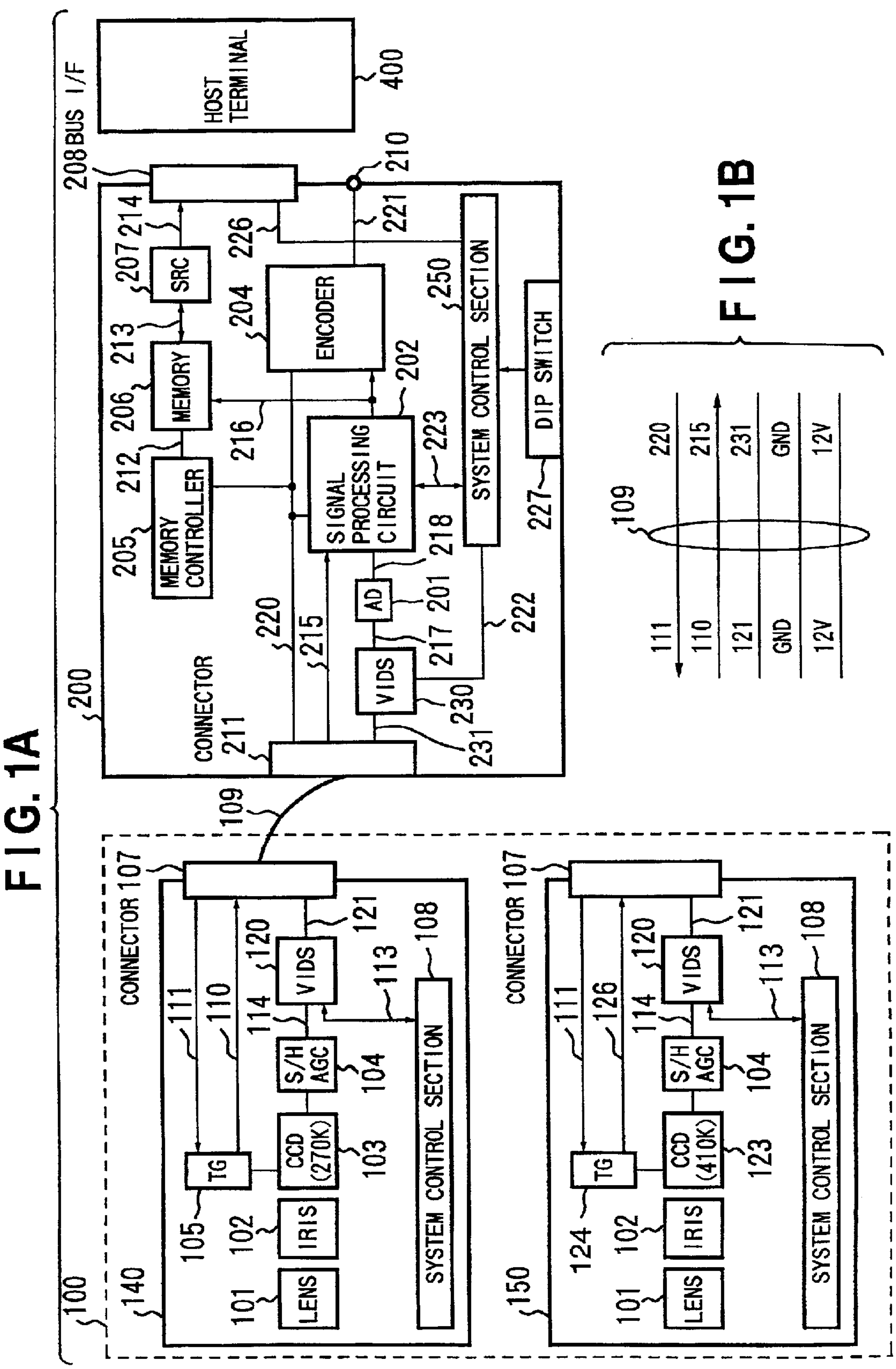
FIGS. 1A and 1B show block diagrams of a structure of a video input unit of a first embodiment of the present invention.

FIG. 1 is a block diagram showing the structure of the video input unit of the first embodiment of the present invention.

In FIG. 1, numeral 100 denotes a camera section, 200 denotes an image processing section formed like an extension board or extension card, 400 denotes a PC host terminal. The camera section 100 is connected with the image processing section 200 by, for example, a cable 109. The image processing section 200 is electrically connected by inserting a bus i/f (interface) 208 into the extension slot of the host terminal 400. The image processing section 200 and camera section 100 are controlled from the host terminal 400 via the bus i/f 208.

The camera section 100 can be exchangeable to the image processing section 200. Numeral 140 denotes a CCD camera having, for example, 270,000 pixels and 150 denotes a CCD camera having, for example, 410,000 pixels.

The structure of the CCD camera 140 is described below.

Numeral 108 denotes a system control section including a one-chip microcomputer having functions as a CPU, ROM, RAM, control port, and communication port. The system control section 108 controls each device of the camera section 140 and performs bi-directional communication with the image processing section 200 through a serial data line 113 and a cable 109.

Numeral 101 denotes a lens section provided with an image pickup lens, focus lens, and focus ring for operating the focus lens by hand. Numeral 102 denotes an iris unit for adjusting the incident light passing through the lens section 101, which is provided with an iris and an iris ring for operating the iris by hand. Numeral 103 denotes an image pickup device such as a CCD for photo-electrically converting a video passing through the lens section 101 and iris 102 into an electric signal and has, for example, an image pickup device of 270,000 pixels. Numeral 105 denotes an image pickup device timing pulse generator (hereafter referred to as TG) for controlling the storing operation, reading operation, or resetting operation in accordance with the number of pixels of the image pickup device 103, which supplies a video clock 110 (9.5 MHz) to the image processing section 200. The TG 105 is controlled via a not-illustrated control line from the system control section 108, which can change shutter speeds of the CCD 103. Numeral 104 denotes an S/H AGC circuit for performing the sample-and-hold operation in order to reduce noises of stored electric charges of the image pickup device 103 and controlling the gain of an image pickup signal, which outputs an image pickup signal 114 and controls the gain of the image pickup signal 114 in accordance with the control by the system control section 108. Numeral 113 denotes a data line for performing the bi-directional data communication between the system control section 108 and the image processing section 200, which is connected to the serial communication port of the system control section 108. Numeral 111 denotes a video synchronizing signal supplied from the image processing section 200, in which horizontal and vertical synchronizing signals are multiplexed.

Numeral 120 denotes a multiplexing/separating section (VIDS) for multiplexing the data to be transmitted to the image processing section 200 with the image pickup signal 114 and separating data from multiplexed signal multiplexed by and supplied from the image processing section 200. The data and a multiplexed video signal 121 are supplied to the image processing section 200 via the cable 109. The data separated by the multiplexing/separating section 120 is supplied to the system control section 108 through the serial data line 113.

Numeral 107 is a connector removable from the cable 109. The cable 109 supplies the video and data multiplexing signal 121 and the video clock 110 to the image processing section 200 from the camera section 140 and supplies the synchronizing signal 111 to the camera section 100 from the image processing section 200. Moreover, power is supplied to the camera section 100 from the image processing section 200 by the cable 109.

Then, the structure of the CCD camera 150 is described below. The CCD camera 150 is different from the CCD camera 140 in an image pickup device 123 and TG 124 but the others are the same as the CCD camera 140. Therefore, their description is omitted.

Numeral 123 denotes an image pickup device such as a CCD having, for example, 410,000 pixels. The TG 124 is an image pickup device timing pulse generator (hereafter referred to as TG) for controlling the storing operation, reading operation, or resetting operation in accordance with the number of pixels of the image pickup device 123, which supplies a video clock 126 (14.3 MHz) to the image processing section 200.

Then, the image processing section 200 is described.

Numeral 250 denotes a system control section including a one-chip microcomputer having the functions as a CPU, ROM, RAM, control port, and communication port. The system control section 250 performs the control of each device of the image processing section 200, the auto white balance control, and the communication with the camera section 100 and the communication with the host terminal 400 through the bus i/f 208. Moreover, the section 250 decodes a command supplied from the host section 400 and performs an operation requested from the host section 400.

Numeral 230 denotes a multiplexing/separating section (VIDS) for separating data and a video signal from a video signal 231 in which various data values are multiplexed and multiplexing various data values to be transmitted to the camera section 100 on a video signal. A video signal 217 separated by the VIDS 230 is supplied to an A-D conversion circuit 201. Moreover, received data separated by the VIDS 230 is supplied to the system control section 250 through a serial data line 222.

Numeral 201 denotes an A-D conversion circuit for converting the video signal 217 into a digital video signal 218. Numeral 202 denotes a signal processing circuit for converting the digital-converted video signal 218 into a standardized digital video signal 216. Moreover, the signal processing circuit 202 supplies the brightness data of an exposure control object to be transmitted to the camera section 100 and white balance data for controlling the white balance to the system control section 250, at the cycle of a vertical synchronizing signal (V_sync). The system control section 250 recognizes the arrival of a signal supplied from the signal processing circuit 202 and reads items of information included in the received signal through a serial data line 223 and writes the items of information in a not-illustrated RAM of the system control section 250. Moreover, the system control section 250 sets a mode of the signal processing circuit 202 through the serial data line 223. For example, the section 250 sets the circuit 202 to a 270,000-pixel mode when the camera section 100 has 270,000 pixels and to a 410,000-pixel mode when the section 100 has 410,000 pixels.

Numeral 204 denotes an encoder circuit for converting the digital video signal 216 into a composite signal 221, which outputs the converted composite signal to a video output connector 210. Moreover, the encoder circuit 204 selectively mutes the composite signal 221 in accordance with the information supplied from the system control section 250. Numeral 206 denotes an image memory for storing digital video signals supplied from the signal processing circuit 202 and an SRC 207. Numeral 205 denotes a memory controller for controlling the reading and writing operations of the image memory 206. The SRC 207 is a scan rate converter (SRC) for converting and absorbing the difference between the aspect ratios of the digital video signal 213 of the memory 206 and a digital video signal 214 supplied from the host terminal 400. Numeral 208 denotes a bus i/f connected to a bus of a computer serving as a host terminal, which transfers the digital video signal 214 and control data 226 between the host terminal 400 and the image processing section 200 and provides an i/f (interface) for controlling the memory controller 205 and the SRC 207 from the host terminal 400.

Numeral 215 denotes a video clock signal supplied from the camera section 100, which corresponds to the signal 110 of the camera section 100. The video clock 215 is supplied to the signal processing circuit 202. The signal processing circuit 202 generates a video synchronizing signal 220 (sync) from the video clock 215. The video synchronizing signal 220 is supplied to the camera section 100 through the cable 109 and moreover, supplied to the memory controller 205 and encoder 204.

Numeral 222 denotes a serial data line for performing bi-directional data communication between the camera section 100 and the image processing section 200 (the system control section 250), and the data line 222 is connected to the serial data port of the system control section 250.

Numeral 226 denotes a parallel data line for performing the bi-directional data communication between the host terminal 400 the image processing section 200 (the system control section 250), and is connected to the control port of the system control section 250.

Numeral 227 denotes an in-line package switch (DIP switch) which is used to discriminate between CCD cameras. A user switches the setting of the DIP switch 227 in accordance with the type of CCD camera to be connected to the image processing section 200.

In the case of a video system having the above structure, a user can select a camera having a resolution suitable for a purpose by replacing the camera 140. To replace the camera 140, it is necessary to set parameters to the signal processing circuit 202 and data multiplexing/separating section (VIDS) 230 in accordance with the number of pixels (resolution) of the camera. By setting the parameters, it is possible to securely multiplexing/separating a video signal from data and transfer data between the camera section 100 and the image processing section 200. For example, the image pickup device 103 of the CCD camera 140 has 270,000 pixels and the image pickup device 123 of the CCD camera 150 has 410,000 pixels. In this case, the system control section 250 reads the set value of the DIP switch 227 to discriminate between the cameras of the camera section 100. Then, the section 250 initializes the signal processing circuit 202 and data multiplexing/separating section 230 in the 270,000-pixel mode when the camera 140 is connected, and in the 410,000-pixel mode when the camera 150 is connected.

In the case of the first embodiment, when a video signal and a data signal are multiplexed and transmitted to the image processing section 200 from the camera section 100, multiplexing/separation in the image processing section 200 cannot be smoothly performed unless a mode corresponding to the number of pixels of a CCD camera is set in the image processing section 200. Therefore, a user must set the DIP switch 227 of the image processing section 200 in accordance with the number of pixels of the CCD camera of the camera section 100. However, if it is forgotten to set the DIP switch 227, or the switch 227 is erroneously set, then normal video signal can not be output or data communication may not be performed between the camera section 100 and the image processing section 200.

Second Embodiment

Figures 2A, 2B:
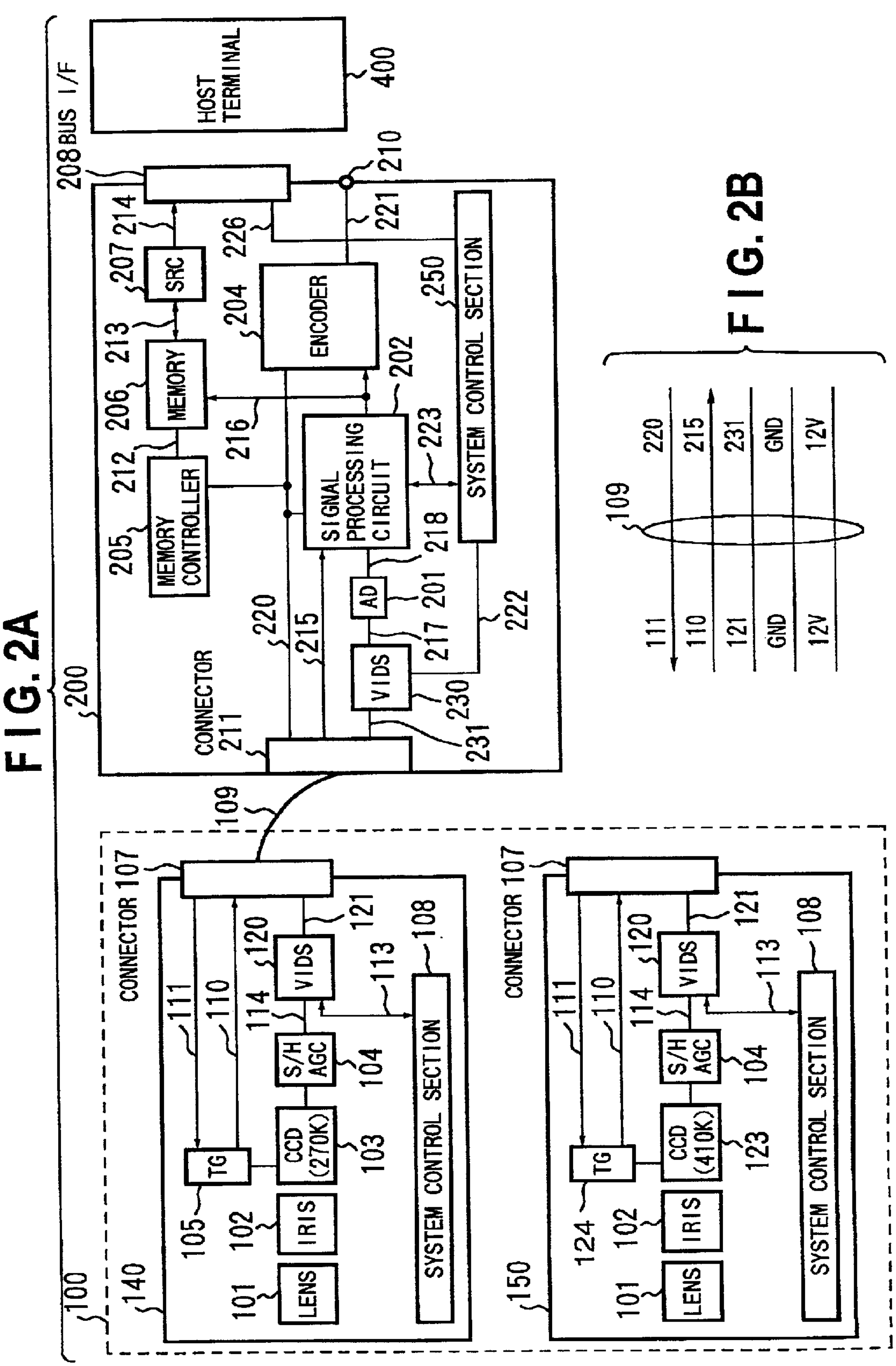
FIGS. 2A and 2B show block diagrams of a structure of a video input unit of a second embodiment of the present invention.

FIGS. 2A and 2B are block diagrams showing the structure of the video input unit which is the second embodiment of the present invention.

The second embodiment is different from the first embodiment in that the DIP switch 227 is not used. The system control section 250 does not detect the type of camera of the camera section 100 by reading the set value of the DIP switch 227 but it detects the type of camera by using a synchronizing signal supplied from the camera section 100. In the case of the second embodiment, it is detected whether the camera of the camera section 100 is the 270,000-pixel CCD camera or 410,000-pixel CCD camera by using a video clock sent to the image processing section 200.

Figure 3:
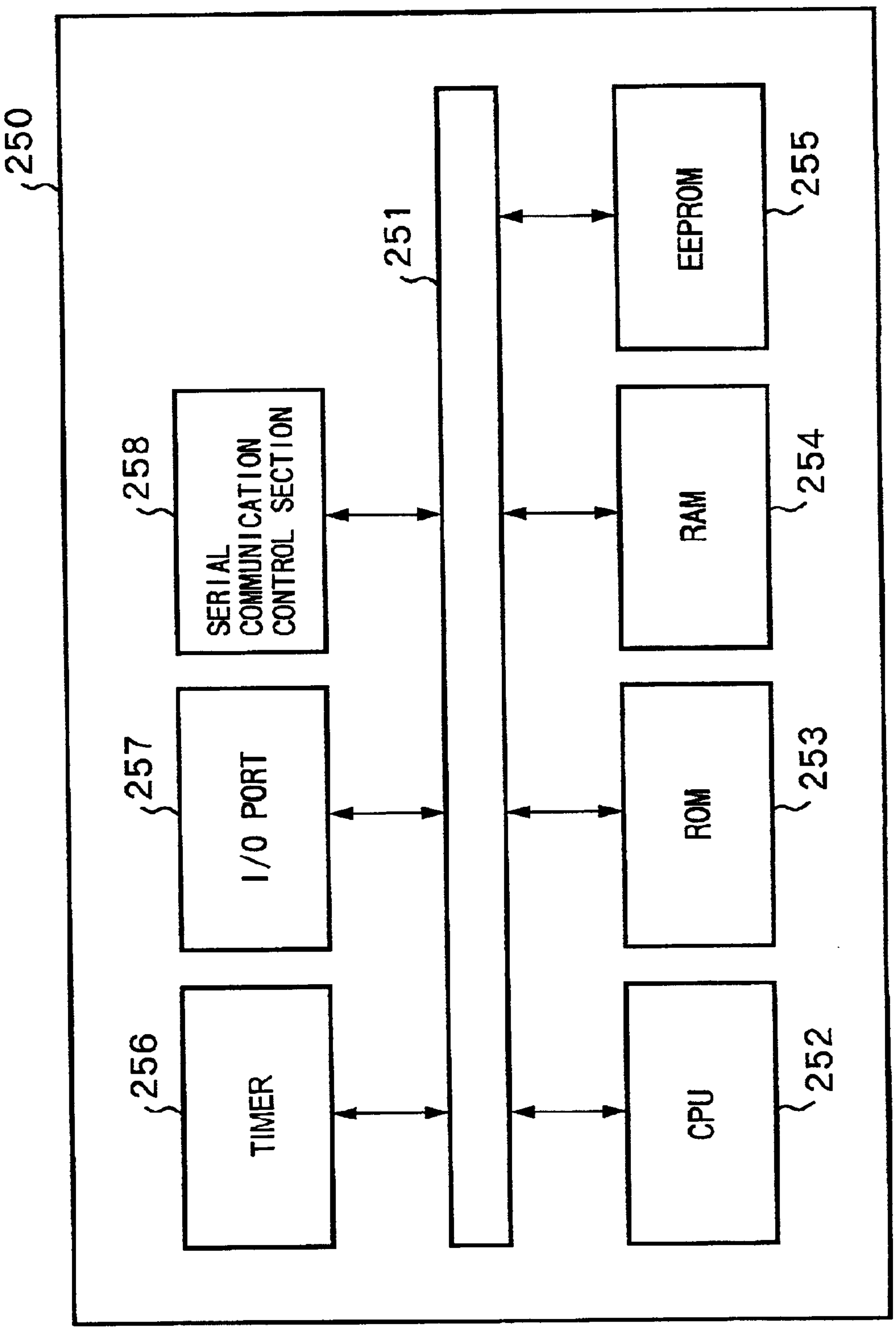
FIG. 3 is a block diagram showing the structure of the system control section of a video processing section.

FIG. 3 is a block diagram showing the structure of the system control section 250 of the image processing section 200. The system control section 250 includes a one-chip microcomputer and software for controlling the microcomputer. Numeral 251 denotes an internal bus, 252 denotes a CPU, 253 denotes a ROM for storing software, 254 denotes a RAM used as a working area of the software, and 255 denotes an electrically erasable programmable ROM (EEPROM) in which data necessary for control is stored. Numeral 256 denotes a timer section, 257 denotes an I/O port for controlling various devices, and 258 denotes a serial communication port for performing command communication between each camera section 100 and the host terminal 400, performing serial communication with each device of the image processing section 200 and controlling devices.

Figure 4A:
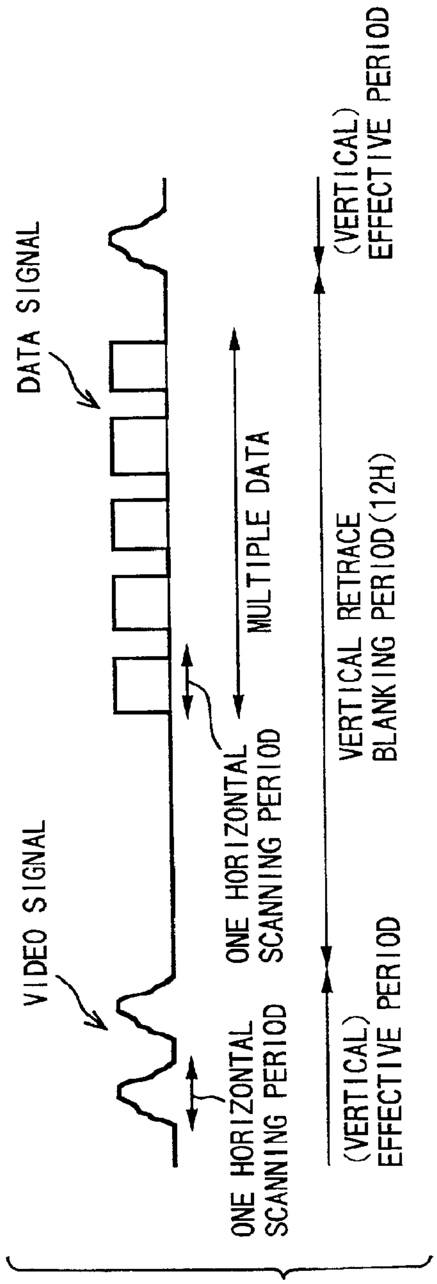
FIGS. 4A and 4B are illustrations for explaining a VIDS (Vertical Interval Data Signal)
Figure 4B:
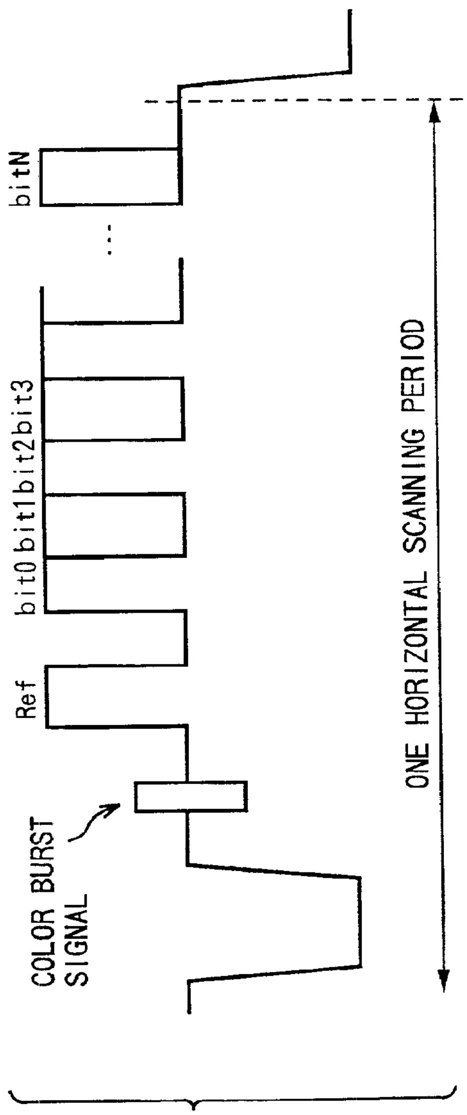

FIGS. 4A and 4B are illustrations for explaining a VIDS (Vertical Interval Data Signal) to be multiplexed on a video signal. For the cable 109, it is preferable to decrease the number of wires for connecting the camera section 100 with the image processing section 200 from the aspects of the operability and cost. Therefore, by multiplexing a data signal to be transferred between the camera section 100 and the image processing section 200 on a video signal, it is possible to decrease the number of wires of the cable 109. Multiplexing/separating sections 120 and 230 perform multiplexing/separation of the data into/from video signals. The data used here is a VIDS (Vertical Interval Data Signal).

As shown in FIG. 4A, a video signal can be divided into an effective period and a vertical blanking interval. In the effective period, the video signal is output every horizontal line. In the case of the NTSC system, an odd field includes 1 to 263H and an even field includes 263 to 525H. Among these fields, the vertical blanking interval includes 1 to 21H and 263 to 284H. In this case, data can be multiplexed on the video signal in periods between 10 and 21H and between 273 and 284H of the vertical blanking interval. Therefore, the data to be transmitted from the camera section 100 to the image processing section 200 is multiplexed in the period between 10 and 21H and data from the image processing section 200 to the camera section 100 is multiplexed in the period between 273 and 284H.

FIG. 4B shows an enlarged 1-H signal in the data multiplexing period. In this case, a data signal is converted into binary notation and multiplexed on the scanning period of the vertical blanking interval (=V blanking period) of a video signal.

Figure 5:
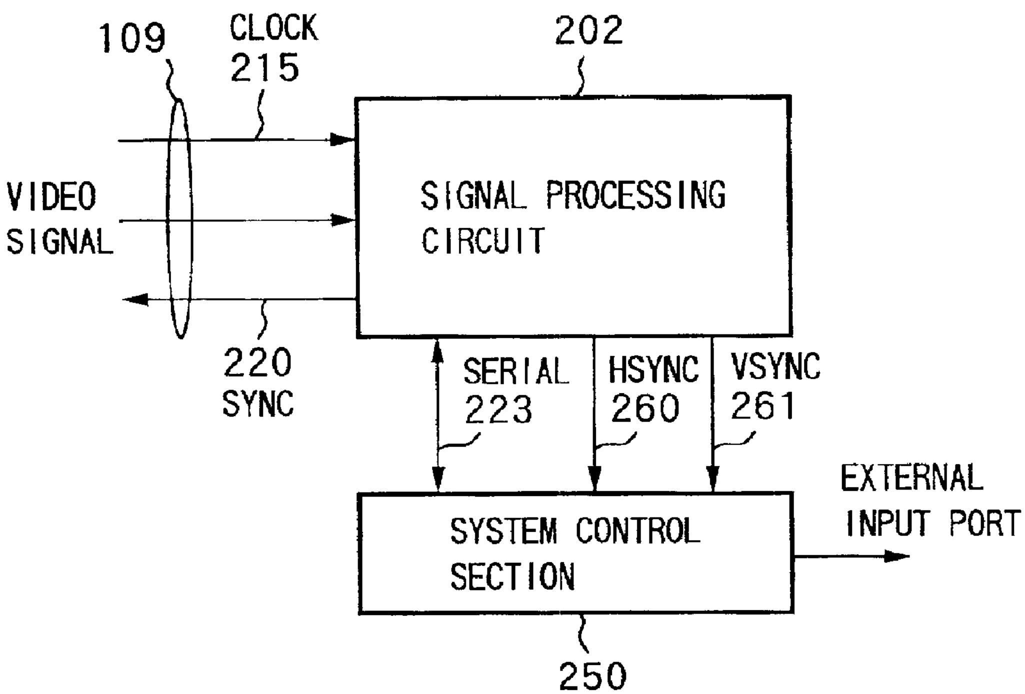
FIG. 5 is an illustration for explaining lines of signals transferred between a signal processing section and a system control section.

FIG. 5 is an illustration for explaining signals to be transferred between the signal processing circuit 202 and the system control section 250 of this embodiment.

The video clock 215 (110) is supplied to the signal processing circuit 202 from the camera section 100. The signal processing circuit 202 transfers data to and from the system control section 250 through the serial data line 223. The signal processing circuit 202 generates a horizontal synchronizing signal Hsync 260, vertical synchronizing signal Vsync 261, and the video synchronizing signal 220 (sync)(111) in which the horizontal synchronizing signal and vertical synchronizing signal are multiplexed from a video clock signal 215, and the horizontal synchronizing signal 260 and vertical synchronizing signal 261 are input to the external input ports of the system control section 250, respectively. Moreover, the video synchronizing signal 220 (111) is supplied to the camera section 100 through the cable 109.

Figure 6:
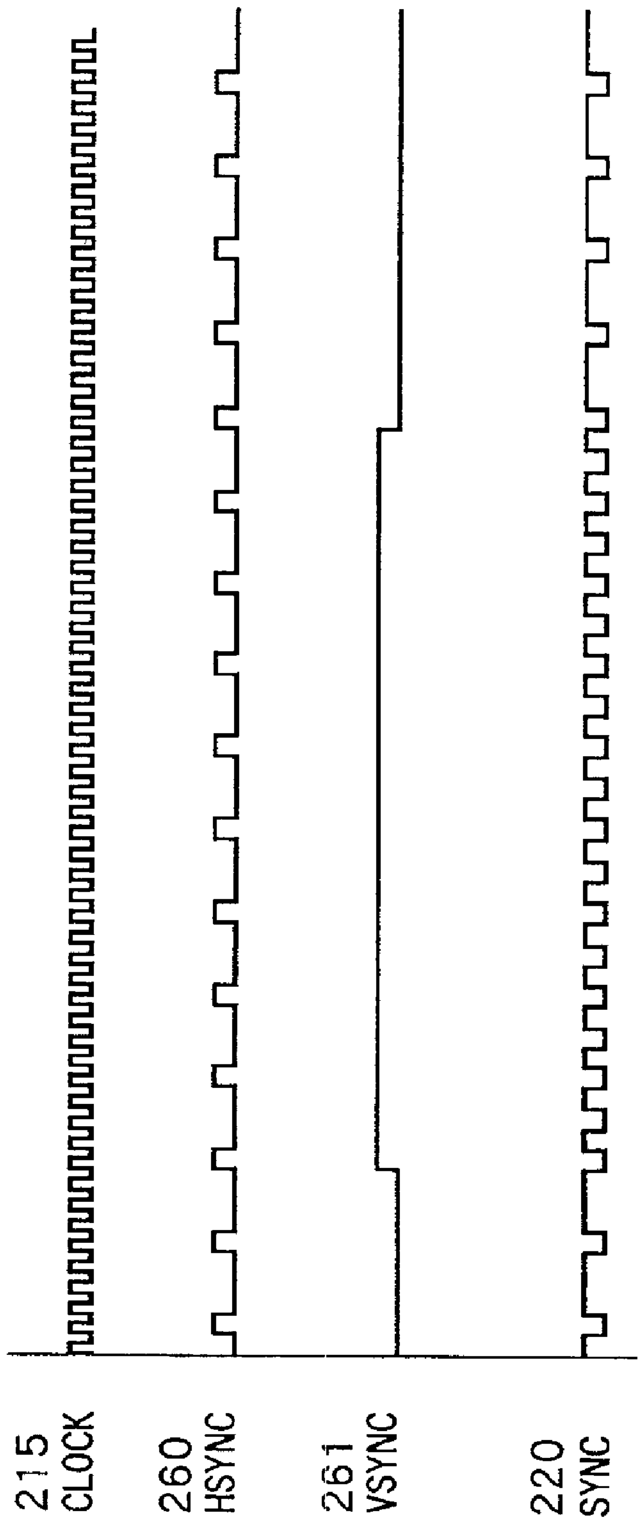
FIG. 6 is an illustration showing an image clock and synchronizing signals.

FIG. 6 shows the relation between the video clock 215, horizontal synchronizing signal Hsync (260), vertical synchronizing signal Vsync (261), and video synchronizing signal 220. Though the actual cycle of the video clock 215 is shorter, the cycle is shown by enlarging it so as to be easily understood. The relation between the horizontal synchronizing signal 260, vertical synchronizing signal 261, and video synchronizing signal 220 is as shown in FIG. 6. The video synchronizing signal 220 has a phase opposite to that of the vertical synchronizing signal 261 and the pulse cycle (period) of the signal 220 becomes short while pulses of the vertical synchronizing signals 261 are in high level. Thus, the video synchronizing signal 220 is generated by multiplexing the horizontal synchronizing signal 260 and vertical synchronizing signal 261.

The horizontal synchronizing signal 260 is a signal of pulse strings in which each of the pulses is generated at every horizontal blanking interval of a video signal 218 (121), at every 63.5 $\mu$s in the case of the NTSC. The vertical synchronizing signal 261 is a signal of pulse strings in which each of the pulses is generated at every vertical blanking interval of the video signal 218, at every 16.7 msec in the case of the NTSC. The signal processing circuit 202 generates the horizontal synchronizing signal 260 and vertical synchronizing signal 261 by counting the video clock 215. The frequency of the video clock 215 differs in the 270,000-pixel camera 140 and the 410,000-pixel camera 150. the frequency is 9.5 MHz in the case of the 270,000-pixel camera 140 and 14.3 MHz in the case of a 400,000-pixel camera. The system control section 250 obtains the above information from the VIDS 230 and sets a 270,000-pixel mode or 410,000-pixel mode to the signal processing circuit 202 through the serial data line 223. Thereby, the correct horizontal synchronizing signal 260 and vertical synchronizing signal 261 are output from the signal processing section 202.

Figure 7A:
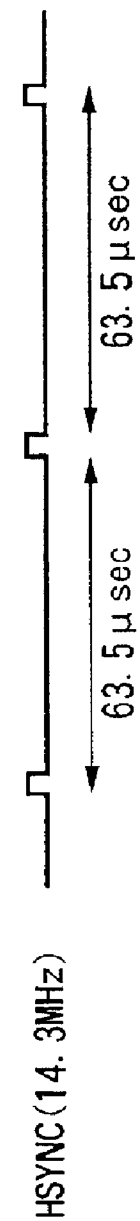
FIGS. 7A to 7C are illustrations showing horizontal synchronizing signals corresponding to types of cameras.
Figure 7B:
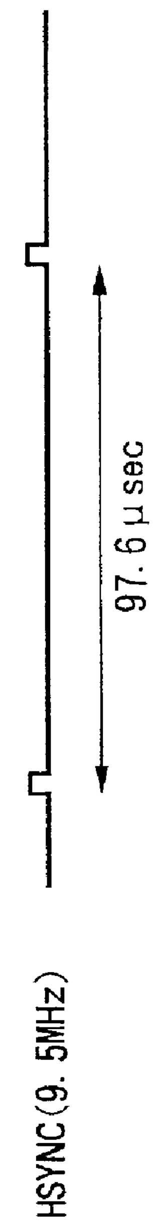
Figure 7C:

In this case, unless a pixel mode corresponding to the number of pixels of a CCD camera is set, synchronizing signals with different cycles are output. FIG. 7A shows the horizontal synchronizing signal 260 when the signal processing circuit 202 is set to the 410,000-pixel mode and connecting the 410,000-pixel camera 150. In this case, because a mode corresponding to the number of pixels of the camera is set, pulses of the vertical synchronizing signals 261 are generated at a correct interval (65.3 μs). FIG. 7B is an illustration showing the horizontal synchronizing signal 260 when setting the signal processing section 202 to the 410,000-pixel mode and connecting the 270,000-pixel camera 140. In this case, because a mode corresponding to the number of pixels of the camera is not set, pulses of the vertical synchronizing signals 261 are generated at an interval (97.6 μs) different from a horizontal blanking interval. FIG. 7C is an illustration showing the horizontal synchronizing signal 260 when setting the signal processing section 202 to the 410,000-pixel mode and connecting no camera. In this case, because the video clock 215 is not input, no pulse is generated in the vertical synchronizing signal 261. The second embodiment discriminates between the types of cameras of the camera section 100 and detects whether type of the camera section 100 is connected by noticing the above difference between pulse intervals of the horizontal synchronizing signal 260.

Figure 8:
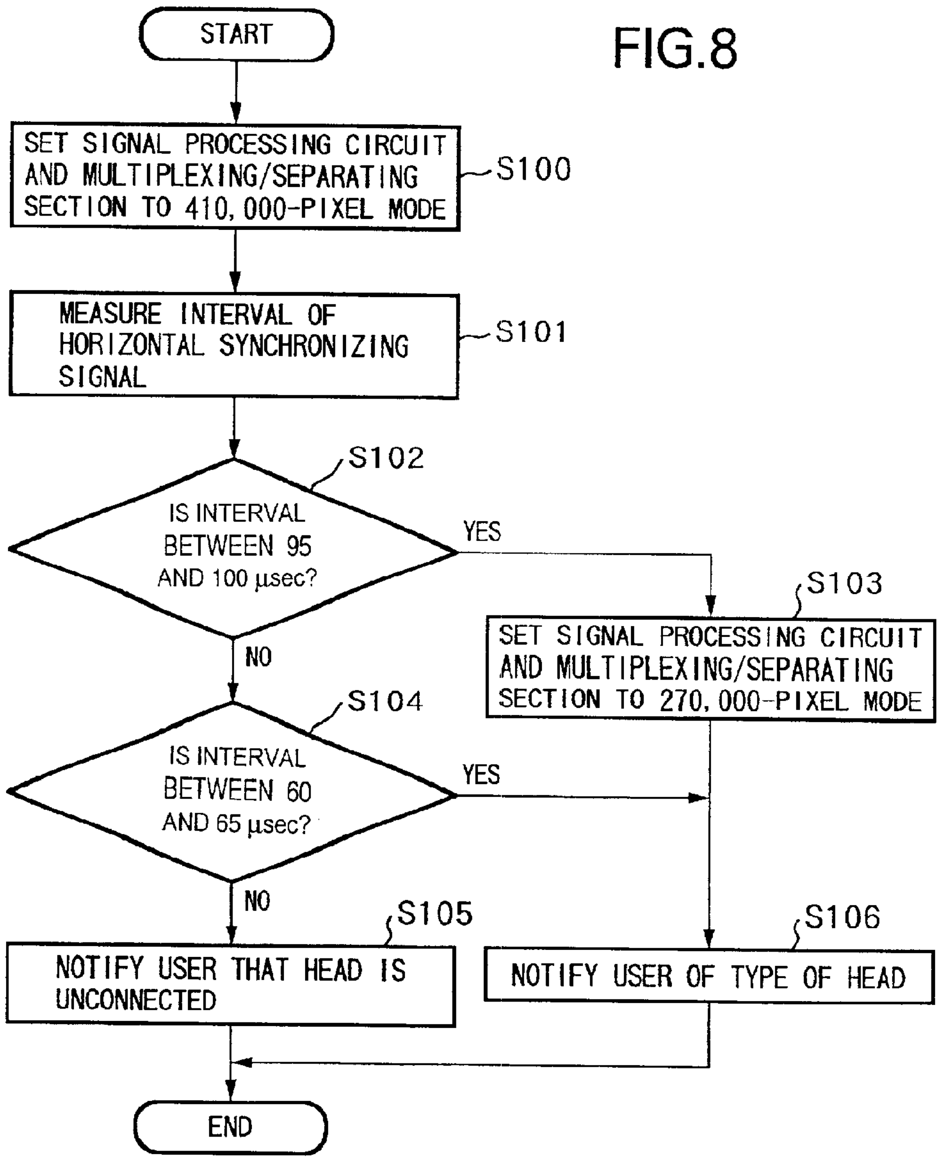
FIG. 8 is a flow chart for explaining operations of a second embodiment.

FIG. 8 is a flow chart showing the processing for the system control section 250 to detect the type of the camera of the camera section 100. This operation is performed when initializing a system.

In a step S100, the system control section 250 sets the signal processing section 202 and multiplexing/separating section 230 to, for example, the 410,000-pixel mode as a default value.

In the step S101, the pulse interval of the horizontal synchronizing signal 260 output from the signal processing section 202 is measured. Next, in a step S102, it is determined that the 270,000-pixel CCD camera 140 is connected to the camera section 100 when the pulse interval measured in the step S101 ranges between 95 and 100 μs and then proceeds to a step S103, the system control section 250 sets the signal processing section 202 and multiplexing separation section 230 to the 270,000-pixel mode and then proceeds to a step S106.

However, in the step S102, unless the pulse interval measured ranges between 95 and 100 μs, then proceeds to a step S104, it is determined whether or not a 410,000-pixel CCD camera is connected to the camera section 100 based on as if the pulse interval measured in the step S101 ranges between 60 and 70 μs. If YES in the step S104, setting of the mode is not performed in the signal processing section 202, because the 410,000 pixel mode is already set as the default value. Then proceeds to a step S106, the number of pixels of the connected camera is transmitted to the host terminal 400 through a parallel data line 226. The host terminal 400 notifies the number of pixels of the connected camera to a user by displaying any message on a not-illustrated display.

However, unless the pulse interval ranges between 60 and 65 μs in the step S104, then proceeds to a step S105. In the step S105, because the determinations on the steps S102 and S104 are not satisfied, it is decided that no camera is connected. Thus, the system control section 250 sets video signal muting to an encoder 204. Thereby, it is prevented that a noise image is output to the monitor of the host terminal 400. Moreover, the section 250 notifies the host terminal 400 that no camera is connected. The host terminal 400 notifies a user that no camera is connected by displaying any message showing that no camera is connected on a not-illustrated display. Moreover, the host terminal 400 closes a video display window so that a noise screen is not displayed on the video display window or overlays the window with other video.

In the case of the second embodiment, the number of pixels of a camera and whether type of camera is connected are decided by noticing the interval between horizontal synchronizing signal pulses. However, it is also possible to use the interval between vertical synchronizing signals to make the above decision.

Though this embodiment uses the NTSC, it is possible to detect the number of pixels of a camera by the same processing even when other standard such as OAL or SECM is used.

Third Embodiment

The third embodiment of the present invention is described below.

When the signal processing circuit 202 is not used, it is also possible to use a counter circuit for counting the pulses of the video clocks 215 and use the pulses output from the counter circuit for decision.

Figure 9:
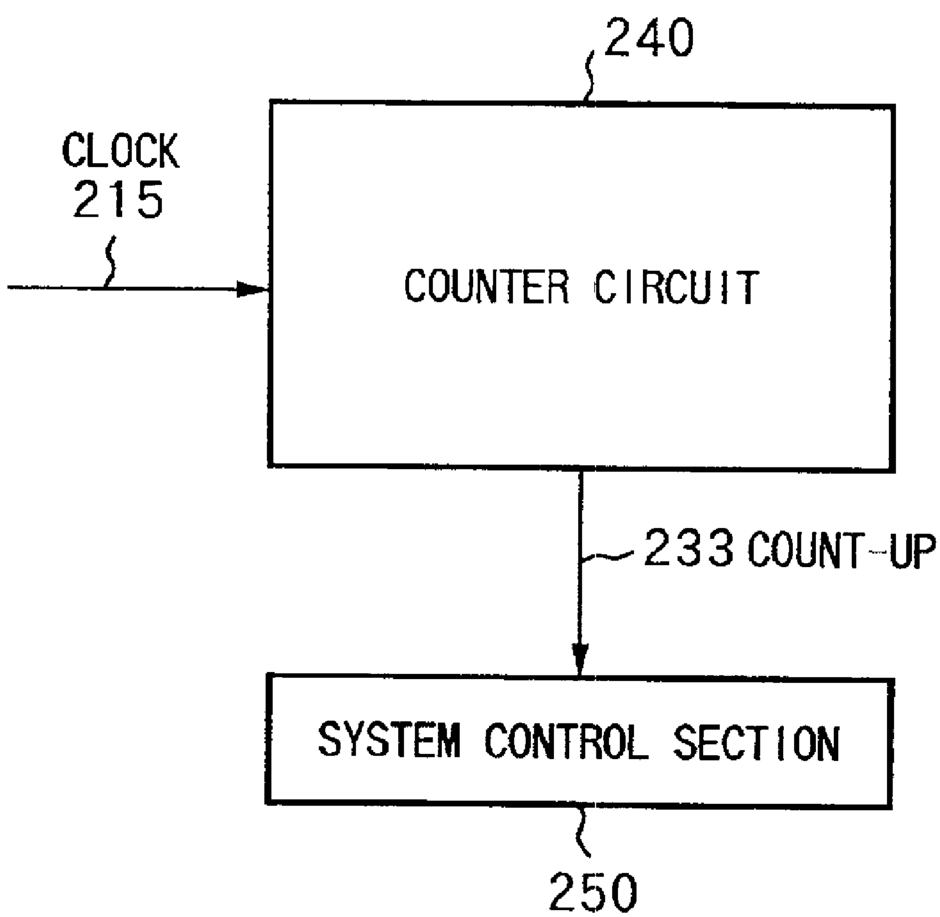
FIG. 9 is an illustration for explaining the third embodiment.

FIG. 9 is an illustration showing an example in which a counter circuit 240 is connected to the system control section 250 in order to detect a type of camera of the camera section 100. The counter circuit 240 counts video clocks 215. When the circuit 240 completes counting of the video clocks 215 in a predetermined time period, it notifies the system control section 250 by adding a pulse to a signal 233.

For example, if a value counted by the counter circuit 240 in the predetermined time period becomes less than "1,000", then it is determined that the 270,000-pixel CCD camera 140 is connected. In this case, a 9.5-MHz video clock 215 is input, a pulse is generated every 105 s. On the other hand, when the 410,000-pixel CCD camera 150 is connected and a 14.3-MHz video clock 215 is input, a pulse is generated every 69.9 μs and the counted value in the predetermined time period becomes greater than "1,000". Therefore, by using the counter circuit 240 and discriminating between intervals of counting signals, it is possible to discriminate between the number of pixels of a connected camera and decide whether a camera is connected.

Figure 10:
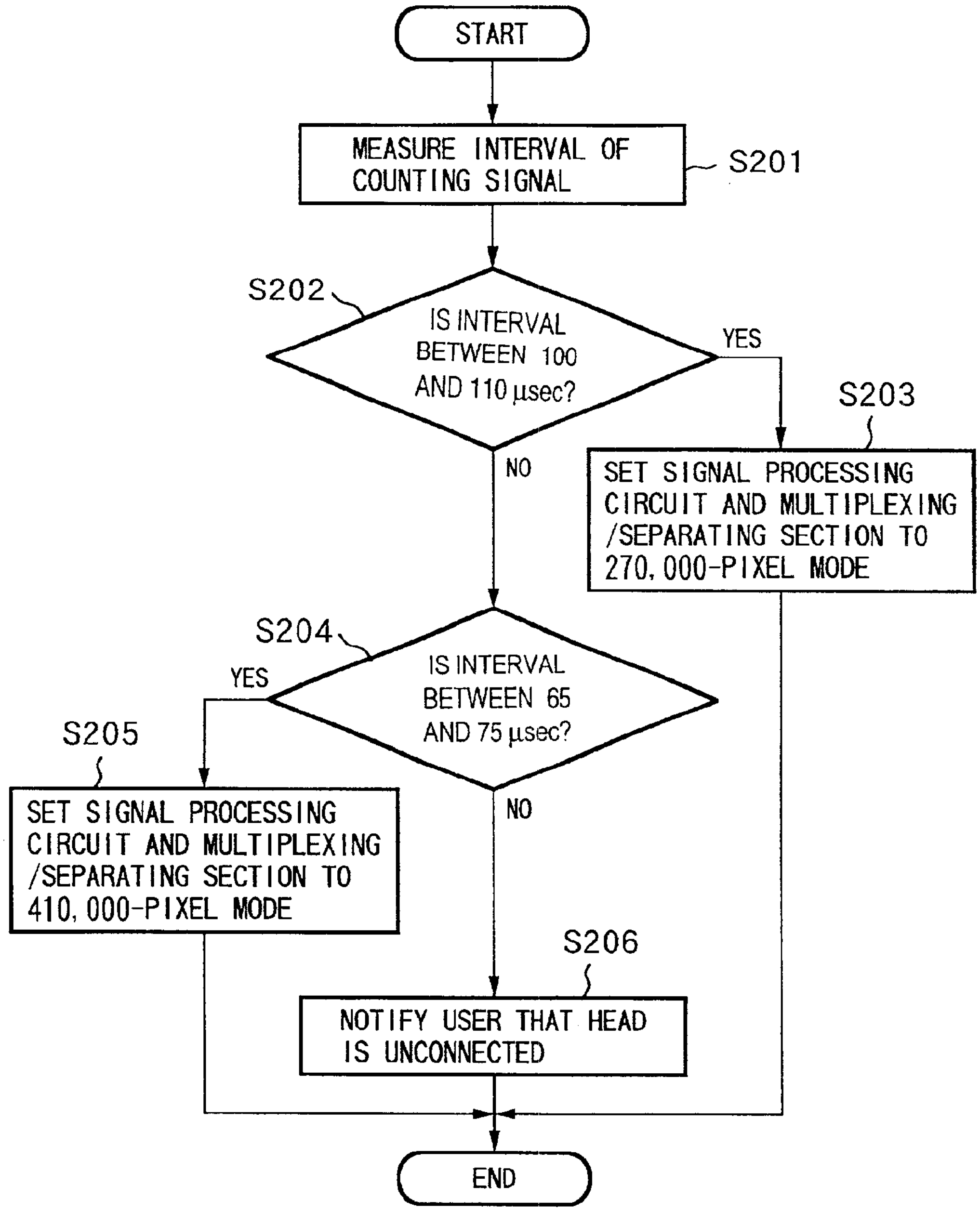
FIG. 10 is a flow chart for explaining operations of a third embodiment.

FIG. 10 is a flow chart showing the processing for the system control section 250 to detect the type of camera of the camera section 100 in this embodiment. In the flowchart, the type of camera is determined by measuring the time intervals between pulses from the counter 240. This operation is performed when initializing a system.

First, in a step S201, the system control section 250 measures the interval between pulses output from the counter circuit 240. Then, proceeds to a step S202. When the pulse interval measured in the step S201 ranges between 100 and 110 μs, it is determined that the 270,000-pixel CCD camera 140 is connected to the camera section 100 and then proceeds to a step S203. In the step S203, the system control section 250 sets the signal processing section 202 and the multiplexing/separating section 230 to the 270,000-pixel mode.

However, if the pulse interval measured in the step S201 does not range between 100 and 110 μs in the step S202, then proceeds to a step S204. When the pulse interval measured in the step S201 ranges between 65 and 75 μs, it is determined that the 410,000-pixel CCD camera 150 is connected to the camera section 100 and then proceeds to a step S205. Then, in the step S205, the signal processing 202 and the multiplexing/separating section 230 are set to the 410,000-pixel mode.

Unless the pulse interval ranges between 65 and 75 μs in the step S204, then proceeds to a step S206. In this case, since the conditions of the steps S202 and S204 are not satisfied, it is decided that no camera is connected and it is notified to the host terminal 400 that no camera is connected. Thereby, the host terminal 400 notifies a user that no camera is connected by using a not-illustrated display.

Fourth Embodiment

The fourth embodiment of the present invention is described below.

The fourth embodiment detects whether the camera section 100 is provided with the 270,000-pixel camera 140 or 410,000-pixel camera 150 by using a video synchronizing signal (sync) 111 transmitted from the camera section 100 to the image processing section 200.

Figures 11A, 11B:
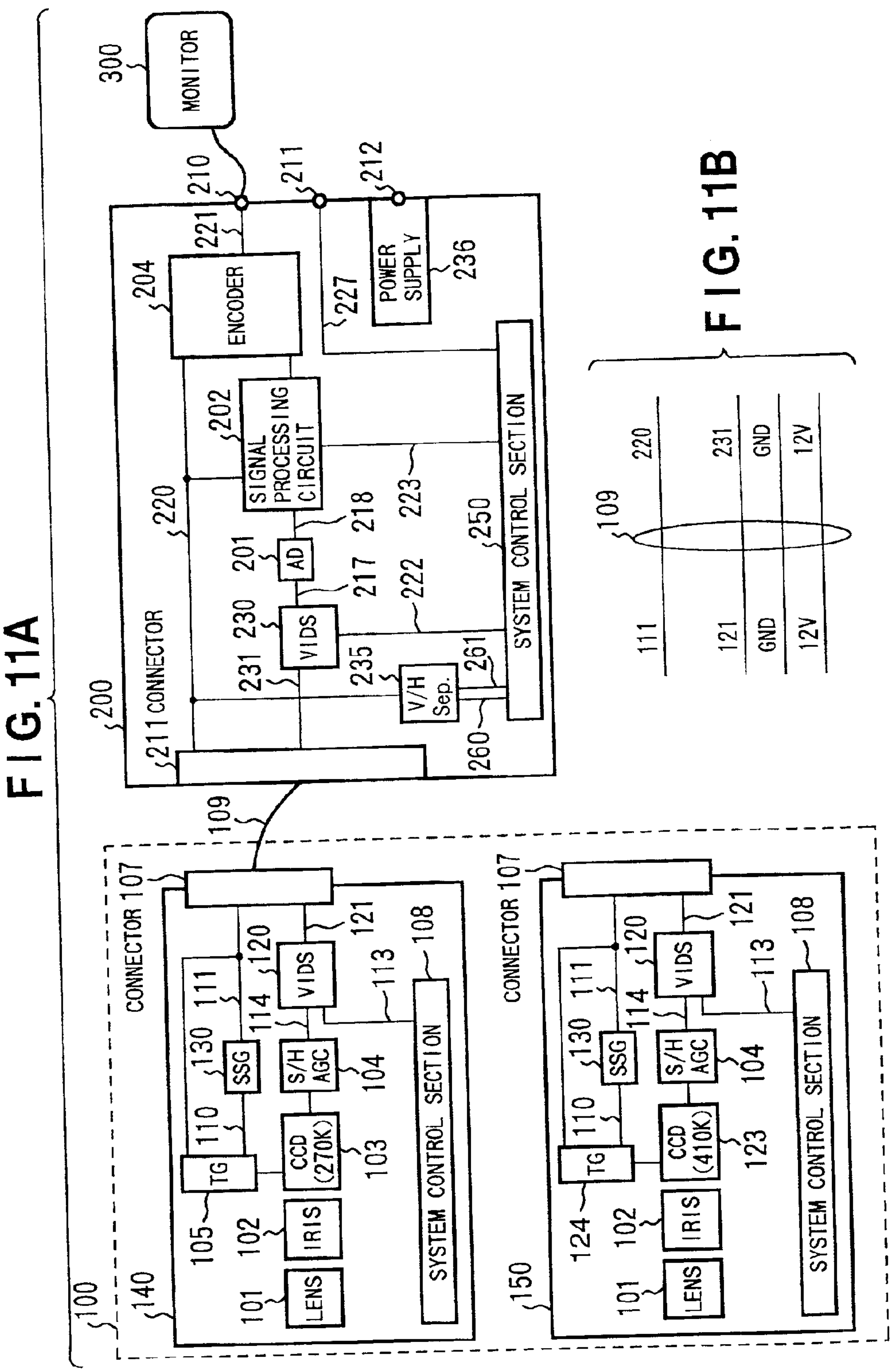
FIGS. 11A and 11B show block diagrams of a structure of a video input unit of a fourth embodiment.

FIGS. 11A and 11B are block diagrams showing the structure of the fourth embodiment. In the case of the first to third embodiments, the video clocks 110 and 215 and the video signals 121 and 231 obtained by multiplexing data are transmitted from the camera section 100 to the image processing section 200 and the video synchronizing signals 111 and 220 are transmitted from the image processing section 200 to the camera section 100. In the case of the fourth embodiment, however, a video synchronizing signal 111 is supplied to the image processing section 200 from the camera section 100. Moreover, in the case of the first to third embodiments, the image processing section 200 is included in a circuit board to be built in a computer. In the case of the fourth embodiment, however, the section 200 is included in the stand-alone type of unit. Power is supplied from an external unit such as an AC adapter and a video is displayed on an NTSC monitor. Moreover, the host terminal 400 can be connected by a serial cable such as a RS232C or the like but this is not indispensable. The host terminal 400 may be connected only when it is necessary to perform control from the host terminal 400.

Portions of the fourth embodiment different from those of the first to third embodiments are described below by referring to FIGS. 11A and 11B.

In the camera section 100, numeral 130 denotes a synchronizing-signal generation circuit (SSG) for generating the video synchronizing signal 111 obtained by multiplexing a horizontal synchronizing signal and a vertical synchronizing signal obtained from the video clock 110. The video synchronizing signal 111 is supplied to the image processing section 200 through the TG 105, connector 107, and cable 109. In this case, because the video synchronizing signal 111 is generated by the camera section 100, the video clock 110 is not supplied to the image processing section 200.

Then, the image processing section 200 is described below.

Numeral 235 denotes a V/H separating section for separating the horizontal synchronizing signal 260 and the vertical synchronizing signal 261 from the video synchronizing signal 220 supplied from the camera section 100. Numeral 236 denotes a power supply section which generates a voltage necessary for an internal unit from a voltage supplied from an external unit. Numeral 212 denotes a connector for supplying power from an AC adapter or the like.

Figure 12:
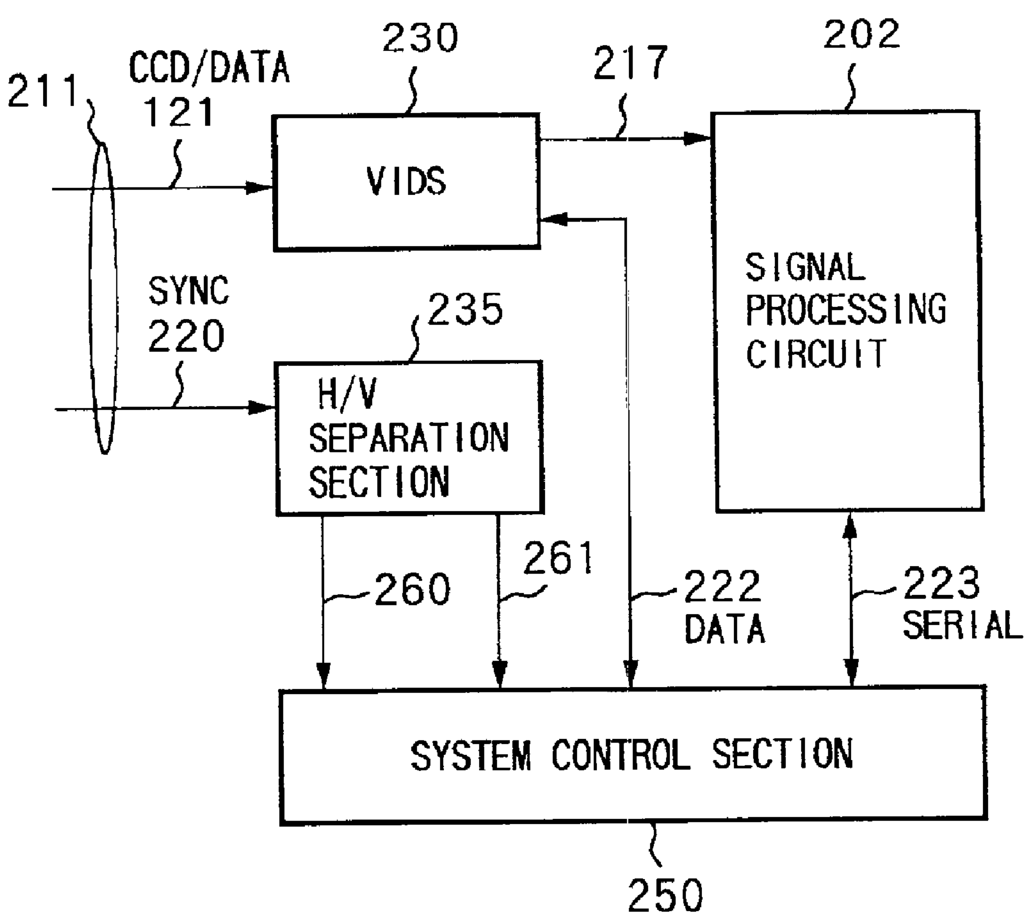
FIG. 12 is an illustration for explaining the fourth embodiment.

FIG. 12 shows flows of signals in the image processing section 200. The horizontal synchronizing signal 260 and vertical synchronizing signal 261 generated by the V/H separating section 235 are input to the system control section 250. The system control section 250 detects the number of pixels of the CCD camera of the camera section 100 in accordance with the flow chart in FIG. 7. Then, if the host terminal 400 is connected to the connector 211 through the RS232C cable in S106, then it is notified to the host terminal 400 that no camera is connected.

In the case of the fourth embodiment, it is possible to decrease the number of signal lines of the connector 109 because no video clock is transmitted to the image processing section 200 from the camera section 100.

Fifth Embodiment

Figure 13:
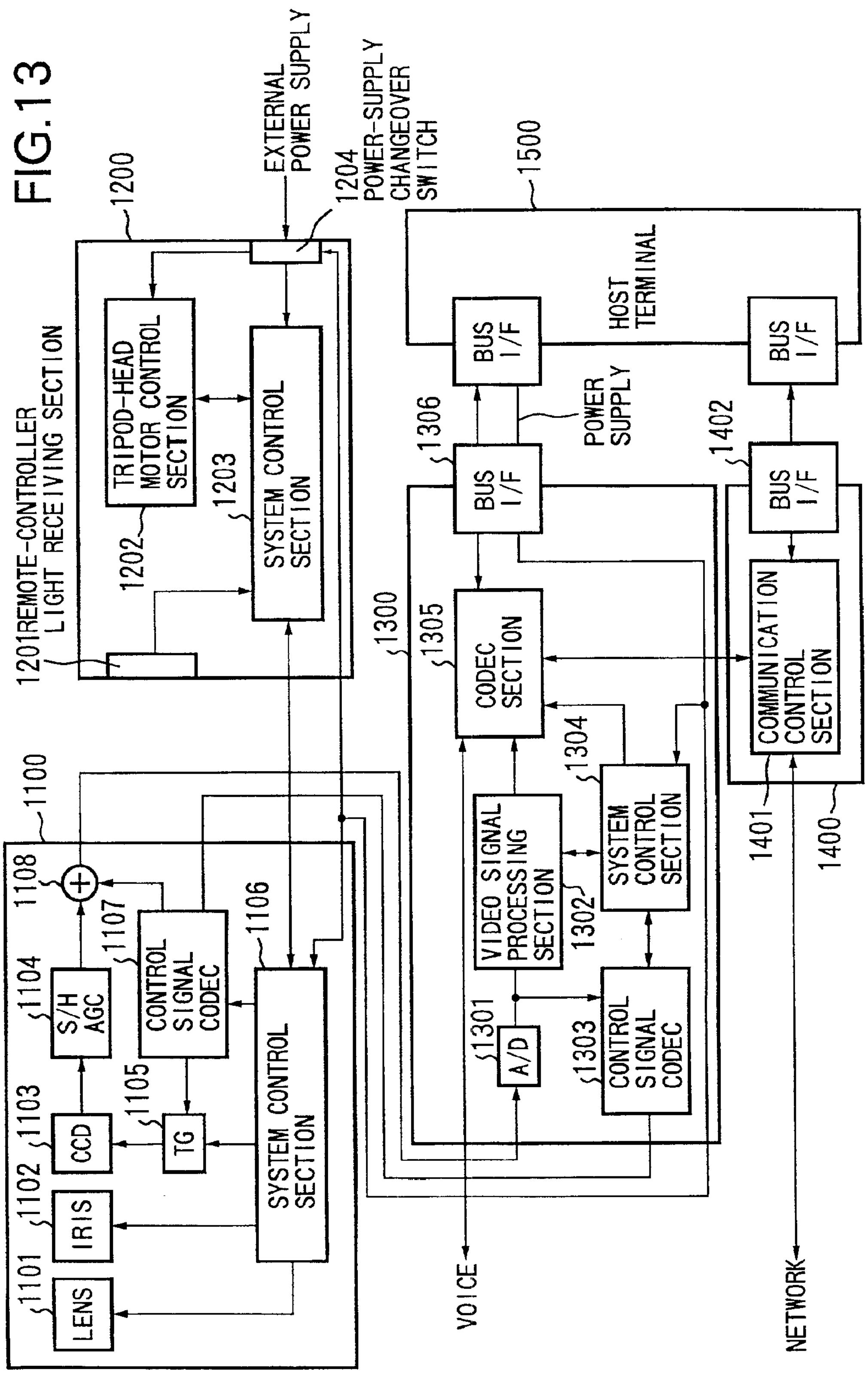
FIG. 13 is a block diagram showing the structure of a fifth embodiment of the present invention.

FIG. 13 is a block diagram showing the structure of the video telephone conference system of the fifth embodiment of the present invention. In FIG. 13, numeral 1100 denotes a camera section, 1200 denotes a tripod head, 1300 denotes a signal processing board, 1400 denotes a communication board for performing communication control and the like, and 1500 denotes a host terminal such as a PC.

The camera section 1100 and the tripod head 1200 are connected each other by a bi-directional control signal line. The camera section 1100 and the signal processing board section 1300 are connected each other by a signal line in which a control signal is multiplexed on a video signal supplied from the camera section 1100 to the signal processing board 1300 and video-synchronizing-signal (Sync) and control-signal lines extended between the signal processing board section 1300 and the camera section 1100.

Moreover, the signal processing board 1300 and the communication board 1400 are connected each other by data-signal and control-signal lines and moreover, connected with the host terminal 1500 by bus I/Fs (interfaces) 1306 and 1402.

Furthermore, the signal processing board 1300, tripod head 1200, and camera section 1100 are controlled from the host terminal 1500 via the bus I/F 1306 and similarly, the communication board 1400 is controlled via the bus I/F 1402. Furthermore, it is possible to bundle the above signal lines into one cable by sending the power to be supplied to the above sections to the camera section 1100 and tripod head 1200 from the host terminal 1500 via the bus I/F 1306.

The structure of the camera section 1100 is described below. Numeral 1101 denotes a lens section provided with zooming and focusing function, 1102 denotes an iris section for controlling the incident light passing through the lens section 1101, 1103 denotes a CCD serving as an image pickup device for converting an optical image (image pickup light coming from an object) passing through the lens section 1101 and iris section 1102 into an electric signal by means of photoelectric conversion, 1104 denotes an S/H AGC section for sampling an image pickup signal supplied from the CCD 1103, performing the hold operation to reduce noises and adjusting a gain, and 1105 denotes a TG serving as a CCD driving section for controlling the storing operation, reading operation, or resetting operation in accordance with the number of pixels of the CCD 1103.

Numeral 1106 denotes a system control section which includes a one-chip microcomputer having functions as a CPU, ROM, RAM, control port, and communication port, controls each device of the camera section 1100, and performs bi-directional communication with the tripod head 1200 and signal processing board section 1300.

Numeral 1107 denotes a control signal CODEC for separating a horizontal synchronizing signal (HD) and a vertical synchronizing signal (VD), from a synchronizing signal (Sync) supplied from the signal processing board 1300, and sends them to the TG 1105 so as to determine the timing for driving the CCD 1103 and moreover, superimposing a control signal supplied from the system control section 1106 on the vertical blanking interval of a CCD signal or fetching the control signal superimposed on the vertical blanking interval of a CCD signal supplied from the signal processing board 1300 to send it to the system control section 1106 and perform synchronizing separation. A CCD signal supplied from the S/H AGC 1104 is transmitted to the signal processing board 1300 after a control signal supplied from the control signal CODEC 1107 is multiplexed by an adder 1108.

Then, the tripod head 1200 is described below. Numeral 1201 denotes a remote controller light receiving section for receiving infrared light coming from a not illustrated wireless remote controller and 1202 denotes a tripod head motor control section for driving a motor for making a tripod head pan-tilting-operate in accordance with the control by the system control section 1203. The system control section 1203 includes a one-chip microcomputer having the functions as a CPU, ROM, RAM, control port, and communication port, controls each device of the tripod head 1200, and performs bi-directional communication with the camera section 1100.

Numeral 1204 denotes a power-supply changeover switch for detecting supply of power from an external unit and selecting external power when power is supplied from an external unit and the power supplied from the host terminal 1500 when no power is supplied from an external unit. A motor to be controlled by the tripod head motor control section 1202 is provided for each pan tilting section, which requires a large power in order to operate the pan tilting sections at the maximum speed or drive them at the same time and thus, requires supply of power from an external unit.

Then, the signal processing board 1300 is described below. Numeral 1301 denotes an A-D conversion section for converting a CCD signal transmitted from the camera section 1100 into an image pickup signal and 1302 denotes a video signal processing section for converting an image pickup signal converted into a digital signal into a standardized digital video signal after applying color signal processing to the digital signal. The video signal processing section 1302 communicates the brightness data of an object used for exposure control, data for white balance control, and data for focus control to the system control section 1304 at the cycle of a vertical synchronizing signal (VD) and performs control corresponding to each data. Moreover, the standardized digital signal is sent to the CODEC 1305 together with an audio signal and other data signal supplied from the host terminal 1500 and the CODEC 1305 performs coding and decoding necessary for the video telephone conference system.

Numeral 1303 denotes a control signal CODEC having the same function as the control signal CODEC 1107 and 1304 is a system control section which includes a one-chip microcomputer having functions as a CPU, ROM, RAM, control port, and communication port. The system control section 1304 performs the control of each device of the signal processing board 1300, auto white balance control, communication with the camera section 1100 and communication with the tripod head 1200 through the camera section 1100, and communication with the host terminal 1500 through the bus I/F 1306 and moreover, performs an operation requested from the host terminal 1500 by decoding a command supplied from the terminal 1500. Numeral 1305 denotes a CODEC.

Figure 14:
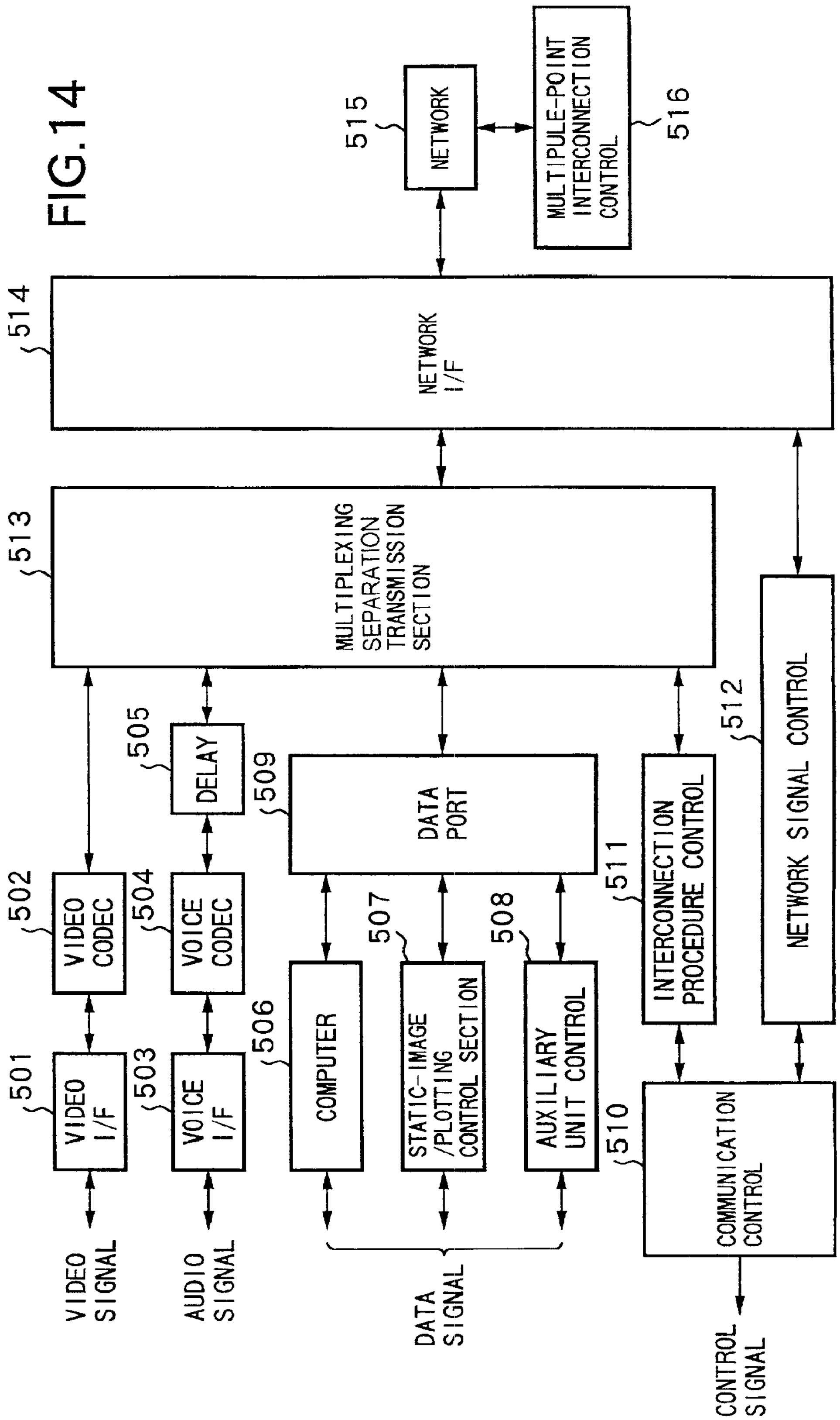
FIG. 14 is a block diagram showing specific examples of the CODEC and communication control section in FIG. 13.

FIG. 14 is a block diagram showing a schematic structure for each function of the CODEC 1305 and a communication control section 1401. In FIG. 14, numeral 501 denotes a video I/F (video input/output section) for inputting a video signal from the video signal processing section 1302, and for outputting a video signal to the host terminal 1500 through the bus I/F 1306, which is provided with image processing functions such as screen division, image synthesis, and character synthesis. Numeral 502 denotes a video CODEC section for coding a video signal supplied from the video I/F 501 and decoding received coded-video information, and 503 denotes an audio I/F (audio input/output) for connecting a loudspeaker and a microphone, which is provided with an audio processing function such as an echo cancel function. Numeral 504 denotes an audio CODEC for coding an audio signal supplied from the audio I/F 503 and decoding received coded audio information.

Numeral 505 denotes a delay processing section for delaying the audio information coded by the audio CODEC 504 and received coded audio information for a predetermined time period, which is used to realize lip-sync with video information. Numeral 506 denotes a computer for realizing an application such as a computer conference function in addition to a basic video conference function, 507 denotes a static-image/drawing control section for controlling static-image transmission or a drawing function, and 508 denotes an auxiliary unit control section for controlling other image processing units. These sections are communicated each other through a data port 509.

Numeral 510 denotes a communication control section which realizes a network access by a mutual connection procedure control section 511 and a function such as end—end control for establishing an operational common mode with a signal for properly operating a terminal by a network signal control section 512. Numeral 513 denotes a multiplexing transmission section for multiplexing video information, audio information, and control information on one bit string and transmitting the bit string or separating items of information into items of multimedia information constituting a received bit string, 514 denotes a network I/F for realizing the adaptation necessary between a network and a terminal, 515 denotes a network of, for example, electric communication lines, and 516 denotes a control section for connecting a video telephone conference system between many points.

To start a video telephone conference by using the above structure, a communication line with a remote terminal is set or secured in accordance with the ordinary procedure. Moreover, after the line is normally connected, the types of the signal processing board 1300, camera section 1100 of the local station, and tripod head section 1200 and state of connection or non-connection are detected and the detected information is transmitted to the remote station as a data signal through the data port 509. After the data is received, the types of the camera sections 1100 and tripod head sections 1200 of the local and remote stations and a control screen corresponding to the connection state are displayed on the monitor screen of the host terminal 1500.

Figure 15:
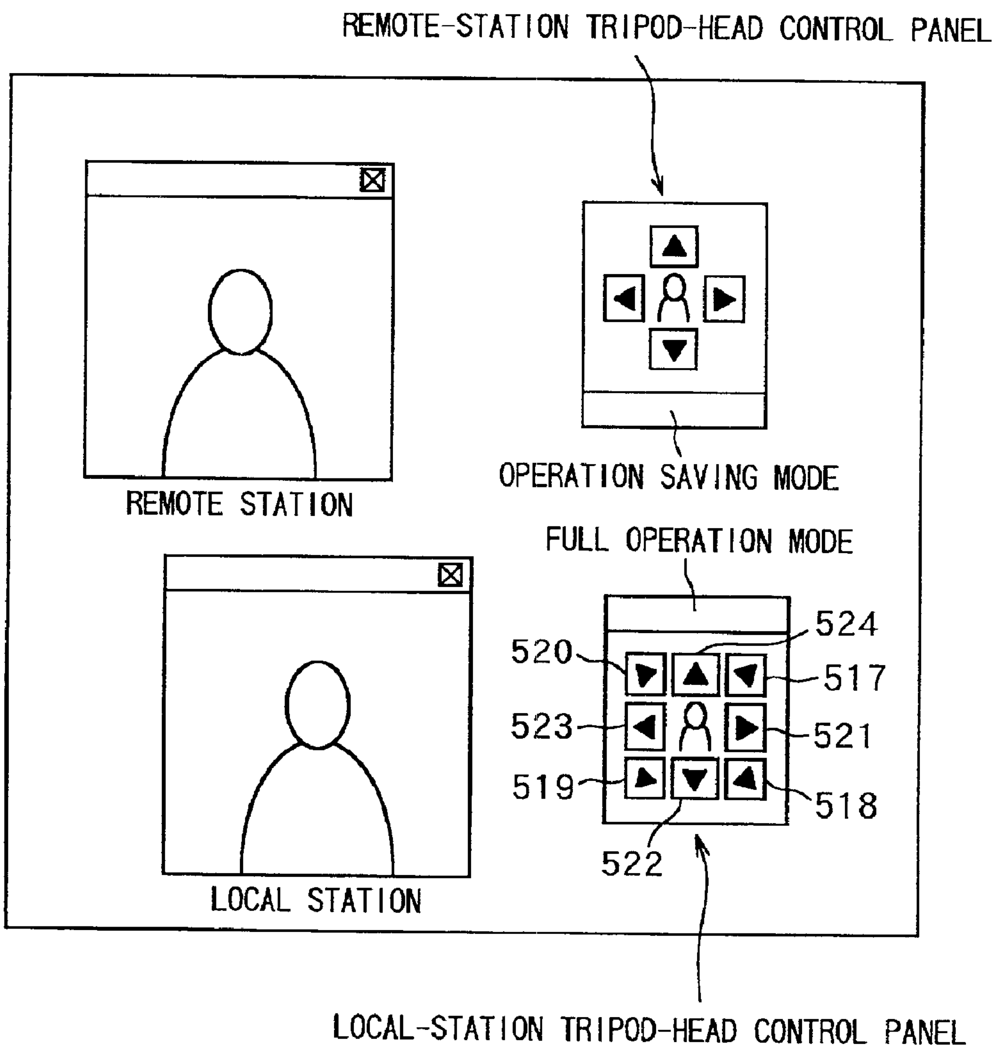
FIG. 15 is an illustration showing display examples of the monitor screen for operating the tripod head of the fifth embodiment.

FIG. 15 is an illustration showing a display example of the monitor screen of the operation section of the fifth embodiment. In this case, it is assumed that external power is previously supplied to the tripod head section 1200 of a local station, but no external power is supplied to the tripod head section 1200 of a remote station. In this case, a full operation mode is displayed on the tripod head control panel of the local station and a panel display appears on which setting of a pan tilting high-speed operation and diagonal driving by buttons 517 to 520, that is, simultaneous driving operation of a pan motor and a tilting motor can be made. Numerals 521 to 524 in FIG. 15 denote rightward, downward, leftward, and upward pan tiling designation buttons in order. However, a power-saving operation mode is displayed on the tripod head control panel of the remote station and an operation panel display appears on which pan tilting consuming a lot of power is switched to a low-speed operation and simultaneous driving operation cannot be performed. That is, only the rightward, downward, leftward, and upward buttons 521 to 524 are displayed and low-speed driving is performed even if these buttons are clicked.

In this case, by supplying external power to the tripod head section 1200 of the remote station in a power saving mode, the supply from an external power is detected by the power-supply changeover switch 1204 and the detection of the external power is notified to the host terminal 1500 through the system control section 1203 of the tripod head section 1200, the system control section 1106 of the camera section 1100, and the system control section 1304 of the signal processing board 1300. The host terminal 1500 receives the notification and displays that the full operation mode is set in stead of the power saving mode for the remote station, and displays the tripod head control panel for the remote station in the full operation mode.

Moreover, the detection of the external power is also notified to the remote station under communication and thereby, the host terminal 1500 of the remote station similarly changes the tripod head control panel on a monitor of the remote station. However, when stopping the supply of the external power to the tripod head section 1200 of a station operating in the full operation mode, it is necessary to perform the same procedure as the above in order to change the full operation mode to the power saving mode.

Thus, the fifth embodiment detects whether an external power (sufficient electric power) is supplied to the tripod head section 1200 serving as image pickup direction control means by the power supply changeover switch section 1204, so as to operate in the low-function mode in which the tripod head section 1200 consumes less power when no external power is supplied (insufficient electric power), and in the normal high-function mode in which the section 1200 consumes more power when the external power is supplied. Moreover, the operation mode of the tripod head section 1200 is displayed on a monitor screen so as to realize an operation corresponding to each mode by the host terminal 1500 serving as image pickup direction operating means.

Thus, it is possible to operate the tripod head section 1200 as the full spec function of a tripod head when external power is supplied, and to operate the section 1200 by removing some functions from the section 1200 in the power saving mode by supplying power to the section 1200 from the host terminal 1500 when no external power is supplied. Therefore, it is possible to properly operate the camera section 1100 serving as an image pickup apparatus in accordance with the situation (conditions of electric power).

Sixth Embodiment

Figure 16:
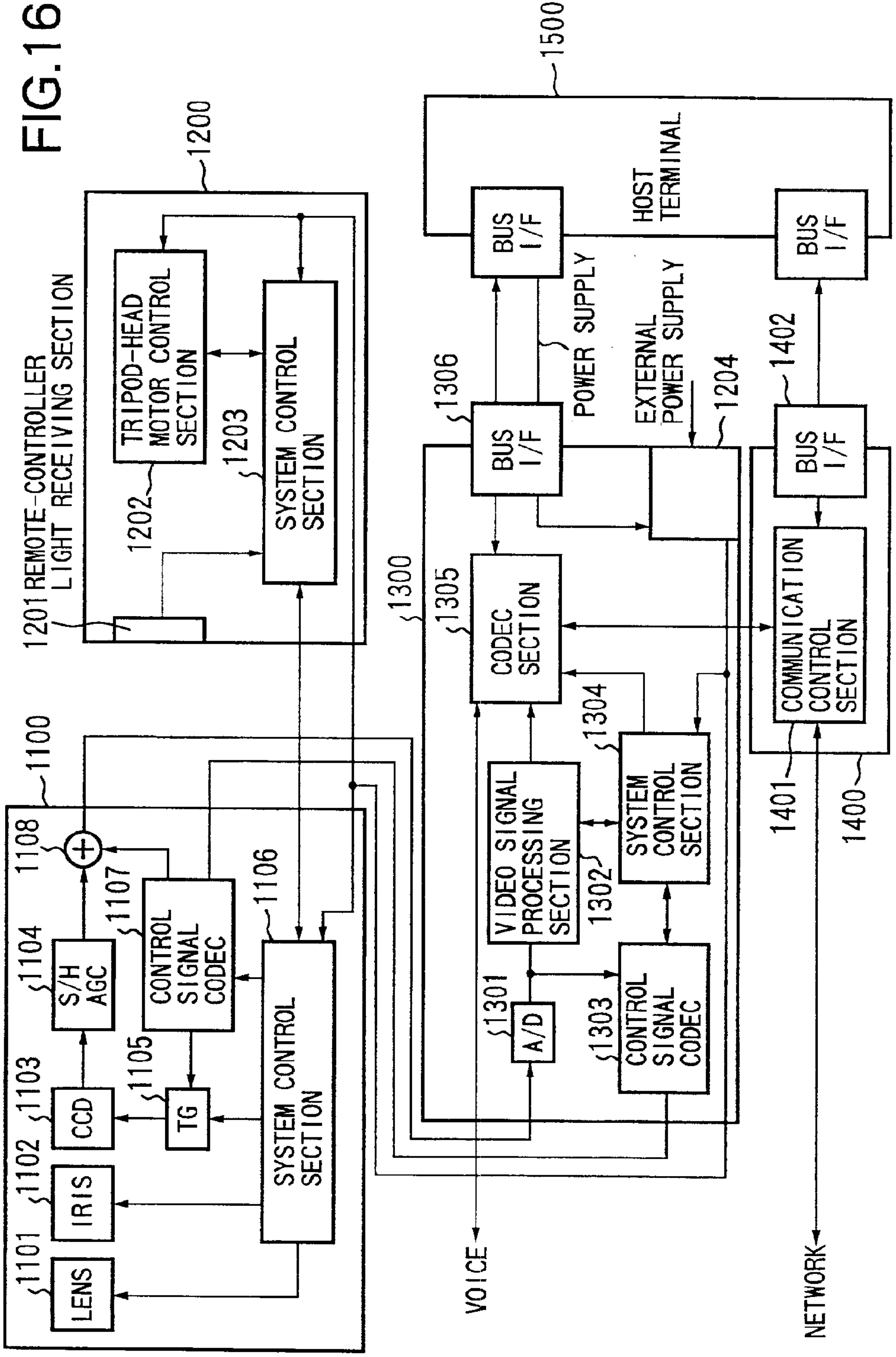
FIG. 16 is a block diagram showing the structure of a sixth embodiment of the present invention.

FIG. 16 is a block diagram showing the structure of the sixth embodiment of the present invention. Though the fifth embodiment is constituted so that the power 11, supply changeover switch 1204 is provided for the tripod head section 1200 to supply external power, the sixth embodiment is constituted by providing the switch 1204 with the signal processing board 1300. That is, the electric power from the host terminal 1500 and the electric power from an external unit are changed by the signal processing board 1300 so as to send signals as well as electric power to the camera section 1100 and tripod head section 1200.

Operations of the sixth embodiment are the same as those of the fifth embodiment. However, by supplying external power to the signal processing board 1300 integrated with the host terminal 1500, it is possible to unify the cables connected to the separated camera section 1100 and tripod head section 1200.

Seventh Embodiment

Figure 17:
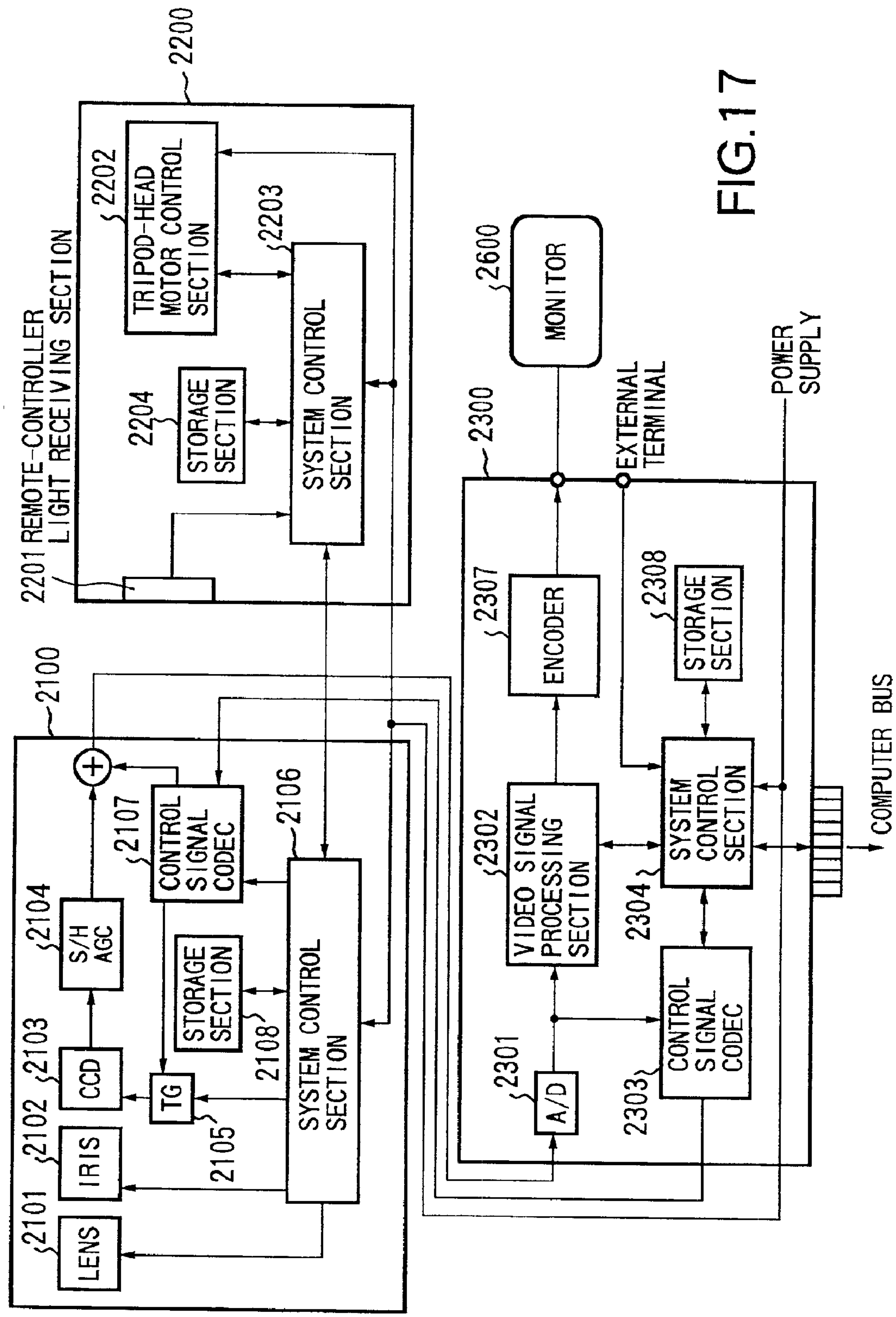
FIG. 17 is a block diagram of a video input unit of a seventh embodiment of the present invention.

FIG. 17 is a block diagram of the video input unit of the seventh embodiment of the present invention. In FIG. 17, numeral 2100 denotes a camera section, 2200 denotes a tripod head section, 2300 denotes a signal processing section, and 2600 denotes a monitor for outputting a video. The camera section 2100 and the tripod head section 2200 are connected each other by a bi-directional control signal line. The camera section 2100 and the signal processing section 2300 are connected by a signal line in which a control signal is multiplexed on a video signal in the direction from the camera section 2100 to the signal processing section 2300 and by a video synchronizing signal (Sync) line and a control signal line in the opposite direction to the above direction. Moreover, the signal processing section 2300 has an external control terminal such as a RS232C to control the signal processing section 2300, tripod head section 2200, and camera section 2100. Furthermore, by supplying electric power to the camera section 2100 and tripod head section 2200 through the signal processing section 2300, it is possible to bundle the above signal lines into one cable.

Figure 18A:
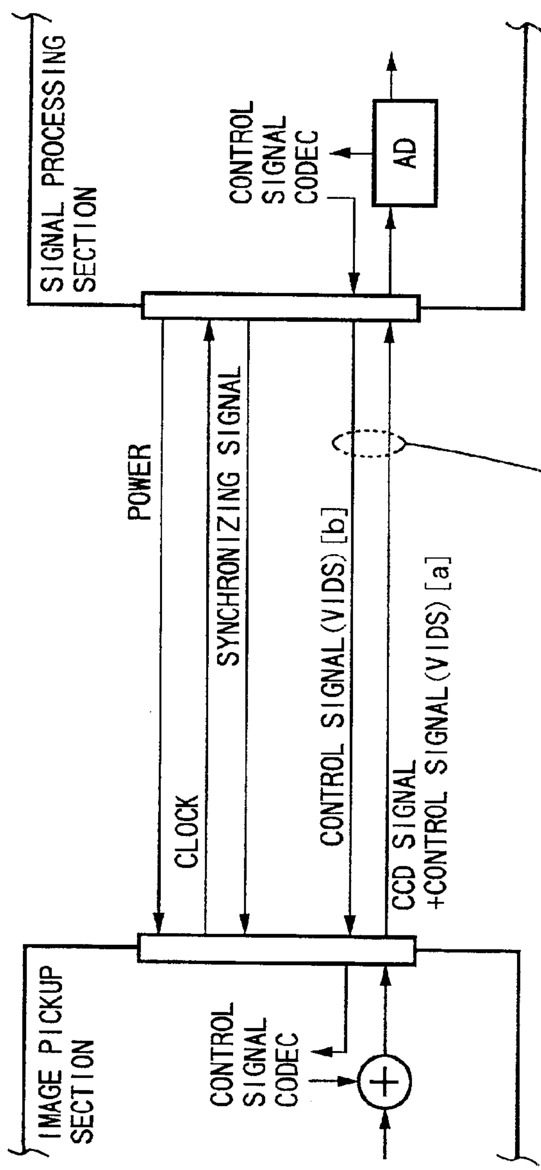
FIGS. 18A and 18B are detail drawings of the communication section of the video input unit of the seventh embodiment.
Figure 18B:
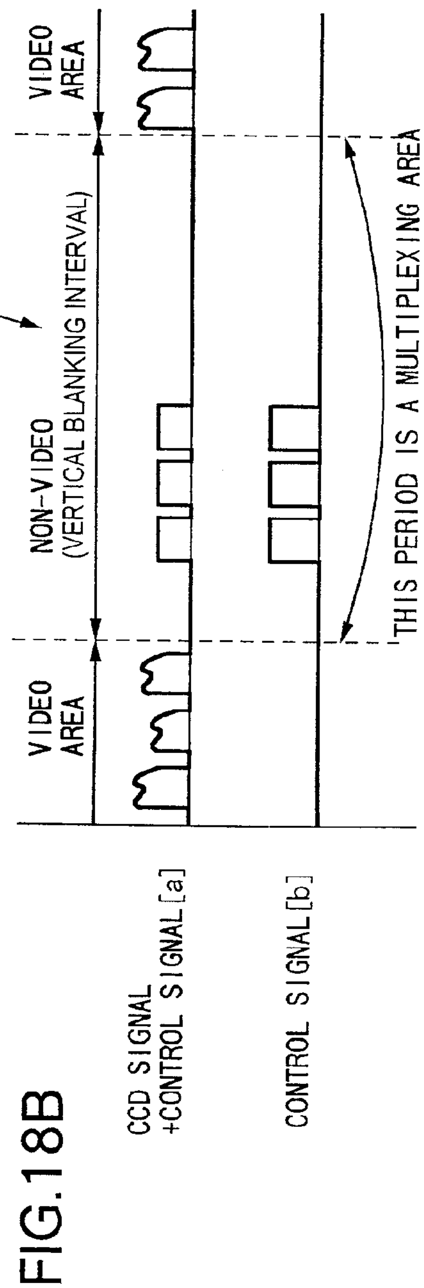

The structure of the camera section 2100 is described below. Numeral 2106 denotes a system control section which includes a one-chip microcomputer having functions as a CPU, ROM, RAM, control port, and communication port, controls each device of the camera section 2100, and performs bi-directional communication with the tripod head section 2200 and signal processing board section 2300. Numeral 2101 denotes a lens section provided with zooming and focusing functions, 2102 denotes an iris section for controlling the incident light passing through the lens section 2101, and 2103 denotes an image pickup device such as a CCD for converting an optical image via the lens section 2101 and iris section 2102 into an electric signal by means of photoelectric conversion. Numeral 2104 denotes an S/H AGC for sampling an image pickup signal supplied from the image pickup device 2103, performing holding in order to reduce noises and adjust gain, and 1205 denotes an image pickup device driving section such as a TG timing generator for controlling the storing operation, reading operation, and resetting operation in accordance with the number of pixels of the image pickup device 2103. Numeral 2107 denotes a synchronizing-division and control-signal-CODEC for separating a horizontal synchronizing signal (HD) and a vertical synchronizing signal (VD) from Sync supplied from the signal processing section 2300, and sending them to an image pickup device driving section 2105, and determining the timing for driving the image pickup device 2103, and superimposing a control signal supplied from the system control section 2106 on the vertical blanking interval of a CCD signal, or fetching a control signal superimposed on the vertical blanking interval of a CCD signal supplied from the signal processing section 2300, and for sending it to the system control section 2106. A CCD signal supplied from the S/H AGC 2104 is transmitted to the signal processing section 2300 by multiplexing a control signal supplied from the control signal CODEC 2107. FIGS. 18A and 18B are illustrations showing the communication method between the camera section 2100 and the signal processing section 2300 in detail. Numeral 2108 denotes a storing section for storing the information for algorithms of the auto-focus control of the lens 2101 and the shutter speed control performed by controlling the cam trace of zooming operation or a TG, which is a memory such as an EEPROM. The system control section 2106 controls the above sections in accordance with the above information.

Then, the tripod head section 2200 is described below. Numeral 2203 denotes a system control section which includes a one-chip microcomputer having the functions as a CPU, ROM, RAM, control port, and communication port, controls each device of the tripod head section 2200, and performs bi-directional communication with the camera section 2100. Numeral 2201 denotes a remote-control light receiving section for receiving infrared light from a wireless remote controller and notifying the system control section 2203, and 2202 denotes a tripod head motor control section for driving a motor for making a tripod head perform the pan tilting operation in accordance with the control by the system control section 2203. Numeral 2204 denotes a storing section for storing direction control characteristic information similarly to the section 2108. The system control section 2203 controls a pan-tilting tripod head motor.

Then, the signal processing section 2300 is described below. Numeral 2304 denotes a system control section which includes a one-chip microcomputer having the functions as a CPU, ROM, RAM, control port, and communication port and performs the control of each device of the video signal processing section 2300, auto white balance control, the communication with the camera section 2100 and with the tripod head section 2200 through the section 2100, and the communication with an external unit through an external control terminal. Moreover, the section 2304 performs a requested operation by decoding a command supplied from an external unit. Numeral 2301 denotes an A-D conversion section for converting a CCD signal transmitted from the camera section 2100 into a digital signal, and 2302 denotes a video signal processing section for converting an image pickup signal converted into a digital signal into a standardized digital video signal after applying the color signal processing to the image pickup signal converted into the digital signal. The video signal processing section 2302 notifies the system control section 2304 of the brightness data of an object to be used for exposure control, the data for white balance control, and the data for focus control at the cycle of a vertical synchronizing signal (VD) and performs the control according to each data. The system control section 2304 has the same function as the control signal CODEC 2107. Numeral 2308 denotes a signal-processing-information storing section similar to the sections 2108 and 2204. The system control section 2304 performs color processing, white balance correction, and (conversion in accordance with algorithms written in the storing section 2308. The standardized digital signal is converted into a video composite signal by an encoder 2307 and output to the monitor 2600 via an output terminal.

Figure 19:
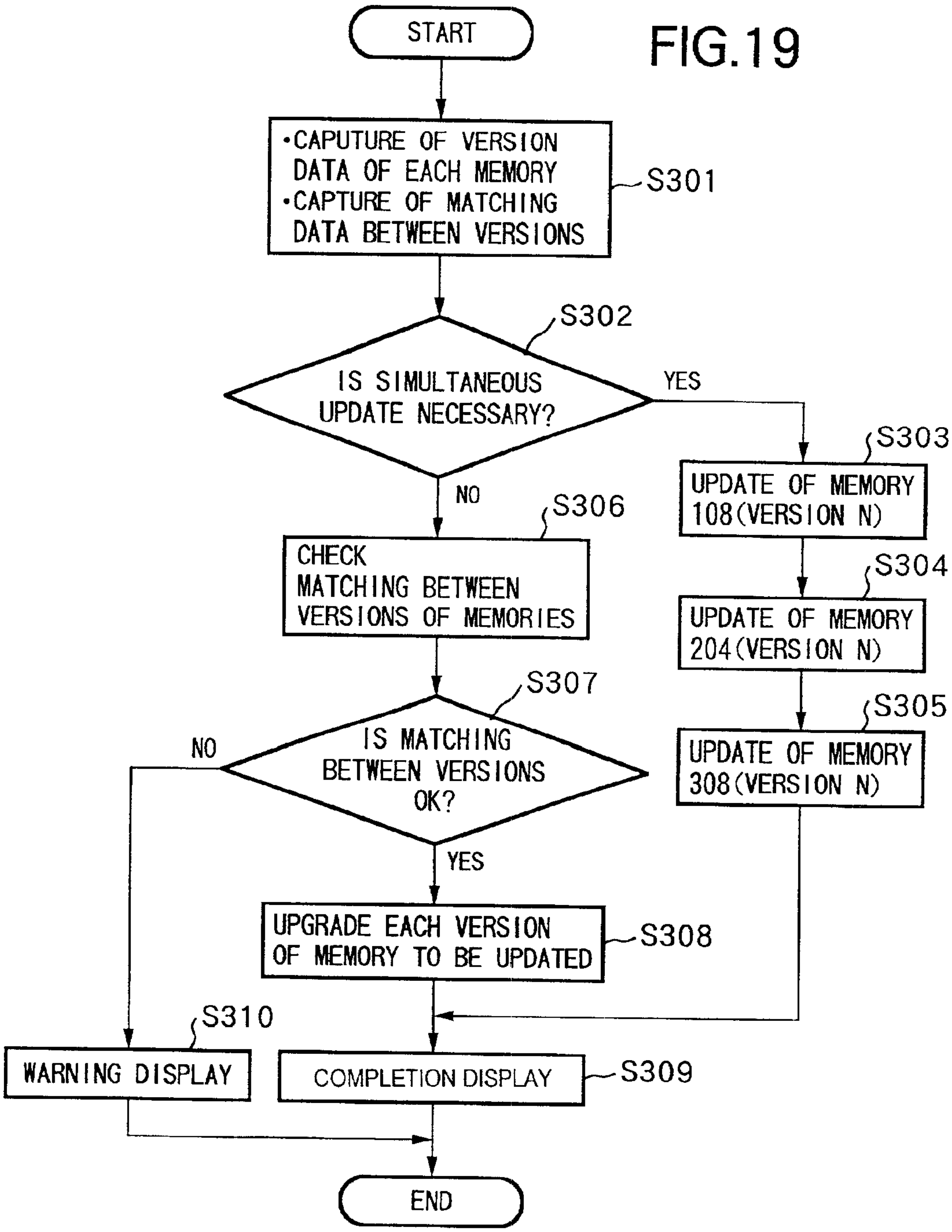
FIG. 19 is a flow chart for updating the control information of the seventh embodiment of the present invention.

In the case of the above structure, the operation is described below which updates at least some of the algorithms and information written in the control information storing sections 2108, 2204 and the signal processing information storing section 2308. In this case, in a step S301 in FIG. 19, pieces of version information written in the storing section 2108 of the camera section 2100, storing section 2204 of the tripod head section 2200, and storing section 2308 of the signal processing section 2300 at the present point of time are stored in the system control section 2304 in accordance with the initial communication (during V blanking) between the sections at the start of the operation of the camera system. First, the information indicating whether the touching operation between each item of control information to be updated and the control information of the previous version can be performed, is also sent to the system control section 2304 by an external unit through an external terminal. In this case, to rewrite the data values stored in such three sections as the storing section 2108 of the camera section 2100, storing section 2204 of the tripod head section 2200, and storing section 2308 of the signal processing section 2300 (S302), it is necessary to send each item of control information to the system control section of each section during the vertical blanking interval and write each item of control information in each storing section in order (step S303 to step S305). However, to update the data stored only in one storing section or two storing sections, version collation is performed by the system control section 2304. That is, the combination of the version of the control information stored at the present point of time without being updated with the version of the control information to be written is collated with the operable information sent together (step S306). When operation can be performed (step S307), the writing operation is respectively started (step S308). When the writing operation is completed, the notification of completion of the writing operation (step S309) is sent to an external unit via an external terminal. When there is control information of an inoperable version, the notification showing that the combination cannot be operated (S310) is sent to the external unit through the external terminal. Thereby, a proper version-up operation can be performed.

Eighth Embodiment

Then, the eighth embodiment of the present invention is described below by referring to FIG. 20.

Figure 20:
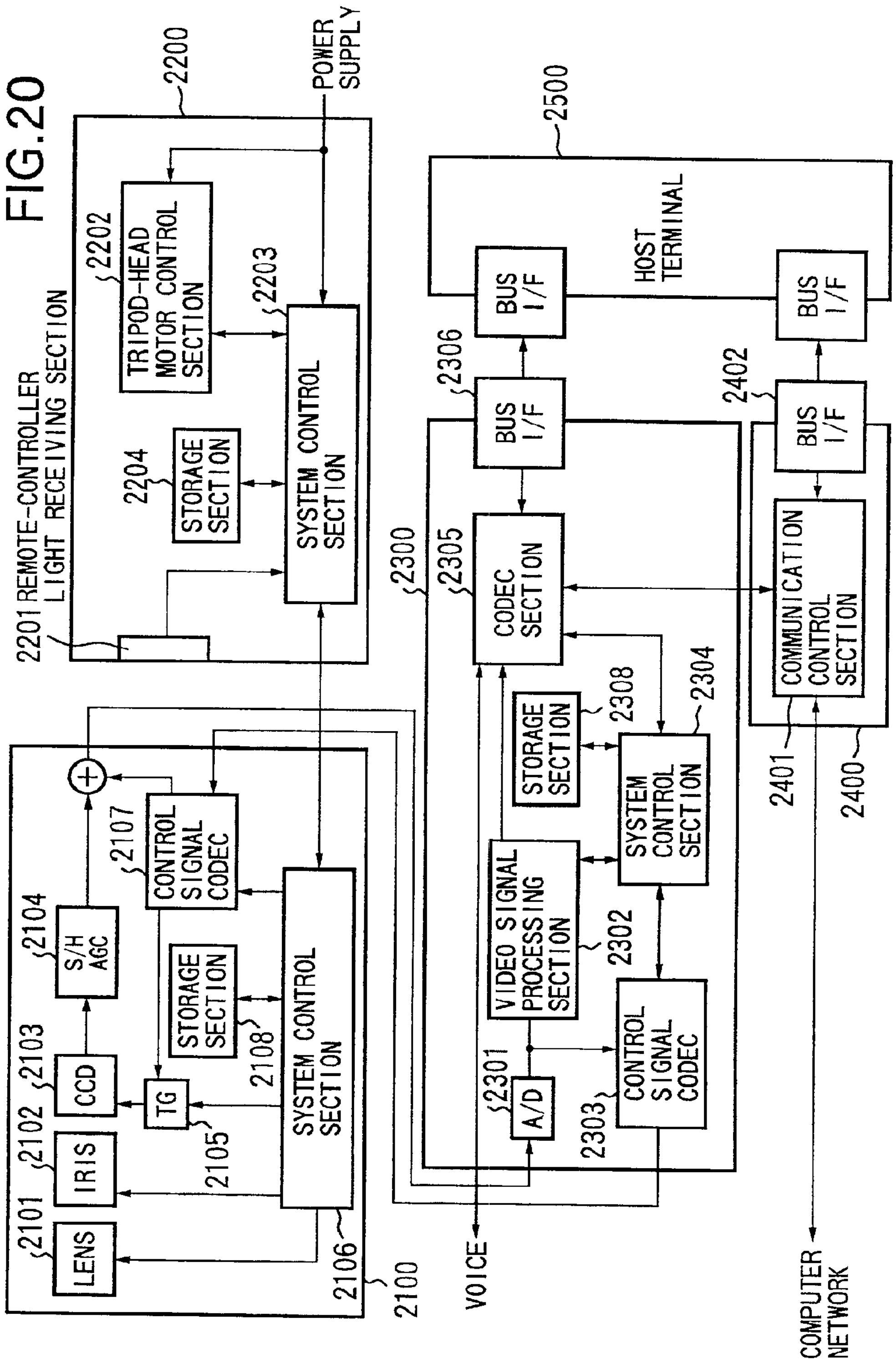
FIG. 20 is a block diagram of a video input unit of a eighth embodiment of the present invention.

In FIG. 20, numeral 2100 denotes a camera section, 2200 denotes a tripod head section, 2300 denotes a signal processing board having an extension board shape to be inserted into the extension slot of a computer, 2400 denotes a communication board for performing communication control and the like, and 2500 denotes a host terminal of a PC or the like. The camera section 2100 and the tripod head section 2200 are connected each other by a bi-directional control signal line. The camera section 2100 and the signal processing board 2300 are connected each other by a signal line in which a control signal is multiplexed on a video signal in the direction from the camera section 2100 to the signal processing board 2300 and by a video synchronizing signal (Sync) and a control signal line in the opposite direction to the above direction. Moreover, the signal processing board 2300 and the communication board 2400 are connected each other by data-signal and control-signal lines and moreover respectively connected with the host terminal 2500 by bus I/Fs 2306 and 2402. The signal processing board 2300, the tripod head section 2200 and camera section 2100 are controlled from the host terminal 2500 via the bus I/F 2306 and similarly, the communication board 2400 is controlled via the bus I/F 2402. Moreover, by supplying electric power to the camera section 2100 and tripod head section 2200 from the host terminal 2500 through the signal processing board 2300 via the bus I/F 2306, the above signal lines can be bundled into one cable.

The camera section 2100 and tripod head section 2200 are the same as those of the seventh embodiment. The signal processing board 2300 is provided with a CODEC 2305 necessary for a video telephone conference instead of the encoder 2307 of the seventh embodiment. That is, a standardized digital signal supplied from the video signal processing section 2302 is sent to the CODEC 2305 together with an audio signal and other data signals supplied from the host terminal 2500 and the CODEC 2305 performs the processings such as coding and decoding necessary for the video telephone conference.

Because functions of the CODEC 2305 and communication control section 2401 are the same as those described in FIG. 14, their description is omitted.

To start a video telephone conference, a communication line with a remote terminal is set or secured. After the line is normally connected, the control information to be updated is sent to the storing section 2308 of the remote signal processing board 2300 through the communication of data signals for the video telephone conference. The update procedure is the same as the case of the seventh embodiment. It is a matter of course that success or fail of the update is communicated to a remote station through the video telephone conference.

Ninth Embodiment

Figure 21:
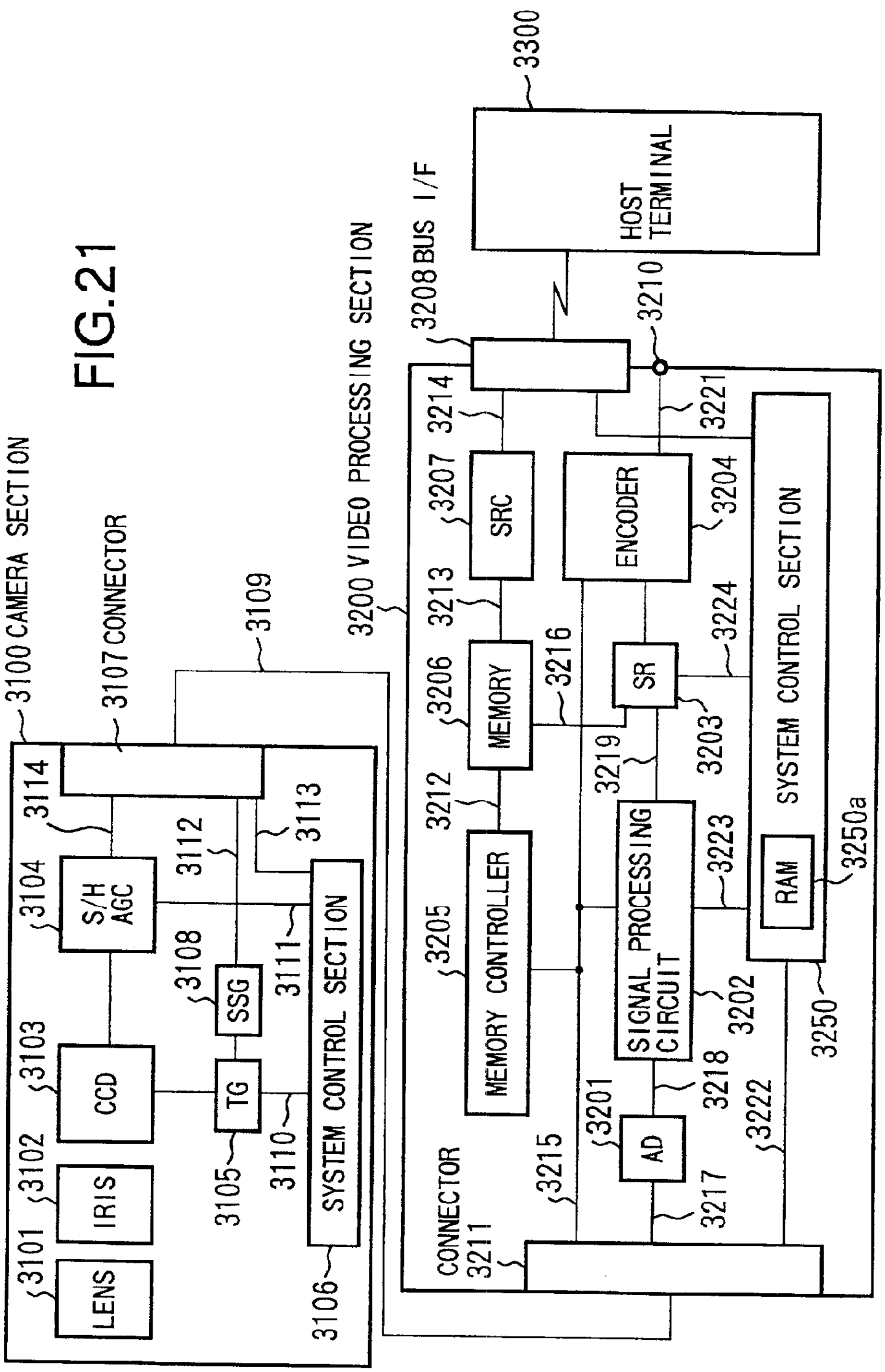
FIG. 21 is a block diagram showing the structure of video input unit of a ninth embodiment of the present invention.

FIG. 21 is a block diagram showing the structure of the video input unit of the ninth embodiment of the present invention.

As shown in FIG. 21, the video input unit of the ninth embodiment comprises a camera section 3100 for picking up an object, a video processing section 3200 for capturing an image pickup signal of the object supplied from the camera section 3100 and generating a video signal by applying the video processing to the image pickup signal in accordance with a video processing parameter, and a cable 3109 for connecting the camera section 3100 with the video processing section 3200 so as to realize bi-directional communication. The cable 3109 is detachable to the camera section 3100 and video processing section 3200.

The camera section 3100 has a lens 3101 comprising an optical lens group provided with a focus adjustment mechanism and a zoom mechanism. An optical image captured by the lens 3101 is focused on the image pickup plane of a CCD 3103 after passing through an iris 3102 for adjusting an amount of an incident light of the optical image.

The CCD 3103 converts the optical image focused on the image pickup plane by means of photoelectric conversion into a corresponding electric signal and outputs the electric signal. The electric-charge storing operation, reading operation, and resetting operation of the CCD 3103 are controlled by a TG (timing generator) 3105. The TG 3105 executes the electronic shutter function for changing shutter speeds by controlling the CCD 3103 and moreover, outputs a clock signal used to generate horizontal and vertical synchronizing signals or the like. The clock signal is input to an SSG (synchronizing signal generator) 3108 and the SSG 3108 generates a horizontal synchronizing signal (HD), vertical synchronizing signal (VD), and video synchronizing signal 3112. The CCD 3103 is controlled by the TG 3105 in accordance with a control signal 3110 supplied from a system control section 3106.

An electric signal output from the CCD 3103 is supplied to an S/H AGC 3104. The S/H AGC 3104 performs the sample-and-hold operation for the electric signal, adjust the gain of the electric signal, and outputs an analog image pickup signal 3114. Operations of the S/H AGC 3104 are controlled in accordance with a control signal 3111 supplied from the system control section 3106.

The system control section 3106 controls each of the above blocks and performs the communication control for transferring data 3113 to and from a system control section 3250 of the video processing section 3200 to be described later through a connector 3107 and a cable 3109. The data 3113 includes a plurality of video processing parameters used for video processing to be described later and the number of pixels of the image pickup device 3103, the spectral characteristic and arrangement of a color filter, the sensitivity of an image pickup device, the response and optical characteristic of a lens, the data showing whether a zoom lens is used, zoom ratio data, iris data, and the data for cam trace of zoom. The value of each video processing parameter is set in accordance with the image pickup characteristic determined by each structure of the camera section 3100 and the difference between image pickup characteristics due to the fluctuation of performances of the CCD 3103 and the like constituting the camera section 3100 is absorbed by the set value. The value of each video processing parameter is calculated by the video processing section 3200 and thereafter, communicated from the video processing section 3200, and held by the system control section 3106 by making the value correspond to the ID (identification information) provided for the video processing section 3200. The system control section 3106 holds the initial value of each video processing parameter set at the time of shipping from a factory together with the value of each calculated video-processing parameter. Specifically, the system control section 3106 holds the values of the video processing parameters calculated by the video processing section 3200 by making them correspond to the ID provided for the video processing section 3200, decides whether a video processing parameter made to correspond to the ID supplied from the video processing section 3200 is held in accordance with the ID, and notifies the video processing section 3200 of corresponding information in accordance with a decision result. For example, when the decision result shows holding of a video processing parameter made to correspond to a sent ID to which the decision result is sent, the system control section 3106 notifies the video processing section 3200 to hold the value of the video processing parameter made to correspond to the ID. When the decision result shows holding of no video processing parameter made to correspond to the sent ID, the section 3106 notifies the video processing section 3200 of the information showing holding of no video processing parameter made to correspond to the sent ID.

The analog image pickup signal 3114 is output to the video processing section 3200 together with the video synchronizing signal 3112 including a horizontal synchronizing signal (HD) and vertical synchronizing signal (VD) through the connector 3107 and cable 3109. An end of the cable 3109 is connected to the connector 3107.

The video processing section 3200 has a connector 3211 removably connecting the other end of the cable 3109 and an analog image pickup signal 3217 (same as the analog image pickup signal 3114) transmitted from the camera section 3100 through the cable 3109 is input to an analog-to-digital conversion circuit (hereafter referred to as AD) 3201. The AD 3201 converts the input analog image pickup signal into a digital image pickup signal 3218 and the digital image pickup signal 3218 is supplied to a signal processing circuit 3202. The signal processing circuit 3202 performs the video processing for converting the digital image pickup signal 3218 into a digital video signal 3219 according to a predetermined standard. In the case of this video processing, the exposure data (brightness), white balance data, and focus data of an object are calculated from the digital image pickup signal 3218 and the while balance control processing and color adjustment processing are performed by adjusting these data values in accordance with corresponding video processing parameters to generate the digital video signal 3219 according to the predetermined standard.

By adjusting the camera section 3100 in accordance with corresponding video processing parameters, such as the exposure (brightness) data, white balance data, and focus data of the object, the difference between image pickup characteristics due to the fluctuation of performances of the CCD 3103 and the like constituting the camera section 3100 is absorbed. The value of each video processing parameter is calculated in accordance with the processing procedure shown in FIG. 24 to be described later and stored in the camera section 3100 and also written in a RAM area 3250*a* in the system control section 3250. The signal processing circuit 3202 properly reads a video processing parameter from the RAM area 3250*a* in the system control section 3250.

The signal processing circuit 3202 generates an interrupt signal for transmitting the exposure data, white balance data, and focus data of an object to the system control section 3250 synchronously with a vertical synchronizing signal (VD) included in the video synchronizing signal 3215. When recognizing the interrupt signal, the system control section 3250 captures each data value from the signal processing circuit 3202 according to necessity and writes the captured data in the RAM area 3250*a*. Moreover, the section 3250 sends a control signal for controlling AE and AF of the camera section 3100 to the camera section 3100 in accordance with the captured data.

The digital video signal 3219 output from the signal processing circuit 3202 is input to a changeover switch (hereafter referred to as SR) 3203 together with a digital video signal 3216 supplied from a memory 3206 to be mentioned later. The SR 3203 performs switching operation so as to output either of the digital video signal 3219 or a digital video signal 3216 to an encoder 3204 and moreover, and further performs switching operation so as to output the input digital video signal 3219 to either of the memory 3206 or the encoder 3204. The switching operation of the SR 3203 is controlled by a control signal 3224 supplied from the system control section 3250.

When the memory 3206 is selected as an output destination of the digital video signal 3219 by the SR 3203, the digital video signal 3219 is written in the memory 3206 as the digital video signal 3216. When the digital video signal 3216 stored in the memory 3206 is selected as an input signal by the SR 3203, the digital video signal 3216 is read from the memory 3206. The operations for reading and writing the digital video signal 3216 from and into the memory 3206 are controlled in accordance with the control signal 3212 supplied from a memory controller 3205 and the control signal 3212 is generated by the memory controller 3205 synchronously with the video synchronizing signal 3215.

As described above, a digital video signal to be stored in the memory 3206 is a digital video signal supplied from the signal processing circuit 3202 or a digital video signal output from a scan rate converter (hereafter referred to as SRC) 3207, and a digital video signal output from the SRC 3207 is a signal transferred from a host terminal 3300 to be described later. The SRC 3207 converts a digital video signal 3213 supplied from the memory 3206 into a digital video signal 3214 corresponding to the aspect ratio of the host terminal 3300, transfers the digital video signal 3214 to the host terminal 3300 through a bus interface (Bus i/f) 3208, converts the digital video signal 3214 transferred from the host terminal 3300 through the bus i/f 3208 into the digital video signal 3213 corresponding to the aspect ratio of a monitor to be described later (not illustrated), and transmits the digital video signal 3213 to a memory 3206. Thus, a digital video signal is transferred between the system control section 3250 and the host terminal 3300 through the bus i/f 3208 and bi-directional data communication is performed between the system control section 3250 and the host terminal 3300. The host terminal 3300 performs the input/output processing of digital video signals and moreover, performs the communication control for transferring data including an operation command to and from the system control section 3250. Moreover, the host terminal 3300 of the embodiment can rewrite the data in the system control section 3106 through the bus i/f 3208, system control section 3250, and cable 3109. Therefore, it is possible to easily upgrade the version of the above camera characteristic data at any time.

However, when the encoder 3204 is selected as an output destination of the digital signal 3219 by the SR 3203, the encoder 3204 performs the processing for converting a composite signal 3221 obtained by multiplexing the digital video signal 3219 and the composite signal 3221 is output to a connector 3210 for connecting a monitor (not illustrated) or the like. Similarly, when the digital video signal 3216 stored in the memory 3206 is selected as an input signal by the SR 3203, the digital video signal 3216 read from the memory 3206 is input to the encoder 3204, converted into a composite signal 3221, and then output to a monitor through the connector 3210.

As described above, the system control section 3250 controls each block of the video processing section 3200, calculates each video processing parameter, transmits the parameter and the ID provided for the video processing section 3200 to the camera section 3100, transfers data 3222 to and from the camera section 3100, communicates with the host terminal 3300, and performs an operation corresponding to an operation instruction supplied from the host terminal 3300.

Figure 22:
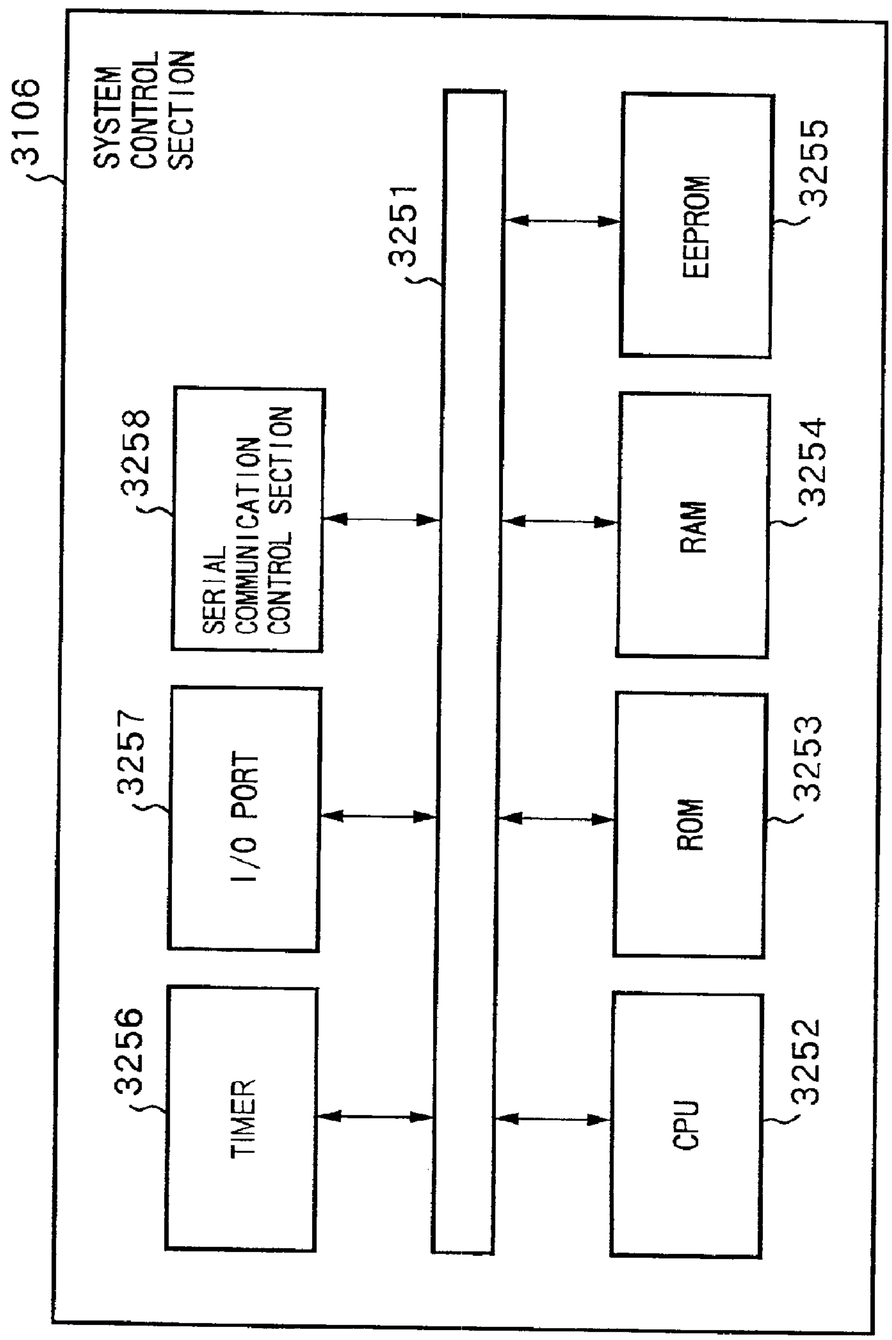
FIG. 22 is a block diagram showing the structure of the system control section of the camera section of the video input unit in FIG. 21.

Then, the structure of the system control section 3106 of the above camera section 3100 is described below by referring to FIG. 22. FIG. 22 is a block diagram showing the structure of the system control section 3106 of the camera section 3100 in the video input unit in FIG. 21.

As described above, the system control section 3106 of the camera section 3100 holds the value of the video processing parameter calculated by the video processing section 3200 by making the value correspond to the ID provided for the video processing section 3200, and determines whether the video processing parameter made to correspond to the ID sent from the video processing section 3200 is held in accordance with the ID, and notifies the video processing section 3200 of corresponding information in accordance with the result of the determination.

Specifically, the system control section 3106, as shown in FIG. 22, has a CPU 3252 for executing operations and processings in accordance with programs stored in a ROM 3253 and the programs stored in the ROM 3253 include a program for executing the above contents and a program for controlling the entire camera section 3100. A RAM 3254 is used as an operation area for operations and processings by the CPU 3252 and an EEPROM 3255 is used as an area for holding video processing parameters.

The CPU 3252 connects with an I/O port 3257 for transmitting a control instruction and the like for each block of the camera section 3100, a timer section 3256 for generating the operation timing of the CPU 3252, and a serial communication control section 3258 for controlling the transmission of a control instruction for each block of the camera section 3100 and performs bi-directional communication between the CPU 3252 and the video processing section 3200 through an internal bus 3251.

Figure 24:
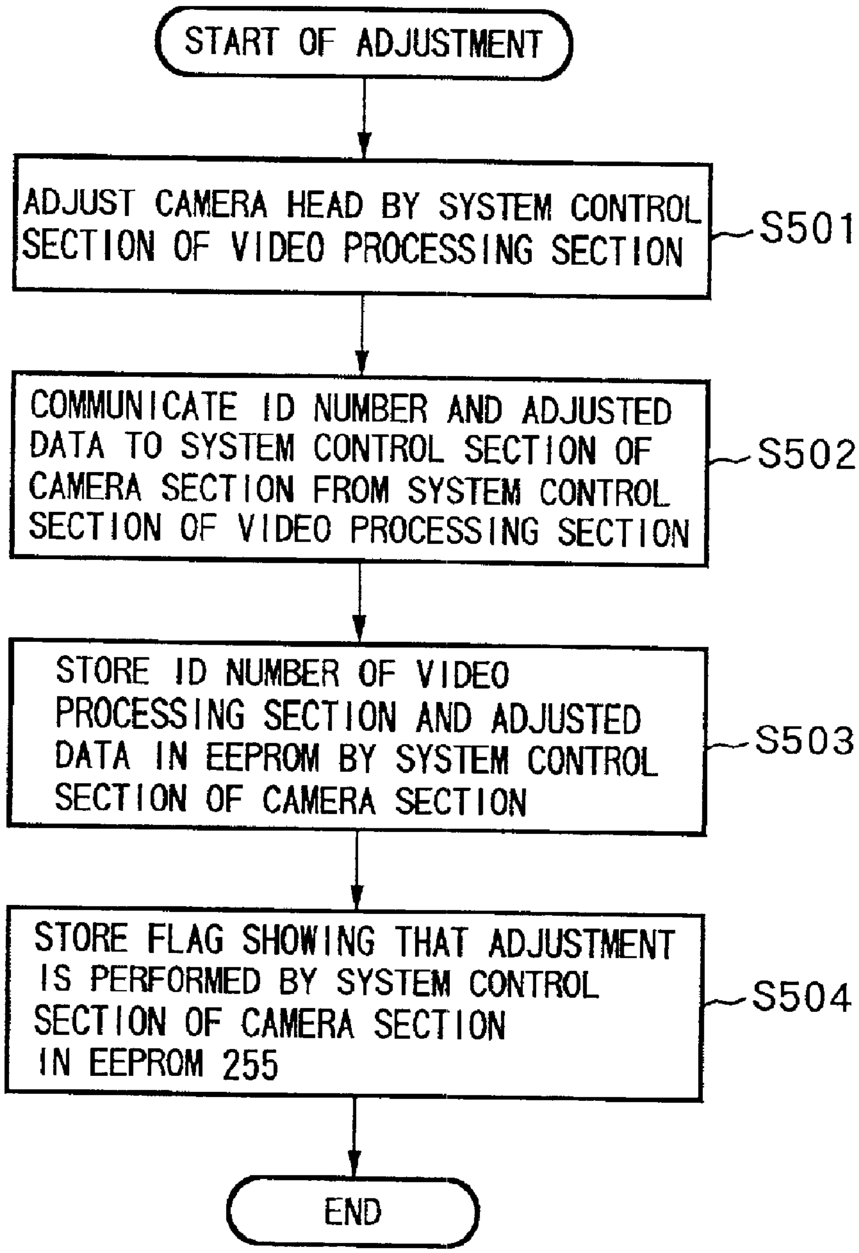
FIG. 24 is a flow chart showing data adjustment processing starting from the calculation of a video processing parameter value by the video processing section of the video input unit of the ninth embodiment ending after the storing of the parameter value in the camera section of the video input unit.
Figures 25A, 25B:
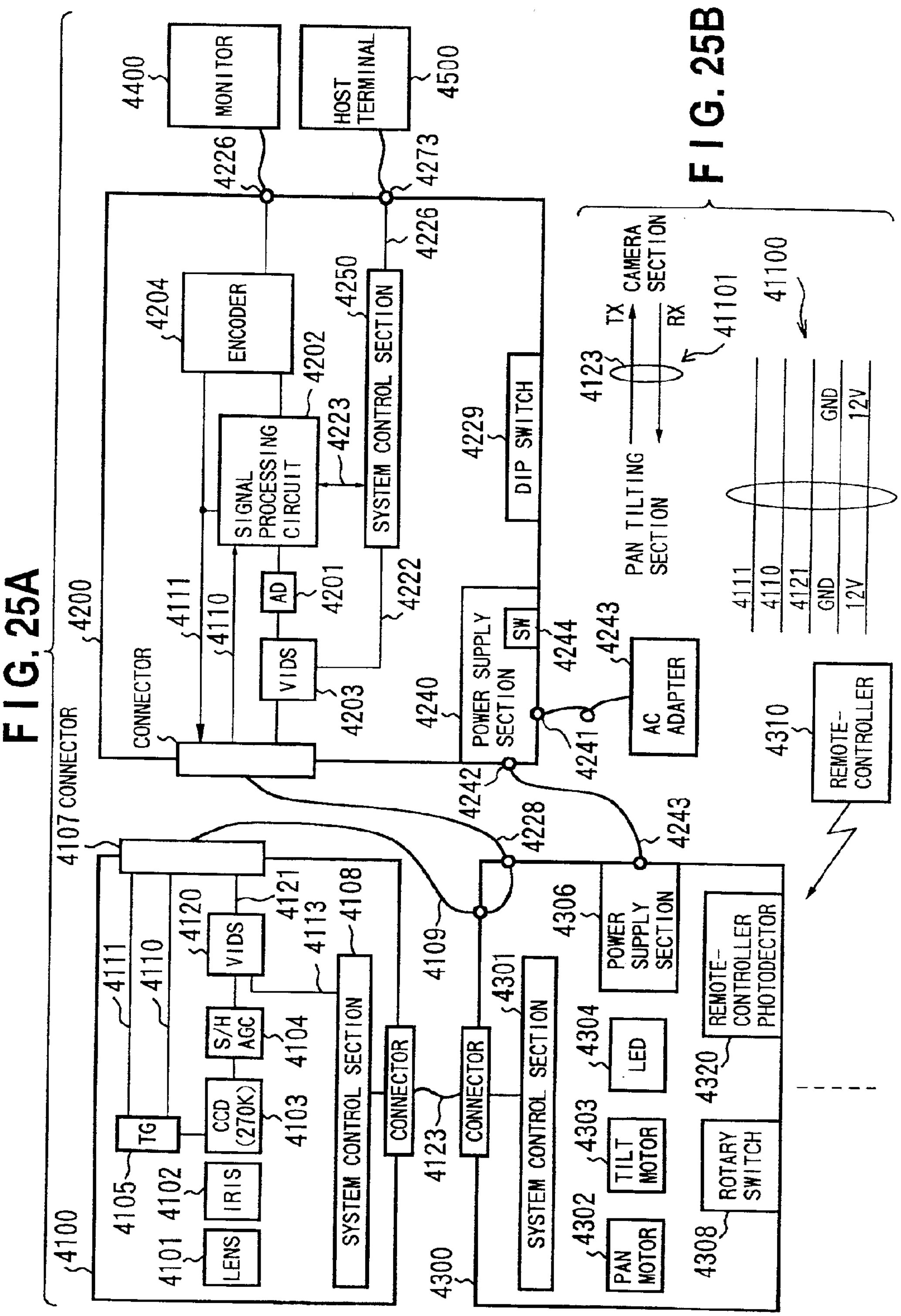
FIGS. 25A–25D are block diagrams showing the structure of an image pickup apparatus of a tenth embodiment.
Figure 25C:
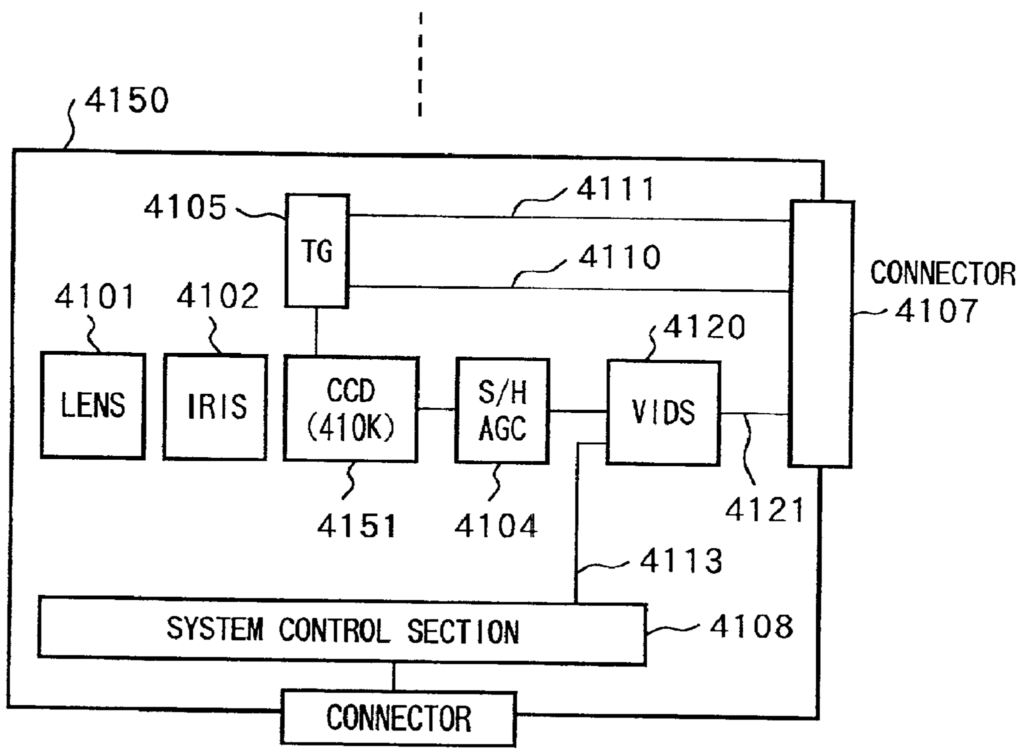
Figure 25D:
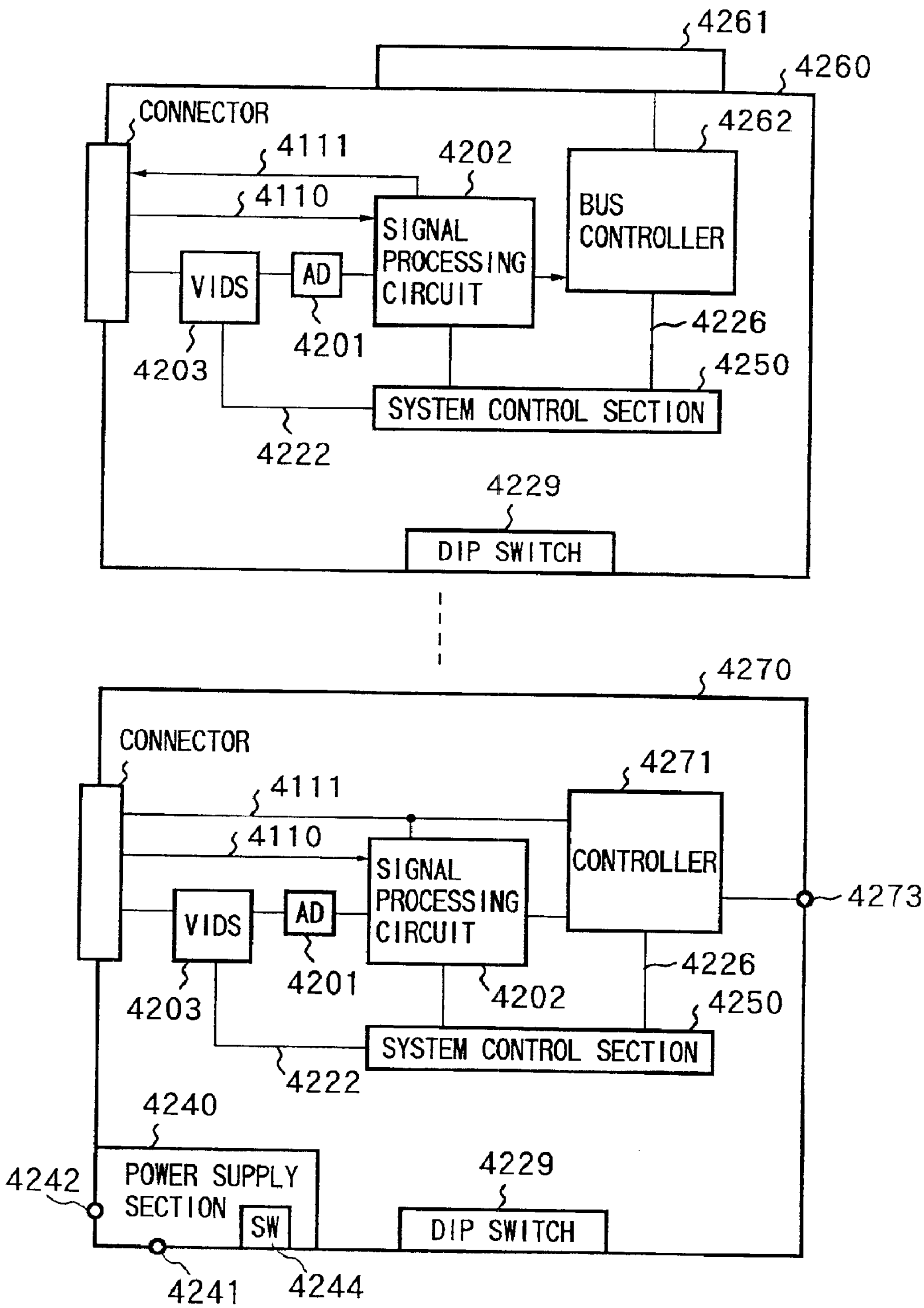

Then, the data adjustment processing starting from the calculation of video processing parameter values by the video processing section 3200 of the present video input unit ending after the storing of the parameter values in the camera section 3100 is described below by referring to FIG. 24. FIG. 24 is a flow chart showing the data adjustment processing staring from the calculation of video processing parameter values by the video processing section 3200 of the video input unit in FIG. 21, ending after the storing of the parameter values in the camera section 3100 in FIG. 21.

When the camera section 3100 is connected to the video processing section 3200 through the cable 3109, each video processing parameter is adjusted to absorb the difference between image pickup characteristics due to the fluctuation of performances of the CCD 3103 and the like included in the camera section 3100, and this adjustment is performed by using a predetermined color temperature chart and a color bar in the combination of the camera section 3100 with the video processing section 3200.

In the case of the above adjustment, as shown in FIG. 24, the video processing section 3200 first calculates the value of each video processing parameter (e.g. white balance data) for the camera section 3100 connected by using the predetermined color temperature chart and color bar as data adjustment (step S501).

Then, the video processing section 3200 informs the adjusted data which is the calculated value of each video processing parameter and the ID number of the video processing section 3200, to the camera section 3100 (step S502).

When the camera section 3100 receives the adjusted data and ID number transmitted from the video processing section 3200, the system control section 3106 of the camera section 3100 stores the adjusted data and ID number communicated from the video processing section 3200 in the EEPROM 3255 (step S503).

After storing the adjusted data and ID number, the system control section 3106 rewrites a flag showing whether each video processing parameter for absorbing the difference between image pickup characteristics has been adjusted, into a flag showing that each video parameter has been adjusted and stores the flag in the EEPROM 3255 (step S504) to complete this processing.

Figure 23:
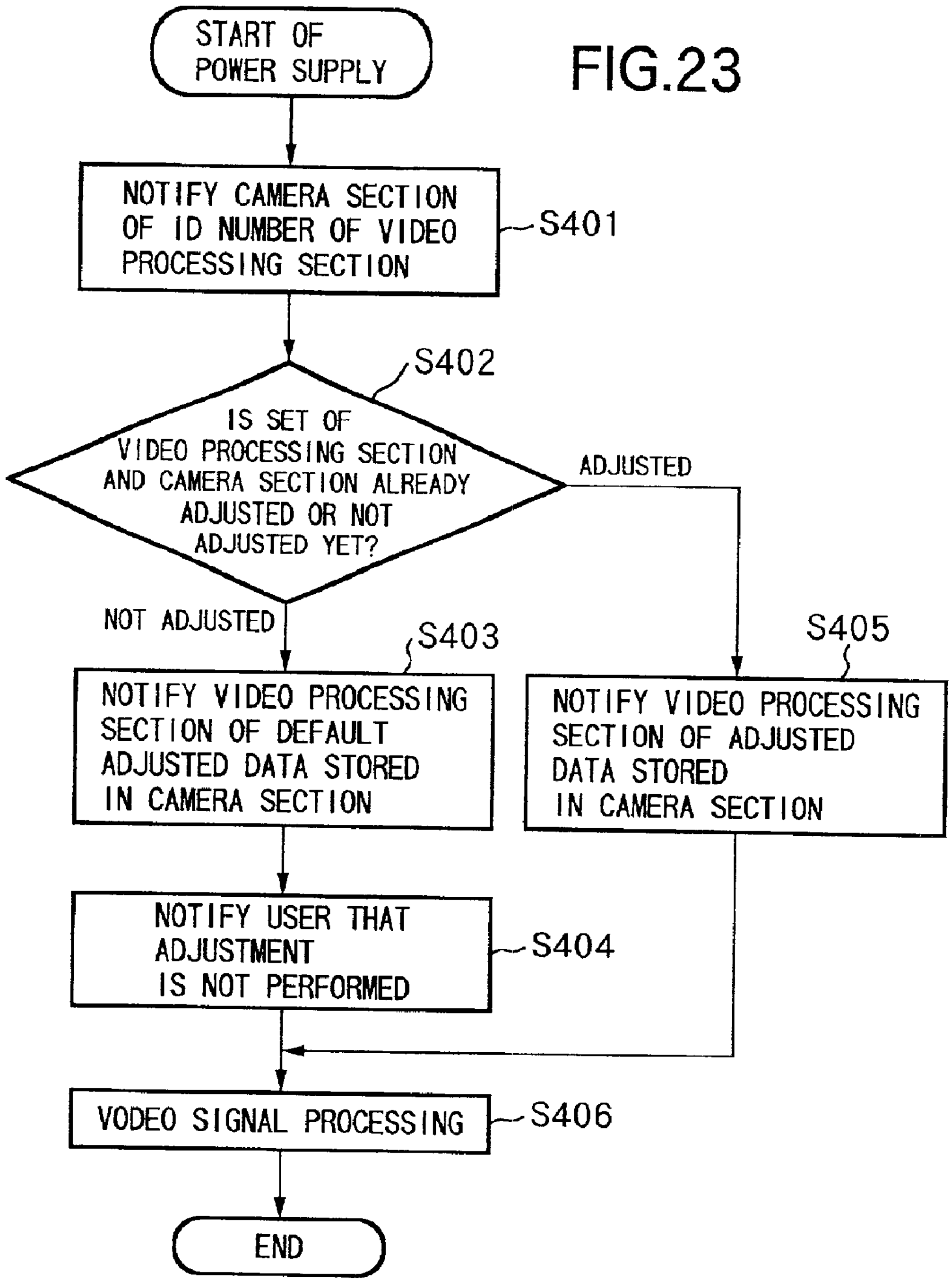

Then, operations after turning on the power supply of the present video input unit are described below by referring to FIG. 23. FIG. 23 is a flow chart showing operations of the video input unit in FIG. 21 after turning on the power supply.

When the camera section 3100 is connected to the video processing section 3200 and the power supply is turned on, the ID number of the video processing section 3200 is first transmitted to the camera section 3100 from the video processing section 3200 as shown in FIG. 23 (step S401).

Then, when the camera section 3100 receives the ID number transmitted from the video processing section 3200, the system control section 3106 of the camera section 3100 decides whether the flag stored in the EEPROM 3253 shows that each video processing parameter has been adjusted (step S402).

When the flag shows that each video processing parameter is not adjusted, the system control section 3106 transmits the initial value of each video processing parameter stored in the EEPROM 3253 and the information showing that each video processing parameter is not adjusted, to the video processing section 3200 (step S403), and the system control section 3250 of the video processing section 3200 instructs the host terminal 3300 to notify the user that each video processing parameter has not been adjusted in accordance with the information showing that each video processing parameter is not adjusted (step S404). Then, the image processing section 3200 sets the execution of video processing by using the initial value of each video processing parameter (step S406) to complete this processing.

However, when the flag shows that each video processing parameter has been adjusted, the system control section 3106 transmits the adjusted value of each video processing parameter stored in the EEPROM 3253 to the video processing section 3200 (step S405), and the video processing section 3200 sets the execution of video processing by using the value of each video processing parameter (step S406).

Thus, it is determined whether a video processing parameter corresponding to an ID number sent from the video processing section 3200 in accordance with the ID number has been adjusted in accordance with a flag. When a determination result shows that the video processing parameter has been adjusted, the video processing parameter value corresponding to the ID number is transmitted to the video processing section 3200. Thereby, it is possible to easily set a video processing parameter for the camera section 3100 required whenever the camera section 3100 is exchanged. As a result, it is possible to obtain a video showing a preferable color reproducibility even in the combination with any camera section.

Moreover, when a determination result shows that a video processing parameter has not been adjusted, the initial value of the video processing parameter is transmitted to the video processing section 3200 as a video processing parameter together with the information showing that the video processing parameter has not been adjusted, the host terminal 3300 is directed to notify a user that each video processing parameter has not been adjusted, and it is set to perform video processing by using the initial value of each video processing parameter. Therefore, the user can easily know that a video processing parameter corresponding to the camera section 3100 is not held and perform video processing by using a video processing initial parameter (default parameter) instead of a calculated video processing parameter.

In the case of the ninth embodiment, when a determination result shows that a video processing parameter has not been adjusted, it is set to perform video processing by using the initial value of each video processing parameter. However, it is also possible to perform data adjustment operation (shown in FIG. 24) of sending the image pickup characteristic data in the camera section 3100 to the video processing section 3200, calculating a video processing parameter in accordance with the image pickup characteristic data in the video processing section 3200, and sending the calculated video processing parameter and the ID number of the video processing section 3200 to the camera section 3100, and after the data adjustment operation is completed, the camera section 3100 may use the video processing parameter value obtained through the data adjustment operation. Moreover, in the case of this embodiment, the video signal processing section 3200 is constituted as an extension board for a host terminal. However, it is also possible to constitute the section 3200 as an adapter unit between a monitor and a camera section.

Tenth Embodiment

FIGS. 25A–25D are block diagrams showing the structure of the image pickup apparatus of the tenth embodiment of the present invention. In FIGS. 25A–25D, the image pickup apparatus has three modules of a camera section 4100, an image processing section 4200, and a pan tilting section 4300. Moreover, numeral 4400 denotes a monitor such as a CRT and 4500 denotes a host terminal. In this case, the camera section 4100 and image processing section 4200 are connected each other by cables 4109 and 4228 via the pan tilting section 4300. Moreover, the camera section 4100 and pan tilting section 4300 are connected each other by a serial data line 4123. Furthermore, the image processing section 4200 and host terminal 4500 are connected each other by a serial data line 4273, and the image processing section 4200 and monitor 4400 are connected each other by a coaxial cable 4226. Thereby, the host terminal 4500 can control the image processing section 4200, camera section 4100, and pan tilting section 4300 via the cable 4273.

Then, the structure of the camera section 4100 is described below.

Figure 30:
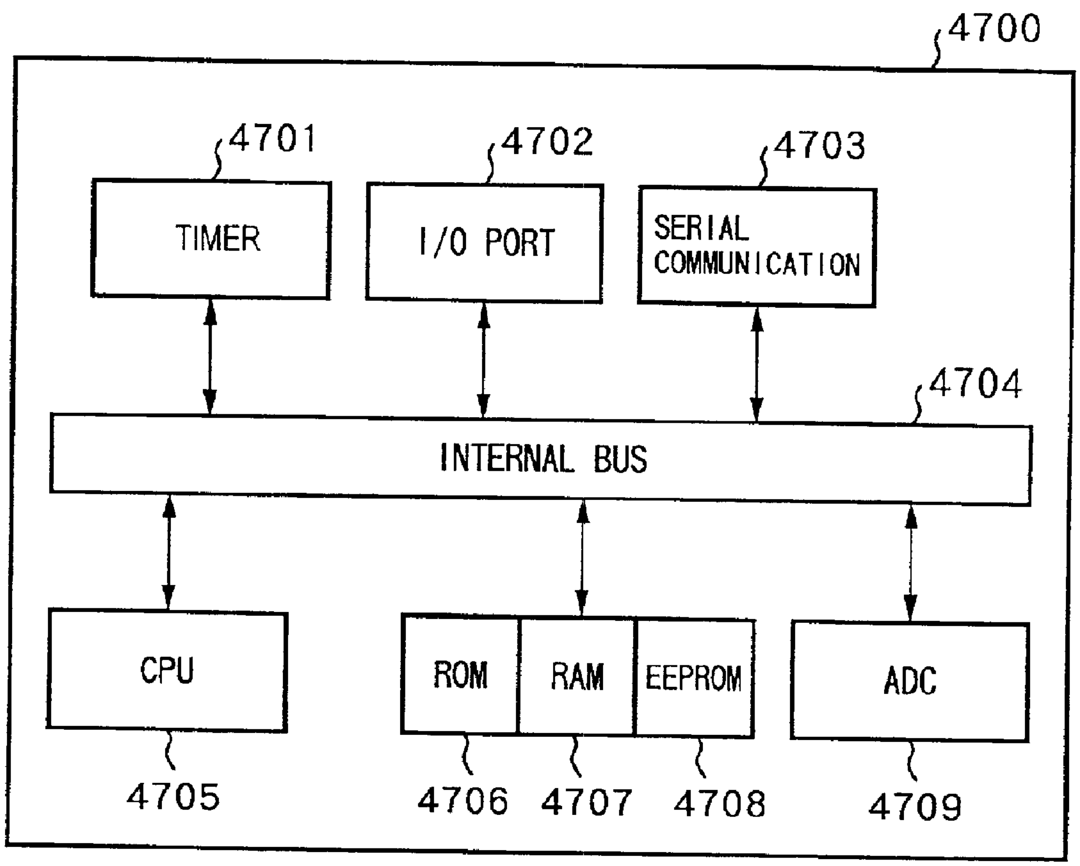
FIG. 30 is an illustration showing the structures of the camera section, pan tilting section, and image processing section of the image pickup apparatus of the tenth embodiment.

Numeral 4108 denotes a system control section which is provided with a one-chip microcomputer having a CPU, ROM, RAM, control port, and communication port (see FIG. 30). The system control section 4108 controls each unit of the camera section 4100 and performs bi-directional communication with the image processing section 4200 through the serial data line 4113, VIDS 4120, and cables 4109 and 4228. Numeral 4101 denotes a lens section which is provided with an image pickup lens, a focus lens, and a focus ring motor for electrically operating the focusing lens. By controlling the lens section 4101 with the system control section 4108, an auto focusing function is realized. Numeral 4102 denotes an iris unit for controlling the incident light passing through the lens section 4101, which is provided with an iris and an iris ring for electrically operating the iris. By controlling the iris unit 4102 with the system control section 4108, the iris for the light emitted from the lens section 4101 is controlled. Numeral 4103 denotes an image pickup device such as a CCD for photo-electrically converting a video incoming via the lens section 4101 and iris unit 4102 into electric signals. Numeral 4104 denotes an S/H AGC circuit for performing the sampling-and-holding operation in order to reduce the noises of electric charges accumulated by the image pickup device 4103 and adjusting the gain of a picked-up video signal to output the video signal thus gain adjusted. By controlling the S/H AGC circuit 4104 with the system control section 4108, it is possible to adjust the gain of a video signal. Numeral 4105 denotes a timing pulse generator (hereafter referred to as TG) for an image pickup device for controlling the storing operation, reading operation, and resetting operation in accordance with the number of pixels of the image pickup device 4103. By controlling the TG 4105 with the system control section 4108, it is possible to change shutter speeds. Numeral 4120 denotes a multiplexing/separating section (VIDS) which multiplexes the data to be transmitted to the image processing section 4200 on a video signal supplied from the S/H AGC circuit 4104 and separates multiplexed data received from the image processing section 4200. A video signal 4121 in which the video signal and transmission data are multiplexed is supplied to the image processing section 4200 via a connector 4107. The reception data separated by the multiplexing/separating section 4120 is transmitted to the system control section 4108 via the serial data line 4113. Numeral 4113 denotes a data line for performing bi-directional data communication between the system control section 4108 of the camera section 4100 and the image processing section 4200, which is connected to a serial communication port of the system control section 4108. Numeral 4111 denotes a video synchronizing signal supplied from the image processing section 4200, in which a horizontal synchronizing signal and a vertical synchronizing signal are multiplexed. Numeral 4107 denotes a connector removable from the cable 4109. The cable 4109 supplies a video signal 4121 and a video clock 4110 sent from the TG 4105 to the image processing section 4200 from the camera section 4100, and supplies the synchronizing signal 4111 sent from the image processing section 4200 to the camera section 4100. Moreover, a power supply voltage and a ground line are supplied to the camera section 4100 from the image processing section 4200 through the cable 4109. Furthermore, the camera section 4100 and the pan tilting section 4300 are connected each other through the serial cable 4123 and the pan tilting section 4300 is controlled by transmitting or receiving data through the serial cable 4123.

Then, the image processing section 4200 is described below.

Figure 26:
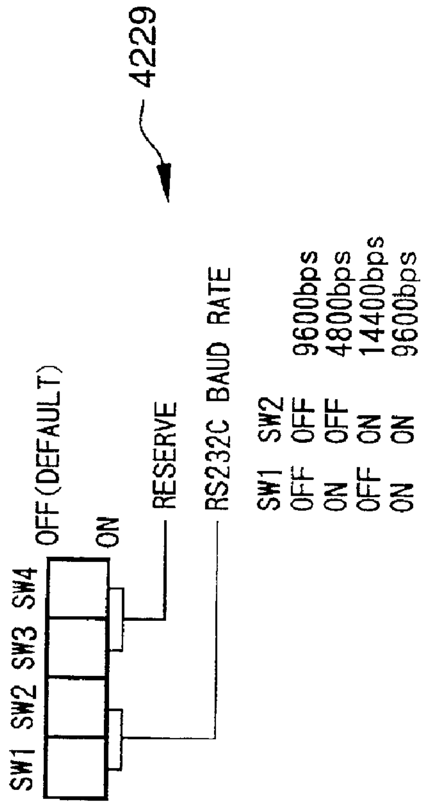
FIG. 26 is an illustration for explaining how DIP switch is set.

Numeral 4250 denotes a system control section which includes a one-chip microcomputer having a CPU, ROM, RAM, control port, and communication port (see FIG. 30). The system control section 4250 performs the control of each unit of the image processing section 4200 and auto balance control and controls the communication with the camera section 4100 and the communication with the host terminal 4500 through the serial cable 4273. Numeral 4203 denotes a multiplexing/separating section (VIDS) which receives a video signal in which transmission data and reception data are multiplexed and separates reception data and multiplexes the data to be transmitted to the camera section 4100 on a video signal. A video signal separated by the VIDS 4203 is supplied to an A-D converter 4201 and converted into a digital signal and thereafter, sent to a signal processing circuit 4202. Moreover, divided reception data is sent to the system control section 4250 through a serial data line 4222. The signal processing circuit 4202 converts the video signal converted into a-digital signal into a standardized digital video signal and outputs the signal to an encoder 4204 and moreover, generates the video synchronizing signal 4111 by using the video clock 4110 sent from the camera section 4100 to supply the signal 4111 to the camera section 4100 and encoder 4204. Furthermore, the signal processing circuit 4202 makes the system control section 4108 of the camera section 4100 generate signals for communicating the brightness data of an object used for exposure control, white balance data for white balance control, and focus data for auto focus control at the cycle of a vertical synchronizing signal (Vsync). The encoder 4204 receives a standardized digital signal from the signal processing circuit 4202, converts the digital signal into a composite signal, and outputs the composite signal to the monitor 4400. Numeral 4226 denotes a serial data line for performing bi-directional data communication between the host terminal 4500 and the image processing section 4200, which is connected to a serial control port of the system control section 4250. Numeral 4229 denotes a DIP switch which sets transfer speed of serial data to and from the host terminal 4500. FIG. 26 shows switch assignment of the DIP switch 4229.

In FIG. 26, symbols SW1 and SW2 denote switches for setting the baud rate of an RS232C for performing communication with the host terminal 4500 and SW3 and SW4 denote switches already used for other purposes.

Numeral 4240 denotes a power supply section having a power supply switch and a voltage level converter, which supplies power from an AC adapter 4243 through a connector 4241. Moreover, the power supplied from the power supply section 4240 is supplied to the pan tilting section 4300 through a connector 4242 and a line 4243. A power supply switch 4244 is used to turn on/off the power supplies of the image processing section 4200, camera section 4100, and pan tilting section 4300.

Then, the pan tilting section 4300 is described below.

Figure 27:
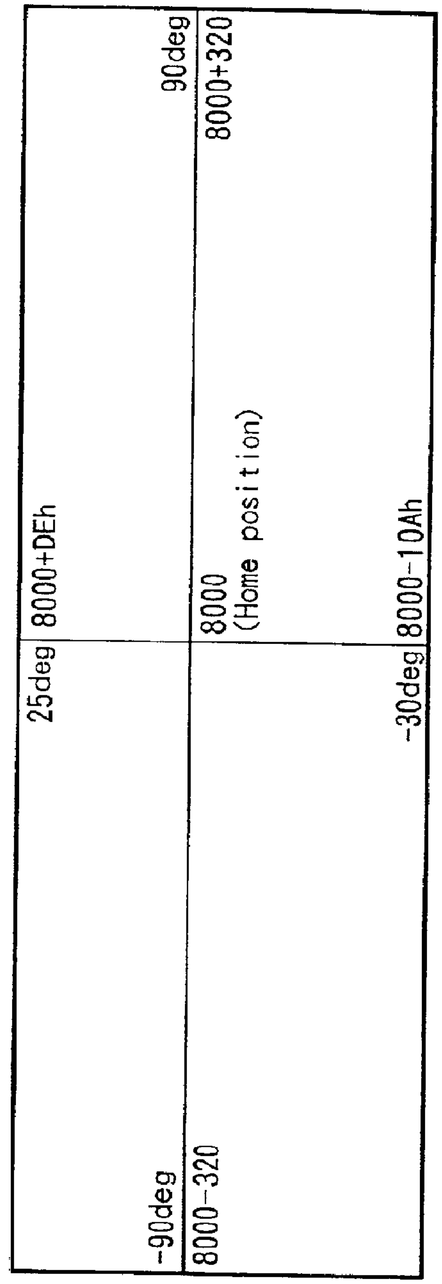
FIG. 27 is an illustration for explaining a range for realizing pan tilting by a pan tilting section.

Numeral 4301 denotes a system control section which includes a one-chip microcomputer having a CPU, memories (ROM, RAM, and EEPROM), control port and communication port (see FIG. 30). The system control section 4301 performs the control of each unit of the pan tilting section 4300 and the communication with the camera section 4100. Numeral 4302 denotes a pan motor which is used to pan the camera section 4100 rightward and leftward. Numeral 4303 denotes a tilt motor which is used to vertically turn the camera section 4100. FIG. 27 shows the movable ranges of the pan motor 4302 and tilt motor 4303 and their coordinate system.

In FIG. 27, the rightward and leftward pan angles are set to ∀90E, the upward tilt angle is set to 25E, and the downward tilt angle is set to 30E.

Numeral 4304 denotes an LED for indicating the operation state of the pan tilting section 4300. The LED 4304 can indicate green, red, and orange (green and red are simultaneously turned on). Numeral 4320 denotes a remote-controller light receiving section for receiving a light signal from a remote controller 4310 and transmitting the signal to the system control section 4301 as data. Numeral 4306 denotes a power supply section which has a voltage level converter and the like and generates a power supply voltage used for the pan tilting section 4300 by using a power supply voltage supplied from the image processing section 4200 through the cable 4243. Numeral 4308 denotes a rotary switch for setting an ID to the pan tilting section 4300. Values "#0 to #6" set by the switch 4308 are used to discriminate between pan tilting heads when controlling a plurality of pan tilting sections 4300 by the remote controller 4310. Moreover, the LED 4304 is turned on in accordance with the control by the remote controller 4310. For example, the green LED is turned off when the power supply is turned off and turned on when the power supply is turned on and flickers every 0.1 sec while the key of the remote controller 4310 is pressed, every 0.5 sec while preset data is set, and every second while a video is muted. Moreover, the orange LED flickers every 0.5 sec while an ID is set, it is turned on when the ID is mismatched, it flickers every 0.1 sec when the ID is mismatched and the key of the remote controller 4310 is pressed, and it is turned off except the above cases. When control is performed by the host terminal 4500 through the serial cable 4273, the indication by the LED 4304 depends on the application program of the host terminal 4500.

Numeral 4150 denotes a second camera section replaceable with the camera section 4100. A portion of the second camera section 4150 common to that of the camera section 4100 is provided with the same number and its description is omitted. The second camera section 4150 is different from the camera section 4100 in the number of pixels of an image pickup device. An image pickup device 4151 has 410,000 pixels. A user can select the camera section 4150 or 4100 correspondingly to his or her desired resolution.

Numeral 4260 denotes a second image processing section replaceable with the image processing section 4200. A portion of the second image processing section 4260 common to that of the image processing section 4200 is provided with the same number and its description is omitted. The image processing section 4260 is operated by being connected to the bus interface (I/F) of the host terminal 4500. Because the power for the image processing section 4260 is supplied from other unit, the section 4260 is not provided with an exclusive power supply section. A bus controller 4262 receives standardized digital video data from the signal processing circuit 4202 to transmit the data to the host terminal 4500 through a bus 4261 and the host terminal 4500 communicates with the system control section 4250 through the bus controller 4262. Thereby, the host terminal 4500 displays digital video data standardized by the signal processing circuit 4202 on the screen of a VGA monitor (4400) through the bus controller 4262. The image processing section 4260 is necessary whenever the host terminal 4500 having a bus interface is used.

Numeral 4270 denotes a third image processing section replaceable with the image processing section 4200. A portion of the image processing section 4270 common to that of the image processing section 4200 is provided with the same number and its description is omitted. The image processing section 4270 is operated by being connected to the host terminal 4500 and an interface conforming to the standard IEEE 1394. A controller 4271 multiplexes standardized digital video data supplied from the signal processing circuit 4202 and a data signal supplied from the system control section 4250 in accordance with the standard of IEEE 1394 and communicates with the host terminal 4500 through the cable 4273. Thereby, the host terminal 4500 displays standardized digital data on the screen of the VGA monitor (4400).

Figure 28A:
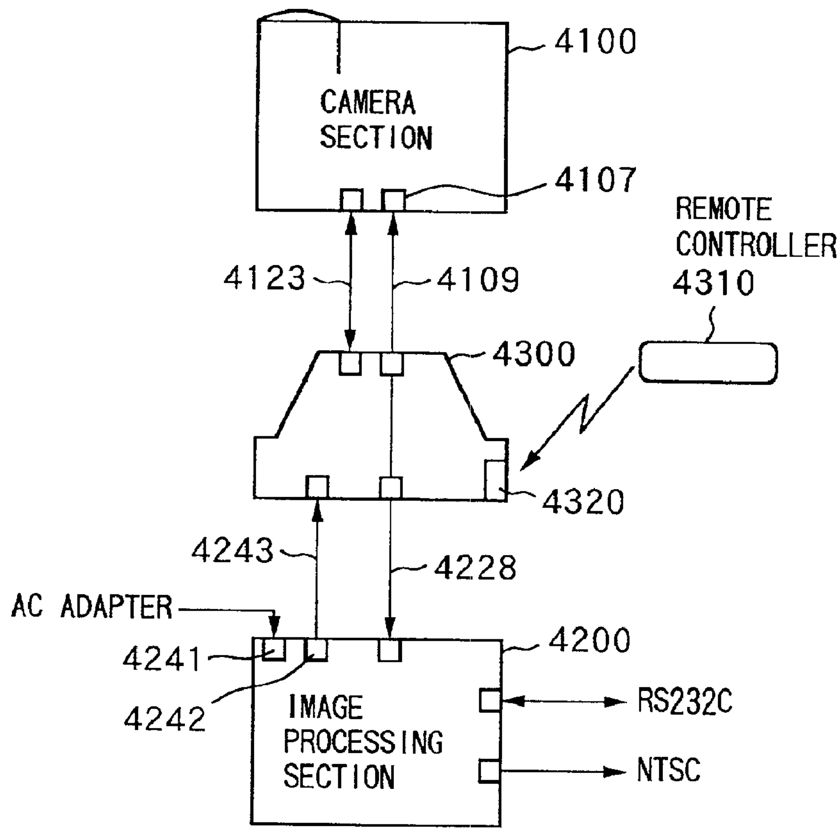
FIGS. 28A and 28B are illustrations showing how a camera section, pan tilting section, and image processing section of the image pickup apparatus of the tenth embodiment are connected.
Figure 28B:
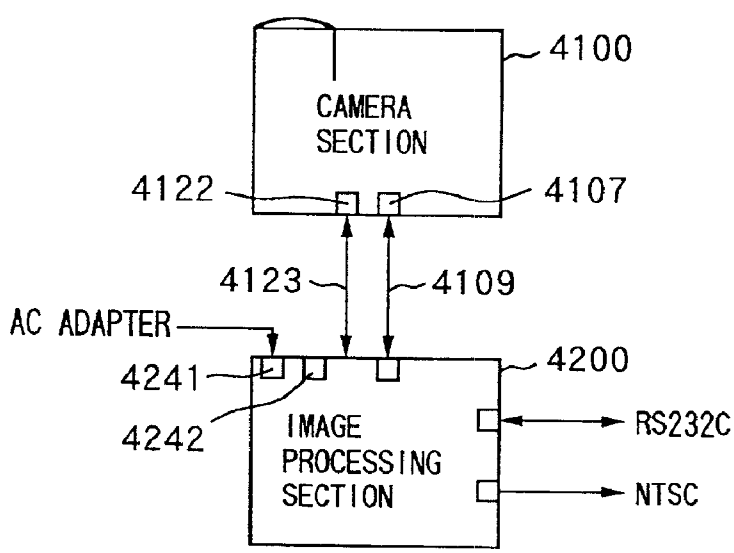

FIGS. 28A and 28B are illustrations for explaining the connection state of the image pickup apparatus of this embodiment.

FIG. 28A shows the state in which an image pickup apparatus is constituted by connecting the camera section 4100, image processing section 4200, and pan tilting section 4300. In this case, the camera section 4100 is replaceable with the camera section 4150 and the image processing section 4200 is replaceable with the image processing section 4260 or 4270.

FIG. 28B is an illustration showing the state in which an image pickup apparatus is constituted by connecting the camera section 4100 and image processing section 4200. In this case, the camera section 4100 is replaceable with the camera section 4150 and the image processing section 4200 is replaceable with the image processing section 4260 or 4270.

Figure 29A:
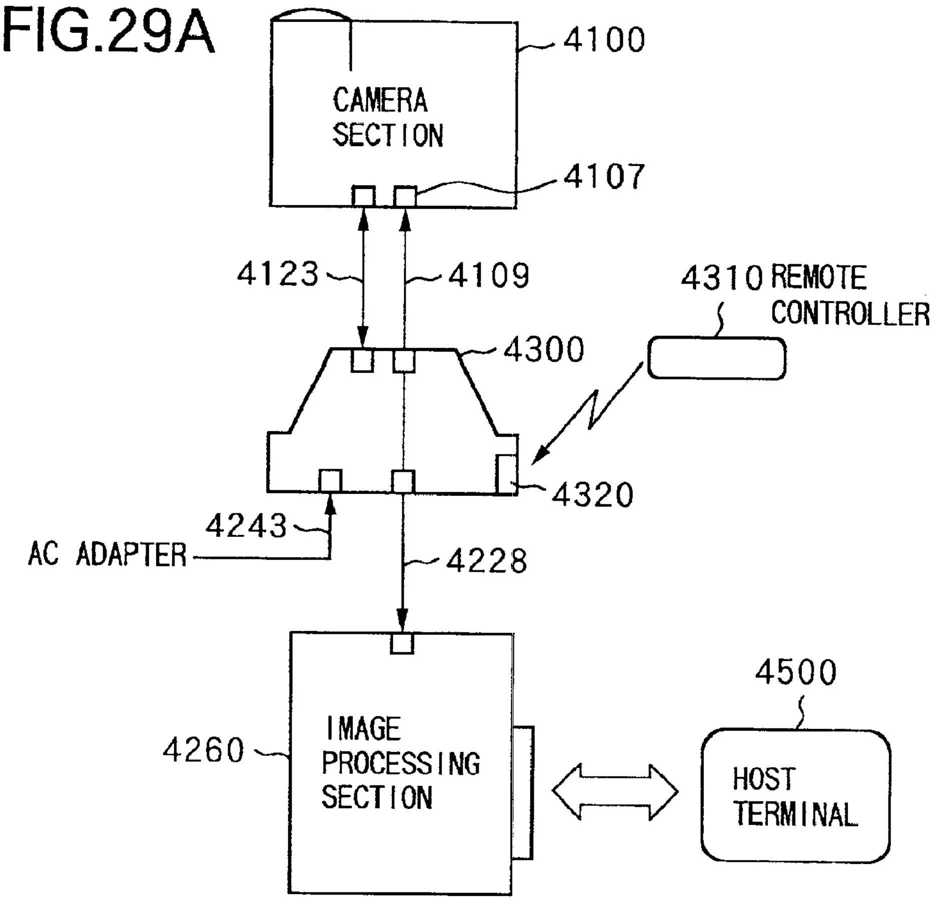
FIGS. 29A and 29B are illustrations showing how the camera section, pan tilting section, and image processing section of the image pickup apparatus of the tenth embodiment are connected.
Figure 29B:
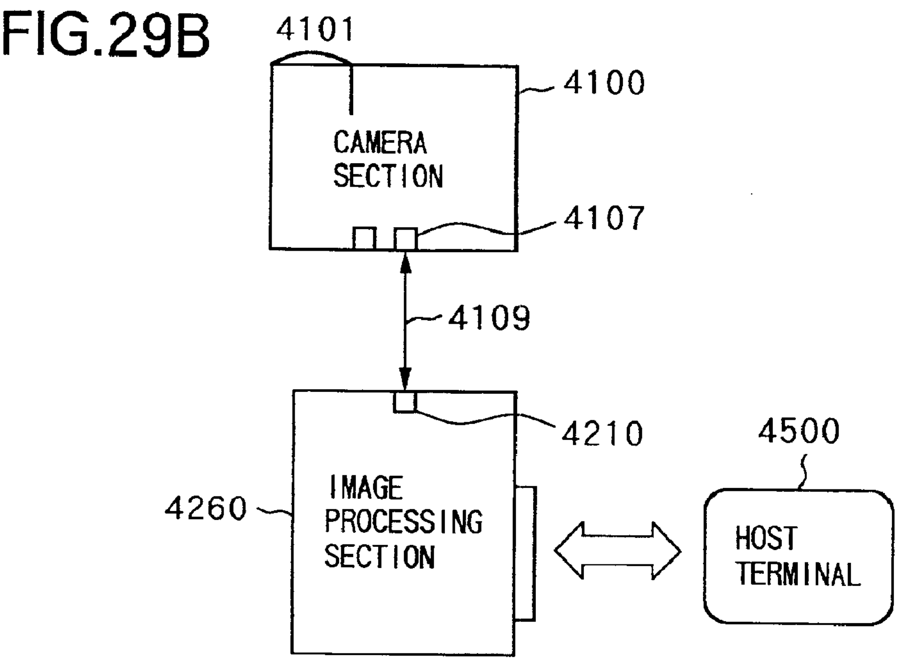

FIG. 29A shows the state in which an image pickup apparatus is constituted by connecting the camera section 4100, image processing section 4260, and pan tilting section 4300. To use the image processing section 4260, the host terminal 4500 is indispensable. In this case, the power for the pan tilting section 4300 is supplied from an AC adapter 4243 and the camera section 4100 is replaceable with the camera section 4150. Moreover, FIG. 29B shows the state in which an image pickup apparatus is constituted by connecting the camera section 4100 and the image processing section 4260. The camera section 4100 is replaceable with the camera section 4150.

FIG. 30 is a block diagram showing the hardware structure of a system control section 4700 (4108, 4250, 4301) of the camera section 4100, image processing section 4200, and pan tilting section 4300.

In FIG. 30, numeral 4704 denotes an internal bus, 4705 denotes a CPU, 4706 denotes a ROM for storing software, 4707 denotes a RAM used as the work area of the software, and 4708 denotes an electrically erasable programmable ROM (EEPROM). Numeral 4701 denotes a timer for measuring a predetermined time and generating an interrupt signal or the like when the time elapses, 4702 denotes an I/O control section for controlling each section, 4703 denotes a serial communication section, and 4709 denotes an analog-digital converter (ADC).

Figure 31A:
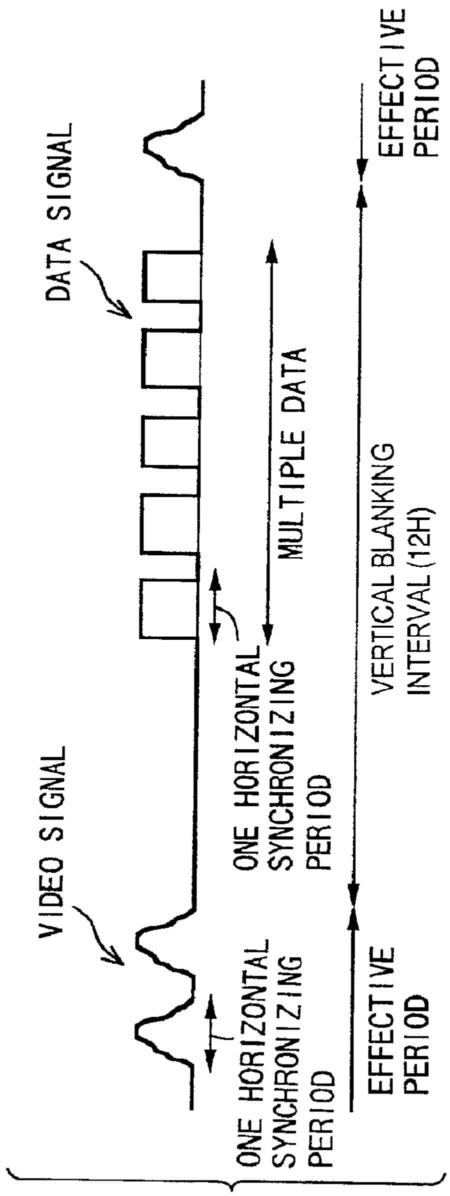
FIGS. 31A and 31B are illustrations for explaining the VIDS of the image pickup apparatus of the tenth embodiment.
Figure 31B:
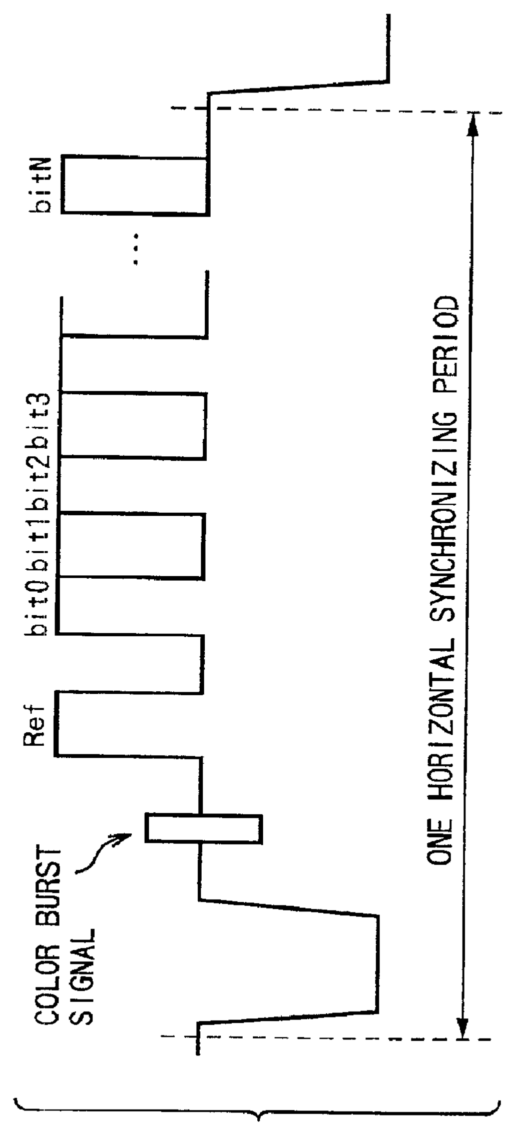

FIGS. 31A and 31B are illustrations for explaining a VIDS (Vertical Interval Data Signal).

In the case of the structure in FIGS. 25A–25D, it is preferable to decrease the number of wires included in the cable 4109 for connecting the camera section 4100 with the image processing section 4200 from the aspects of operability and cost. Therefore, by multiplexing a data signal transferred between the camera section 4100 and image processing section 4200 on a video signal, it is possible to decrease the number of wires of the cable 4109. The above multiplexing/separating sections (VIDS) 4120 and 4230 perform the multiplexing/separation of data for the video signal. A VIDS (Vertical Interval Data Signal) is obtained by the data multiplexing method used here.

As shown in FIG. 31A, a video signal can be divided into an effective period and a vertical blanking interval. In the effective period, a video signal is added every horizontal line. In the case of the NTSC system, an odd field ranges between 1 and 263H and an even field ranges between 263 and 525H. Among theses fields, the vertical blanking interval ranges between 1 and 21H and between 263 and 284H. Moreover, it is possible to multiplex the video signal on data in the vertical blanking intervals between 10 and 21H and between 273 and 284H. Therefore, the data to be transmitted to the image processing section 4200 from the camera section 4100 is multiplexed on the video signal in the period between 10 and 21H, and the data to be transmitted to the camera section 4100 from the image processing section 4200 is multiplexed on the video signal in the period between 273 and 284H.

FIG. 31B shows an enlarged 1-H signal in the period in which the data is multiplexed. In this case, a data signal to be multiplexed is converted into a binary notation and superimposed on the horizontal scanning period of the vertical blanking interval (=V blanking interval) of a video signal sent from a CCD.

Figure 32:
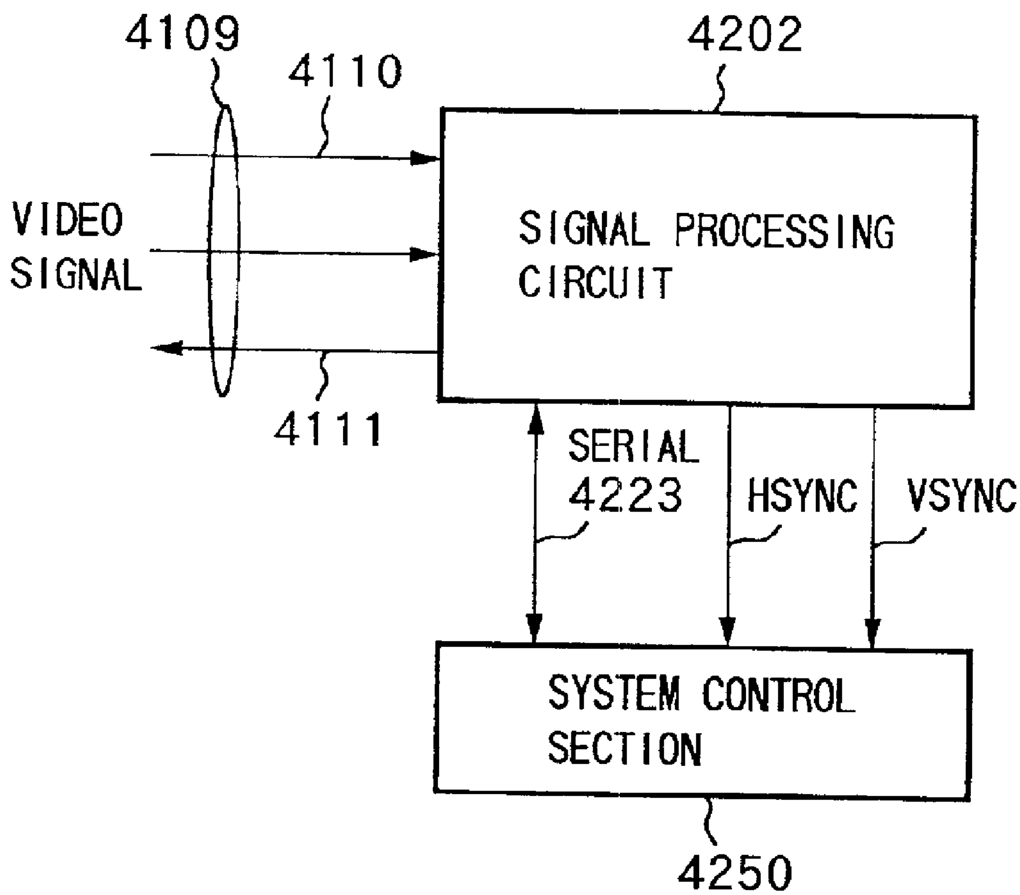
FIG. 32 is an illustration for explaining the connection between the signal processing circuit and the system control section of the image pickup apparatus of the tenth embodiment.

FIG. 32 is an illustration for explaining signals to be transferred between the signal processing circuit 4202 and system control section 4250 in the image processing section 4200 of the tenth embodiment.

The video clock signal 4110 is supplied from the camera section 4100 and the signal processing circuit 4202 transfers data to and from the system control section 4250 through a serial data line 4223. The signal processing circuit 4202 generates a horizontal synchronizing signal (H_sync) and a vertical synchronizing signal (V_sync) in accordance with the clock signal 4110 to output the signals to the system control section 4250 and moreover generates a video synchronizing signal 4110 in which a horizontal synchronizing signal and a vertical synchronizing signal are multiplexed to transmit the signal to the camera section 4100.

Figure 33A:
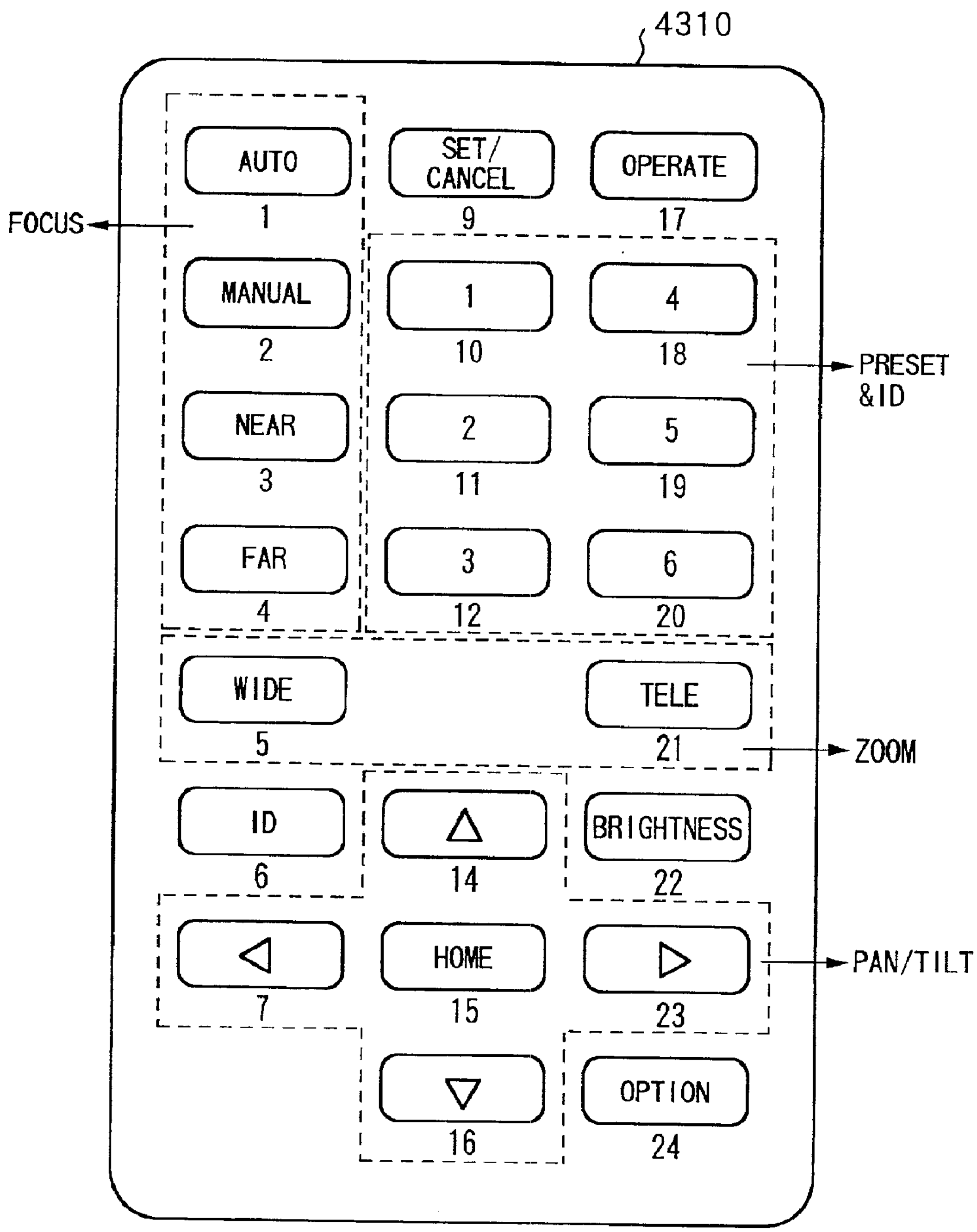
FIG. 33A is an illustration showing the operation section of a remote controller of the tenth embodiment and FIG. 33B is an illustration for explaining an operation example on the monitor screen of a host terminal.
Figure 33B:
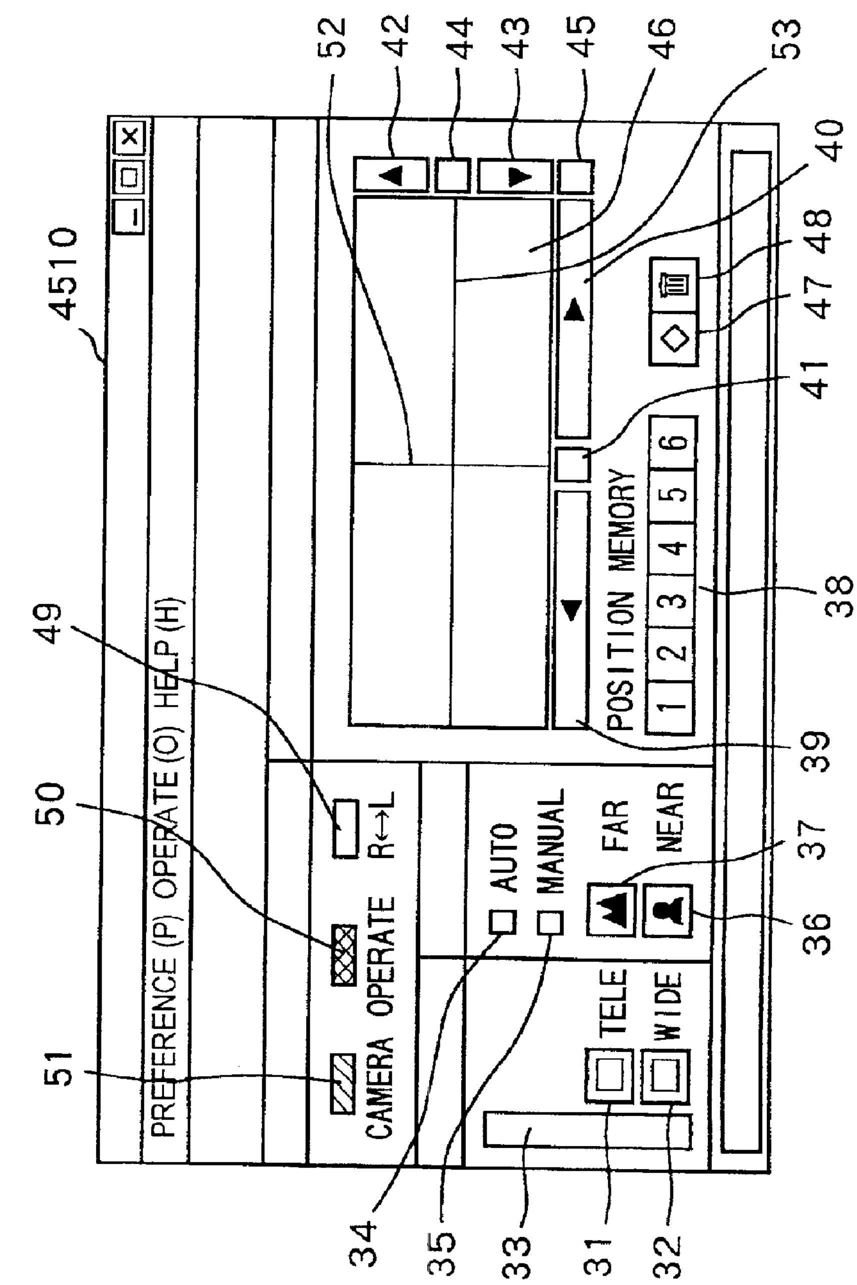

FIGS. 33A and 33B are illustrations showing the key structure of the operation section of the image pickup apparatus of the tenth embodiment. FIG. 33A is an illustration showing the key arrangement of the remote controller 4310 and FIG. 33B is an illustration showing an operation panel 4510 displayed on the screen of the host terminal 4500, on which an operation is designated by a mouse cursor or the like.

First, FIG. 33A is described below. An AUTO key 1 designates an auto focus state of the camera section 4100. By pressing a MANUAL key 2, a state for manual focusing is set. A NEAR key 3 is pressed to adjust the focus to nearer point. While the key 3 is pressed, the focus is moved toward you. After pressing the key 3, a state is set in which focusing can be manually made. A FAR key 4 is pressed to adjust the focus to farther point. While the key 4 is pressed, the focus moves to farther point. After pressing the key 4, a state is set in which focusing can be manually made. While a WIDE key 5 is pressed, zoom changes to wider angle. While a TELE key 21 is pressed, zoom changes to narrower angle. By pressing a HOME key 15, the camera of the camera section 4100 moves to the home position. While an UP key 14 is pressed, the pan tilting section 4300 turns upward. While a DOWN key 16 is pressed, the pan tilting section 4300 turns downward. While a LEFT key 7 is pressed, a pan tilting head turns clockwise (counterclockwise in the screen). While a RIGHT key 23 is pressed, the pan tilting head turns counterclockwise (clockwise in the screen). By pressing a BRIGHTNESS key 22, an object video becomes bright. The key 22 functions as a toggle switch of default—>brightness up—>brightness up—>default. By pressing an OPERATE key 17, operation designation and video display by the remote controller 4310 are turned on/off. When the video display is turned on, an operation can be designated by the remote controller 4310 and a video is displayed on the monitor 4400. When the video display is turned off, only the designation by the OPERATE key 17 of the remote controller 4310 is accepted and the video to be output to the monitor 4400 is muted. When the video display is turned off, the green LED of the LED 4304 of the pan tilting section 4300 flickers every second.

Moreover, by pressing both a SET key 9 and a number key, the present camera position, zoom position, and brightness are stored in the EEPROM area of the system control section 4250. By pressing the SET key 9 once, a state showing "under presetting" is set and the green LED of the LED 4340 flickers every 0.5 sec. By pressing the SET key 9 once again in the state showing "under presetting", the storing operation is stopped and the green LED is turned on. By directly pressing the keys "#1" to "#6" corresponding to these numerical keys (under presetting or in a state in which an ID is not set), the tripod head position, zoom position, and brightness are read from the EEPROM of the system control section 4250 and set to the pan tilting section 4300.

Moreover, by pressing an ID key 6, a state showing "under ID setting" is set and the orange LED of the LED 4304 flickers every 0.5 sec. By pressing the key 6 once again in the state of "under ID setting", the ID setting operation is stopped and the green LED of the LED 4304 is turned on. Moreover, by pressing one of the number keys "#1" to "#6" under ID setting, the pressed number is stored in the RAM area "ID setting area" of the system control section 4301 of the pan tilting section 4300. Moreover, by pressing the SET key 9 under the ID setting, "0" is set to the "ID setting area". Only when the value thus set in the "ID setting area" coincides with the number for the rotary switch 4308 of the pan tilting section 4300, a designation from the remote controller 4310 is accepted. However, when a number set to the "ID setting area" does not coincide with a number set by the rotary switch 4308 of the tripod head, a designation from the remote controller 4310 is not accepted. However, when the number for the rotary switch 4308 is "0" or the value in the "ID setting area" is "0", a designation from the remote controller 4310 is always accepted. When a designation from the remote controller 4310 is not accepted, the LED 4304 lights up in orange. An OPTION key 24 is effective when the host terminal 4500 is connected. When the OPTION key 24 is pressed while the host terminal 4500 is connected, a code corresponding to the key 24 is communicated to the host terminal 4500.

Then, FIG. 33B is described below. In this case, keys related to focus are described.

An auto focus state is set by designating a button 34 and a state in which manual focusing can be made is set by designating a button 35. The button 36 is used to adjust the focus to nearer point and the focus is moved toward you while the button 36 is being pressed. After pressing the button 36, a state is set in which manual focus can be made. A button 37 is pressed to adjust the focus to farther point.

While the button 37 is being pressed, the focus moves to farther point. After pressing the button 37, a manual focus state is set.

Then, buttons related to zoom are described below.

While a button 32 is being designated, zoom changes to wider angle. By further continuously designating the button 32, the zoom speed increases 1 sec after. While a button 31 is being designated, zoom changes to narrower angle. By further continuously designating the button 31, the zoom speed increases 1 sec after. An area 33 serves as an indicator showing a zoom position.

Then, button operations related to the pan tilting operation are described.

By pressing a button 45, pan and tilt positions of the camera of the camera section 4100 are located to the home position to perform SETUP (origin detection). While a button 42 is being pressed, the pan tilting section turns upward. While a button 43 is being designated, a pan tilting head turns downward. While a button 39 is being designated, the pan tilting head turns clockwise (counterclockwise in the screen). While a button 40 is being designated, the pan tilting head turns counterclockwise (clockwise in the screen). By designating a button 41, the tripod head of the pan tilting section 4300 is located to the intermediate position in the clockwise direction. Moreover, by designating a button 44, the tripod head of the pan tilting section 4300 is located to the intermediate position in the vertical direction.

Numeral 50 denotes a switch for turning on/off video muting. By pressing buttons 47 and 38, the current camera (pan, tilt) position, zoom position, and brightness are stored. By directly pressing "#1" to "#6" of the button 38, the stored tripod head position, zoom position, and brightness are set. The button 48 is a button for stopping the storing operation. An area 46 is an area showing the movable range (viewing range) of a tripod head. In accordance with the movement of the tripod head, a horizontal line 53 and a vertical line 52 in the area 46 are moved. Numeral 49 denotes a button used to reverse the right and left of an image when displaying the image on the host terminal 4500.

FIGS. 34A to 34C are illustrations showing the signal arrangement of the signal line 4273 for the serial data communication between the image processing section 4200 and host terminal 4500 of the tenth embodiment. The signal line 4273 is an eight-line cable. The handshake procedure for the serial data communication between the image processing section 4200 and the host terminal 4500 conforms to the following.

FIG. 34A shows the pin arrangement of a connector of the image processing section 4200, FIG. 34B shows the pin arrangement of a connector of the host terminal 4500, and FIG. 34C shows the connection between the image processing section 4200 and the host terminal 4500 by the cable 4273.

Hereafter, meanings of these signals are described in order.

(1) The image processing section 4200 turns on RTS when the power supply is turned on and the initialization of a system is completed. While the RTS is turned on, it is represented that data can be received from the host terminal 4500.

(2) The image processing section 4200 checks CTS to transmit data to the host terminal 4500. The section 4200 transmits the data when the CTS is turned on, but it disuses the data without transmitting it when the CTS is turned off. That is, the host terminal 4500 turns on the CTS when the data can be received.

(3) When the image processing section 4200 detects that the CTS is turned off while transmitting data, it disuses the data frame currently transmitted.

(4) When the image processing section 4200 detects that the CTS is turned off while receiving data, it disuses the data frame currently received.

(5) When the image processing section 4200 detects reception overrun, noise error, or framing error while receiving data, it turns off the RTS.

Figure 35A:
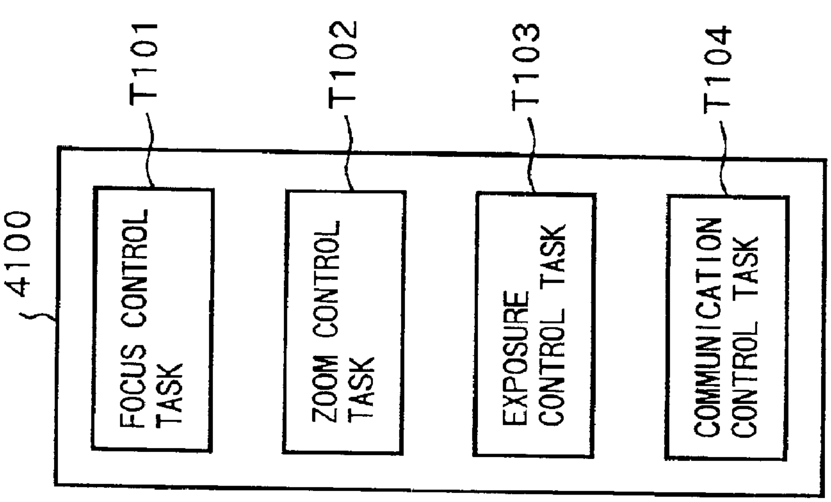
FIGS. 35A to 35C are illustrations showing execution tasks of the camera section, pan tilting section, and image processing section of the image pickup apparatus of the tenth embodiment.
Figure 35B:
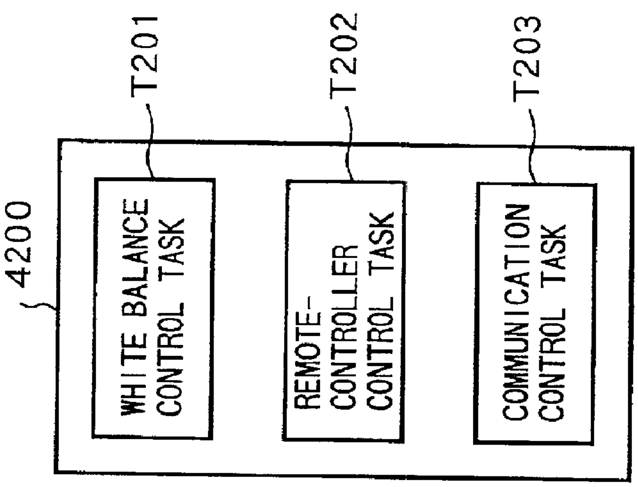
Figure 35C:
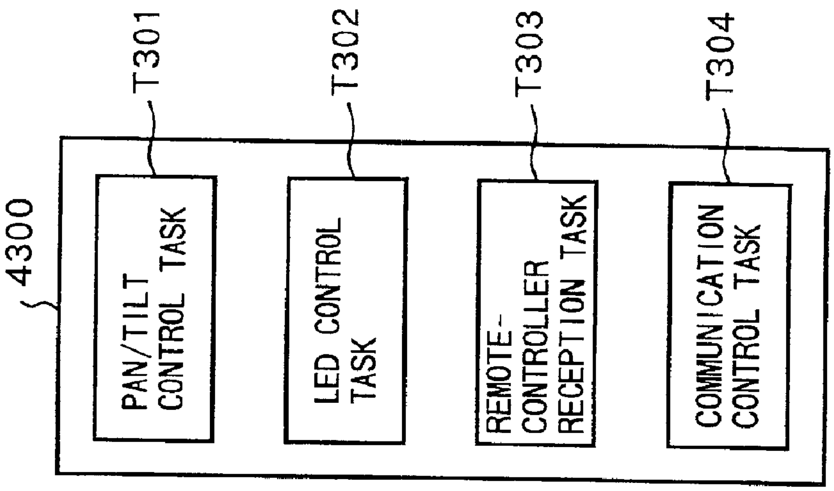

FIGS. 35A to 35C are illustrations showing the structures of the software of the camera section 4100, image processing section 4200, and pan tilting section 4300 of the image pickup apparatus of this embodiment. In this case, each software is divided by the unit of task every function.

First, each task to be executed by the camera head section 4100 is described below.

Numeral T101 in FIG. 35A denotes a focus control task for driving a focus motor of the lens section 4101 to realize an auto focus function and the like. Numeral T102 denotes a zoom control task for driving a zoom motor of the lens section 4101 to perform zoom control. Symbol T103 denotes an exposure control task for controlling the iris section 4102, TG 4105, and S/H AGC circuit 4104 to perform automatic exposure control. Symbol T104 denotes a communication control task for performing communication with the pan tilting section 4300 and image processing section 4200.

Then, each task to be executed by the image processing section 4200 is described below.

Symbol T201 in FIG. 35B denotes a white balance control task for realizing an auto white balance function. Symbol T202 denotes a remote controller control task for decoding a command sent from the remote controller 4310 to control an image pickup apparatus when the remote controller control mode is set to a local mode. Symbol T203 denotes a communication control task for performing communication between the camera section 4100 and the host terminal 4500. Moreover, each task to be executed by the pan tilting section 4300 is described below by referring to FIG. 35C.

Symbol T301 denotes a pan tilting control task for controlling the pan motor 4302 and the tilt motor 4303. Symbol T302 denotes an LED control task for controlling the emission by the LED 4304. Symbol T303 denotes a remote controller reception control task for receiving infrared radiation emitted from the remote controller 4310, decoding the received command, and communicating the command to a high-order module. Symbol T304 denotes a communication control task for performing communication with the camera section 4100.

In the case of the image pickup apparatus of this embodiment, the image processing section 4200, camera section 4100, and pan tilting section 4300 are separated from each other. Therefore, the entire system is operated by performing communication between these sections. Moreover, to connect the host terminal 4500, it is necessary to perform communication between the host terminal 4500 and the image processing section 4200. Such function blocks having a communication function as the host terminal 4500, image processing section 4200, camera section 4100, and pan tilting section 4300 are referred to as modules. Each module is included in the concept of high-order module or low-order module. These modules are arranged in the sequence of the host terminal 4500, image processing section 4200, camera section 4100, and pan tilting section 4300 from the highest order side. Moreover, a packet for transferring information between these modules is referred to as a frame. The frame includes such three types as a command frame, ACK/NACK frame, and data frame.

FIGS. 36A to 36D are illustrations for explaining the sequences of a command frame and an ACK/NACK frame to be transferred between modules (camera section, image processing section, and pan tilting section).

Figure 36B:
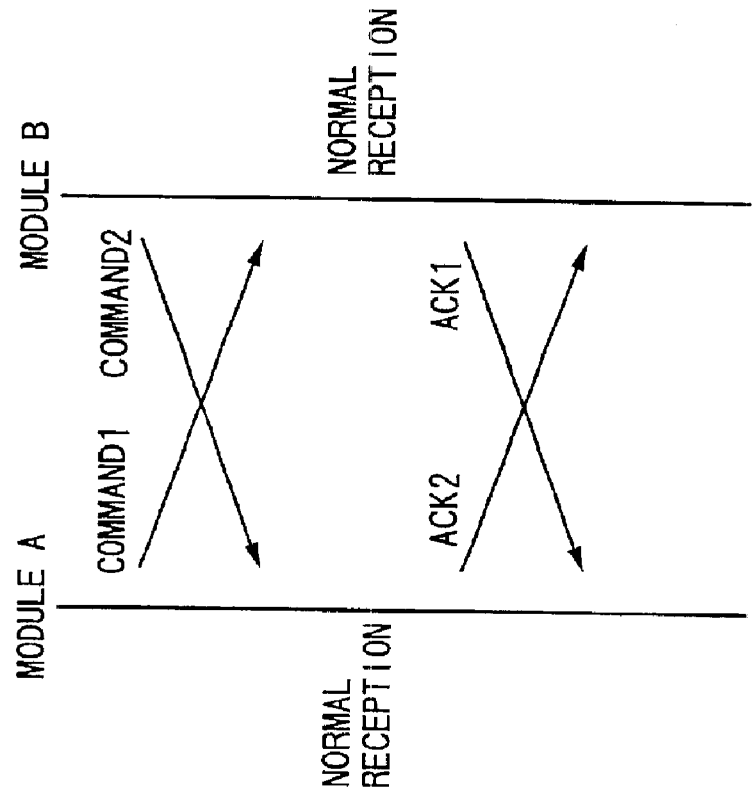
FIGS. 36A to 36D are illustrations for explaining the transfer of commands between the camera section, pan tilting section, and image processing section of the image pickup apparatus of the tenth embodiment.
Figure 36A:
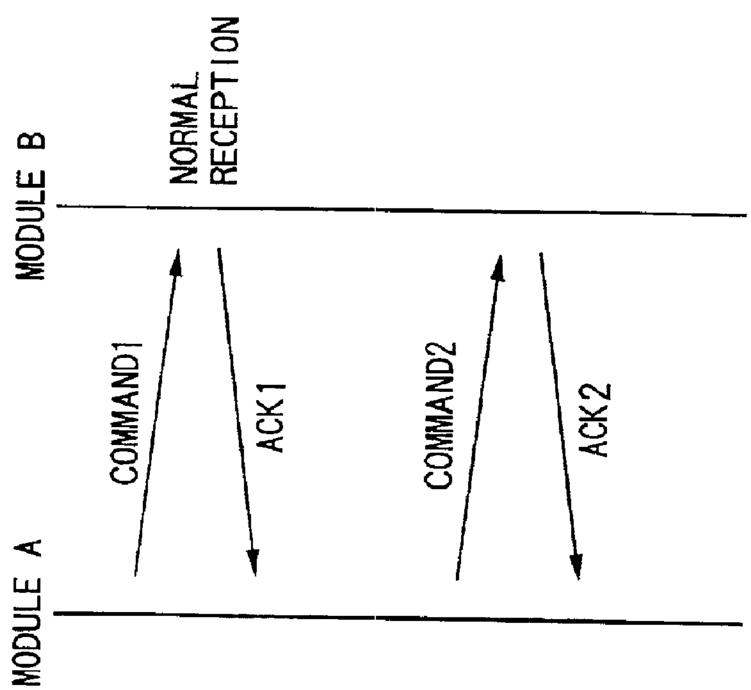
Figure 36D:
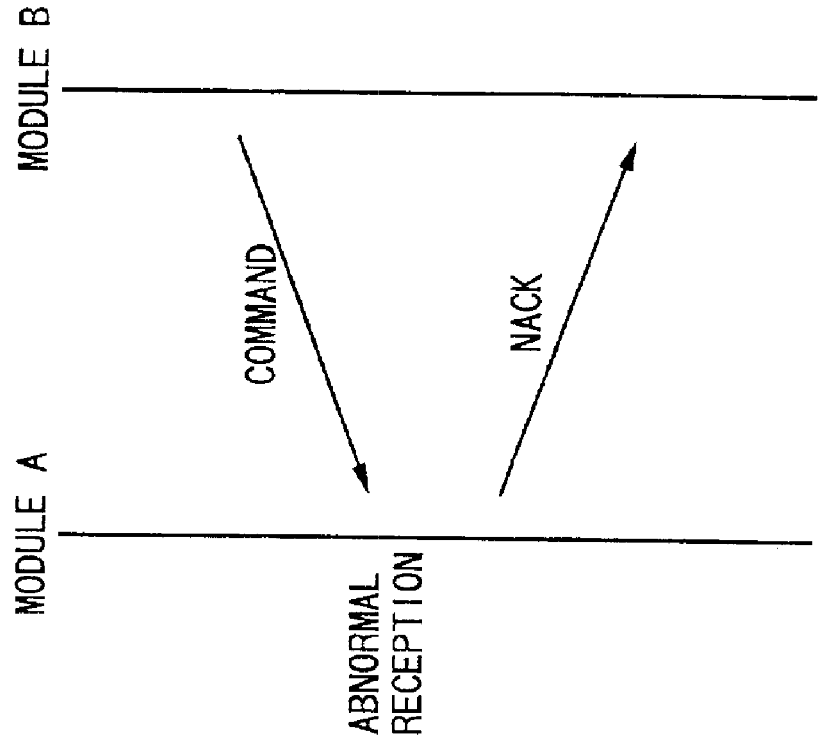
Figure 36C:
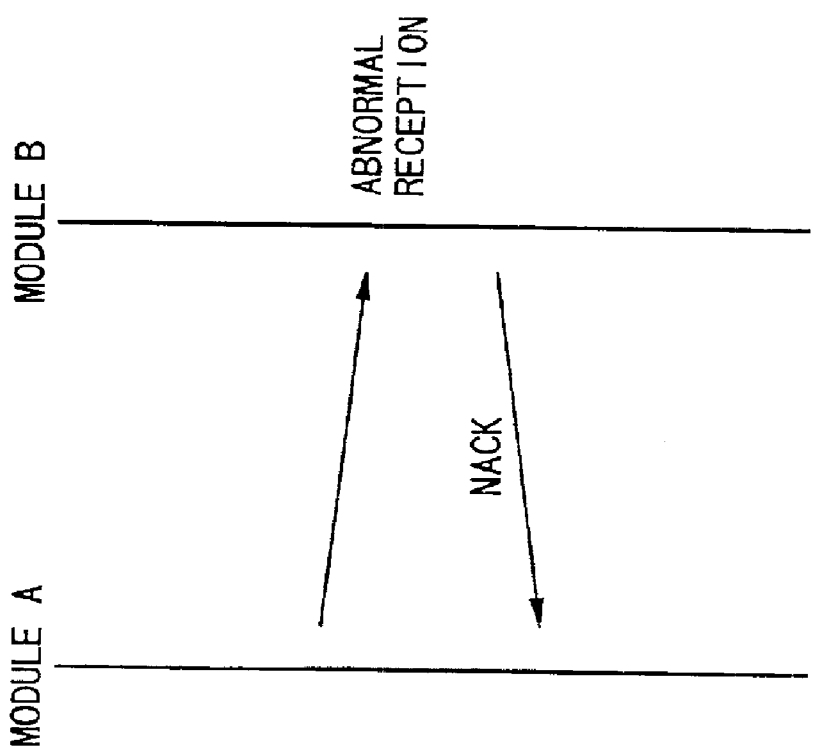

The transfer of a command frame between modules is performed by means of full duplex. A module returns an ACK frame when normally receiving a command frame (FIGS. 36A and 36B) and a NACK frame when abnormally receiving the command frame (FIGS. 36C and 36D). The command-frame transmission side cannot transmit the next command frame before receiving ACK or NACK. When receiving NACK, the transmission side determines processing in accordance with the reason code. The ACK/NACK frame is a frame for communicating whether a reception module can normally receive the command frame to the transmission side but it is not a frame for communicating that an operation requested by the command frame is executed to the transmission side.

The command frame includes such three types of commands as a request command, response command, and notification command.

Figure 37B:
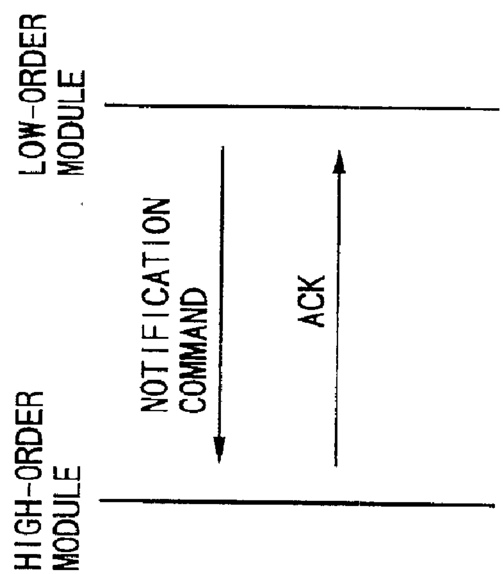
FIGS. 37A and 37B are illustrations for explaining the transfer of commands between the camera section, pan tilting section, and image processing section of the image pickup apparatus of the tenth embodiment.
Figure 37A:
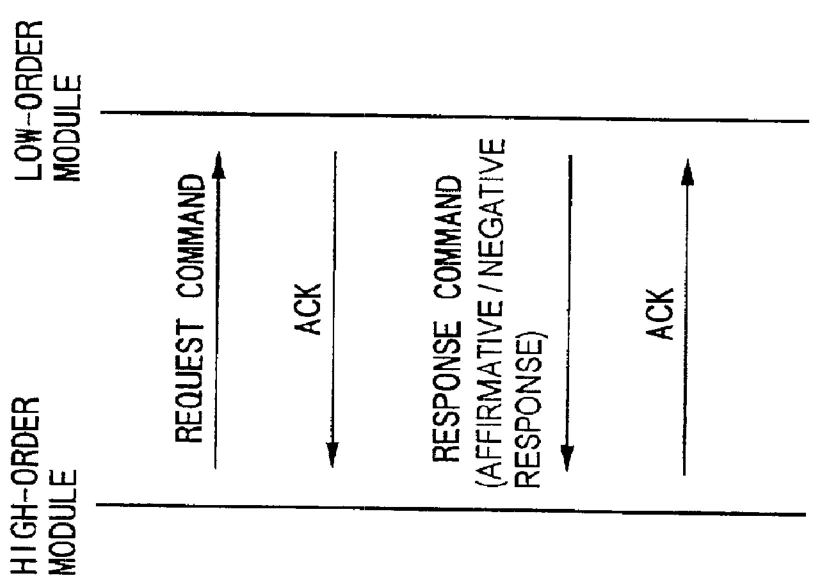

FIGS. 37A and 37B are illustrations for explaining a request command, response command, and notification command.

As shown in FIG. 37A, a request command is used for a high-order module to request a low-order module to execute a certain function. The low-order module receiving the request command returns whether the requested function could be realized by a response command. The response command includes such two types as positive acknowledgment and negative acknowledgment. The low-order module transmits the response command of "positive acknowledgment" to the high-order module when a function designated by the request command normally terminated and the response command of "negative acknowledgment" to the high-order module when the function did not normally terminate. In the case of the response command of "negative acknowledgment", the low-order module returns a reception frame by adding the type of error representing the factor of the error to the rear of the reception frame. Moreover, the response command immediately returns in the case of a request command for parameter setting or the like. However, when a lot of time is required by the end of an operation such as a request command for position setting of the pan tilting section 4300, it takes some time until the response command returns.

The notification command shown in FIG. 37B is a command to be transmitted from a low-order module to a high-order module, which is used to communicate an event generated in the low-order module to the host terminal 4500. The high-order module does not return a response command for the notification command. The notification command includes an error notification command for communicating an error detected by a low-order module.

Figure 38A:
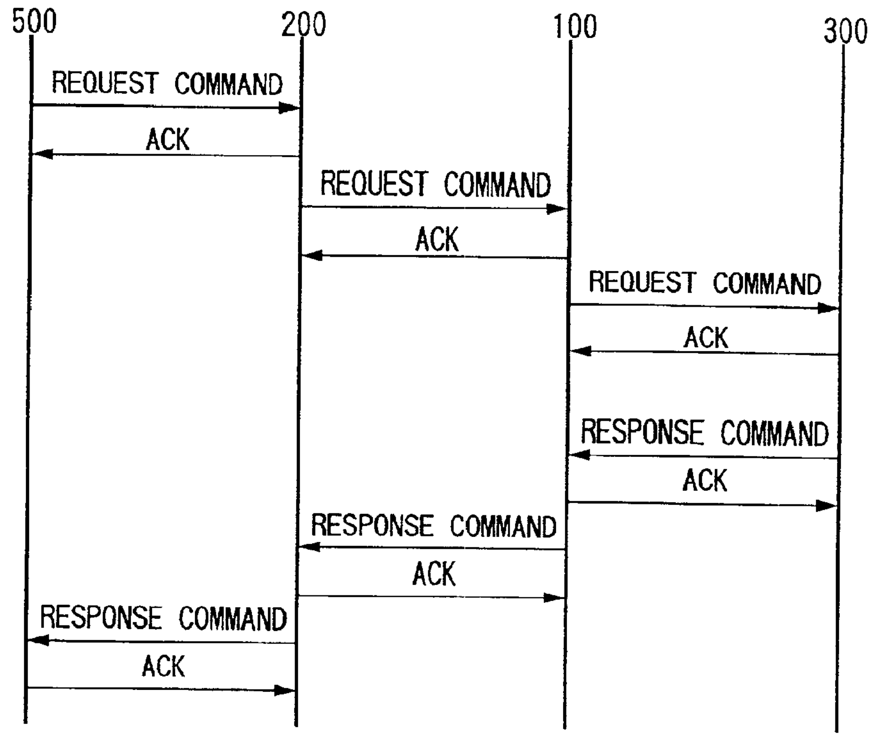
FIGS. 38A to 38C are illustrations for explaining the flow of commands between the camera section, pan tilting section, and image processing section of the image pickup apparatus of the tenth embodiment.
Figure 38B:
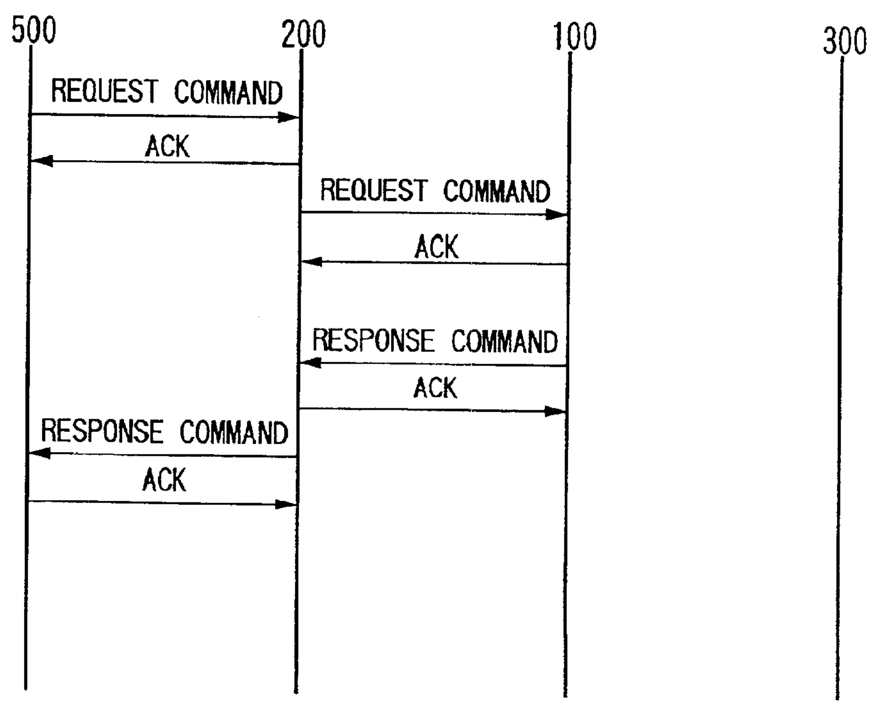
Figure 38C:
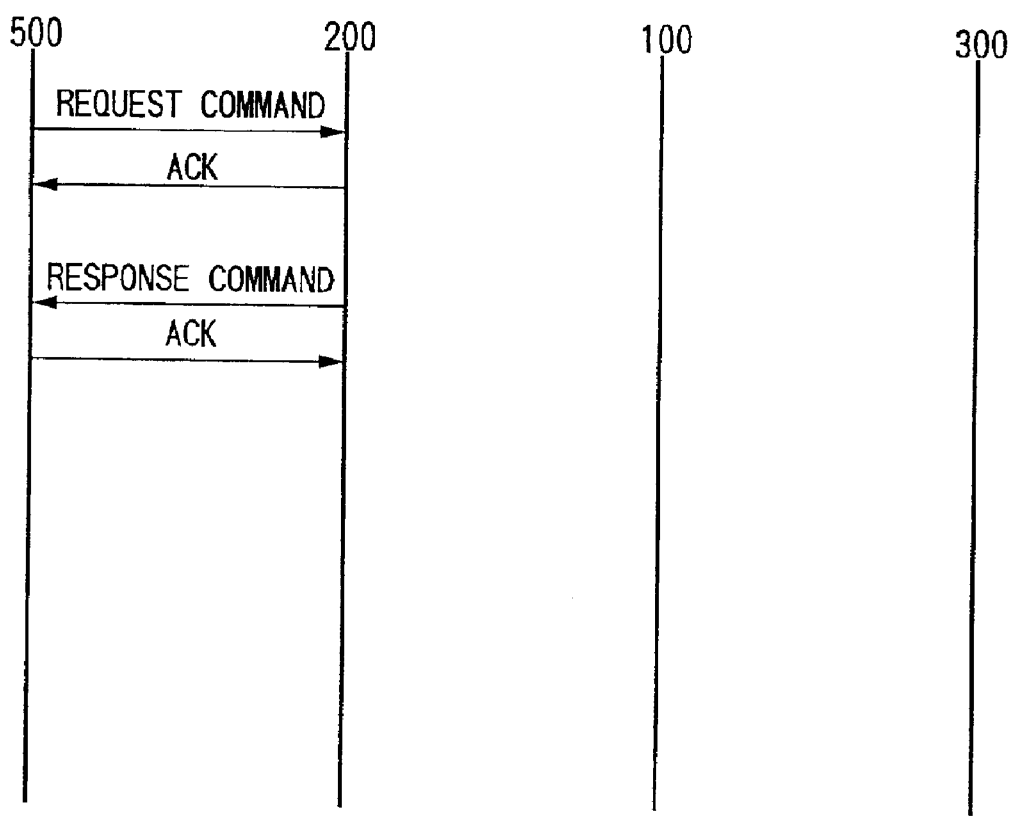

FIGS. 38A to 38C are illustrations for explaining the transfer of commands between the host terminal 4500, image processing section 4200, camera section 4100, and pan tilting section 4300.

FIG. 38A shows a sequence for the host terminal 4500 to transmit a request command in order to operate the pan tilting section 4300 and for the pan tilting section 4300 to execute a requested function and thereafter, return a response command frame to the host terminal 4500. The host terminal 4500 transmits a request command setting the pan tilting section 4300 (0101) to module identification bits (bit 0 to bit 3) of the frame ID in FIG. 40 to the image processing section 4200 through the cable 4273.

The image processing section 4200 receiving the above request command returns an ACK frame to the host terminal 4500 when receiving the frame of the request command is completed. The host terminal 4500 recognizes that the image processing section 4200 normally received the request command by receiving the ACK frame. The image processing section 4200 analyzes module identification bits of the received request command. In this case, because the pan tilting section 4300 is set to the module identification bits, the image processing section 4200 transmits the received request command to the camera section 4100 through the cable 4228.

The camera section 4100 receiving the request command returns the ACK frame to the image processing section 4200 when receiving the frame of the request command is completed. The image processing section 4200 recognizes that the camera section 4100 normally received the request command by receiving the ACK frame. The camera section 4200 analyzes module identification bits of the received request command. Because the pan tilting section 4300 is set to the module identification bits, the camera section 4200 transmits the received request command to the pan tilting section 4300 through the cable 4123.

The pan tilting section 4300 receiving the request command returns the ACK frame to the camera section 4100 when receiving the frame of the request command is completed. The camera section 4100 recognizes that the pan tilting section 4300 normally received the request command by receiving the ACK frame. The pan tilting section 4300 analyzes module identification bits of the received request command. Because the pan tilting section 4300 is set to the module identification bits, the pan tilting section 4300 processes the received request command. In this case, the pan tilting section 4300 analyzes the contents of the request command and executes a requested function. When the pan tilting section 4300 could execute the requested function, the section 4300 sets "1" to the command direction identification bit of the command ID of the received request command and transmits the request command to the camera section 4100. However, when the pan tilting section 4300 could not execute the requested function, the section 4300 sets "1" to the command direction identification bit of the command ID of the received request command and "1' to the response command identification bit of it and transmits the request command to the camera section 4100.

The camera section 4100 receiving the response command returns the ACK frame to the pan tilting section 4300 when receiving the frame of the response command is completed. The pan tilting section 4300 recognizes that the camera section 4100 normally received the response command by receiving the ACK frame. The camera section 4100 transmits the received request command to the image processing section 4200 through the cable 4109.

The image processing section 4200 receiving the response command returns the ACK frame to the camera section 4100 when receiving the frame of the response command is completed. The camera section 4100 recognizes that the image processing section 4200 normally received the response command by receiving the ACK frame. The image processing section 4200 transmits the received request command to the host terminal 4500 through the cable 4273.

The host terminal 4500 receiving the response command returns the ACK frame to the image processing section 4200 when receiving the frame of the response command is completed. The image processing section 4200 recognizes that the host terminal 4500 normally received the response command by receiving the ACK frame. The host terminal 4500 analyzes command identification bits of the received request command to check if the response command is a command corresponding to the request command. If so, the image processing section 4200 recognizes that the response command is a command corresponding to the request command. By analyzing response command identification bits of the command ID, it is possible to decide whether a function requested by the request command was normally executed.

FIG. 38B shows a sequence for the host terminal 4500 to transmit a request command frame in order to operate the camera section 4100 and for the camera section 4100 to execute a requested function and thereafter return a response command frame to the host terminal 4500.

FIG. 38C shows a sequence for the host terminal 4500 to transmit a request command frame in order to operate the image processing section 4200 and for the image processing section 4200 to execute a requested function and thereafter, return a response command frame to the host terminal 4500.

Figure 39A:
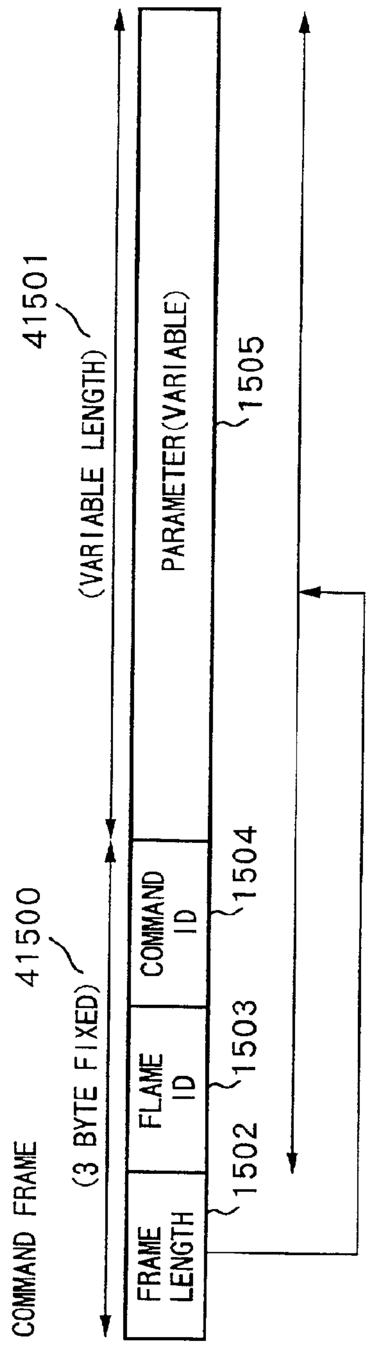
FIGS. 39A and 39B are illustrations for explaining a command frame and ACK/NACK frame of the image pickup apparatus of the tenth embodiment.

FIG. 39A is an illustration showing the data structure of the frame of a command to be transferred between modules.

The command frame is provided with a frame header section 41500 and a parameter section 41501. The frame header section 41500 comprises three bytes of a frame length 1502, frame ID 1503, and command ID 1504. Moreover, the length of a parameter 1505 of the parameter section 41501 is a variable length.

Figure 39B:
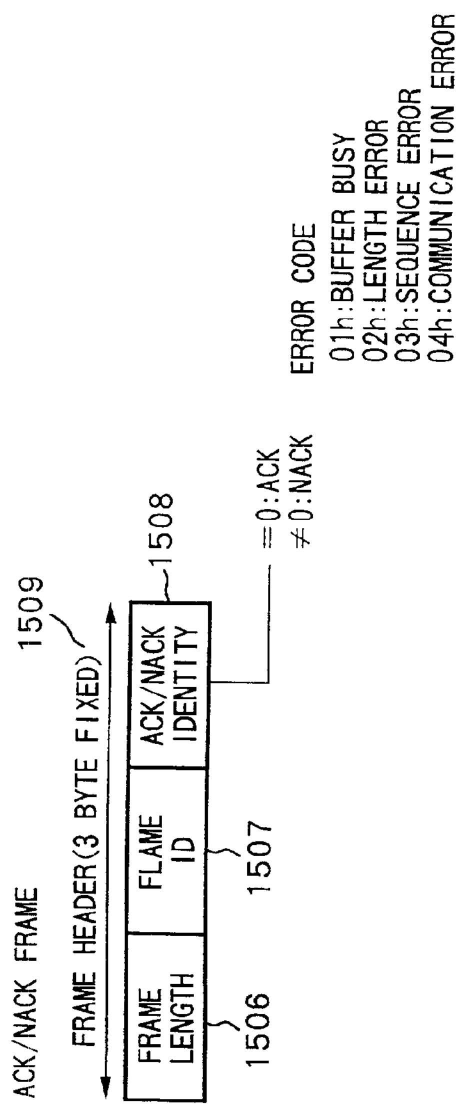

FIG. 39B is an illustration showing the data structure of an ACK/NACK frame.

The ACK/NACK frame comprises three bytes of a frame header 1509. The frame header 1509 has a frame length 1506, frame ID 1507, and ACK/NACK ID 1508. In this case, the value of the frame length 1506 is fixed and the ACK/NACK ID 1508 is an area for identifying ACK or NACK. When the value is "0", it is identified as ACK. When the value is not "0", it is identified as NACK. In the case of NACK, the cause of NACK is clarified by an ID value.

Figure 40:
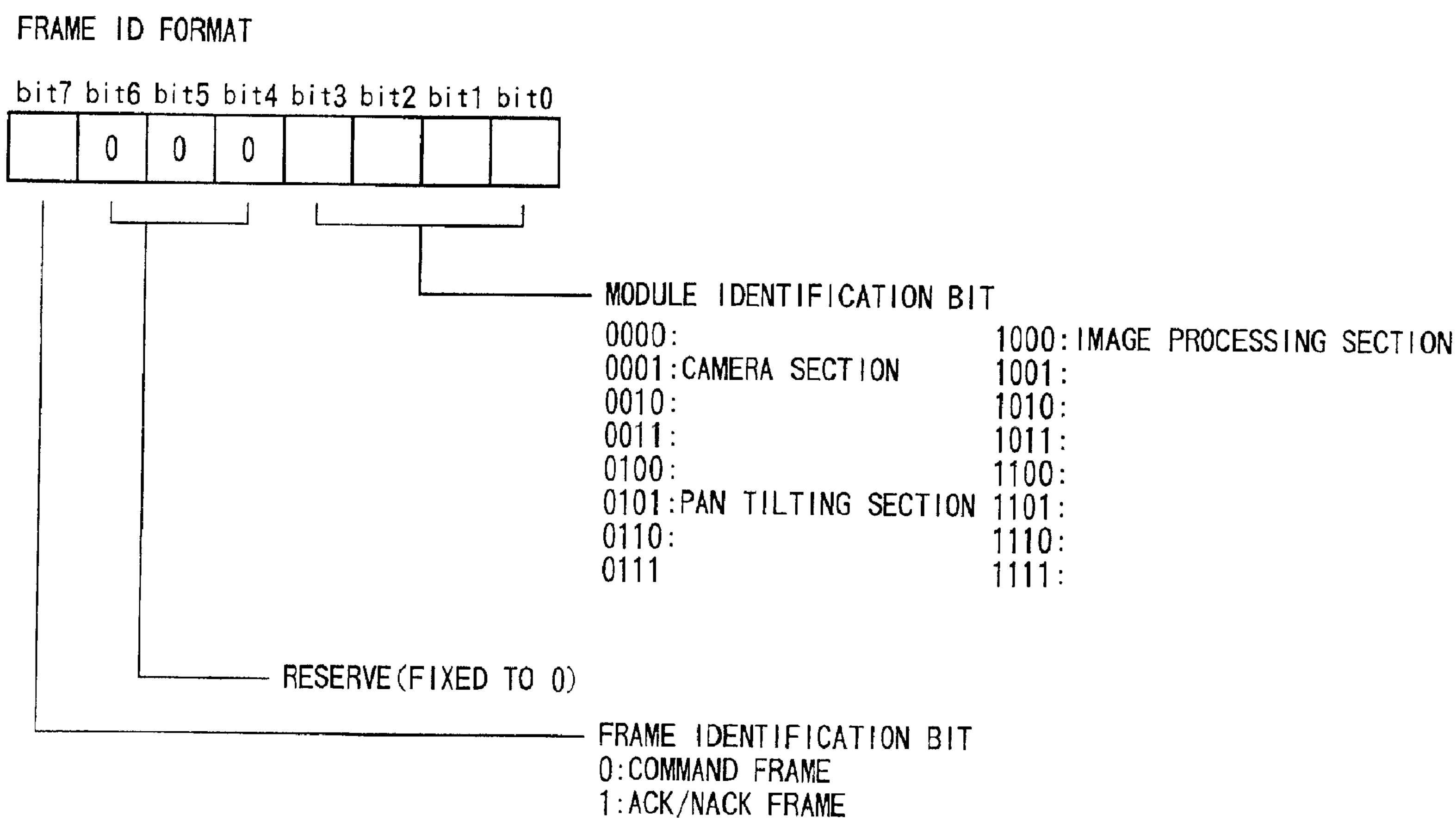
FIG. 40 is an illustration for explaining the format of a frame ID of the image pickup apparatus of the tenth embodiment.

FIG. 40 is an illustration showing the data structures of the frame ID sections of a command frame and an ACK/NACK frame.

A frame identification bit (bit 7) is a bit for identifying a command frame or ACK/NACK frame and module identification bits (bit 0 to bit 3) are used to specify the transmission destination of a frame in the case of the direction from a high-order module to a low-order module and used to specify a frame transmission source in the case of the direction from a low-order module to a high-order module.

Figure 41:
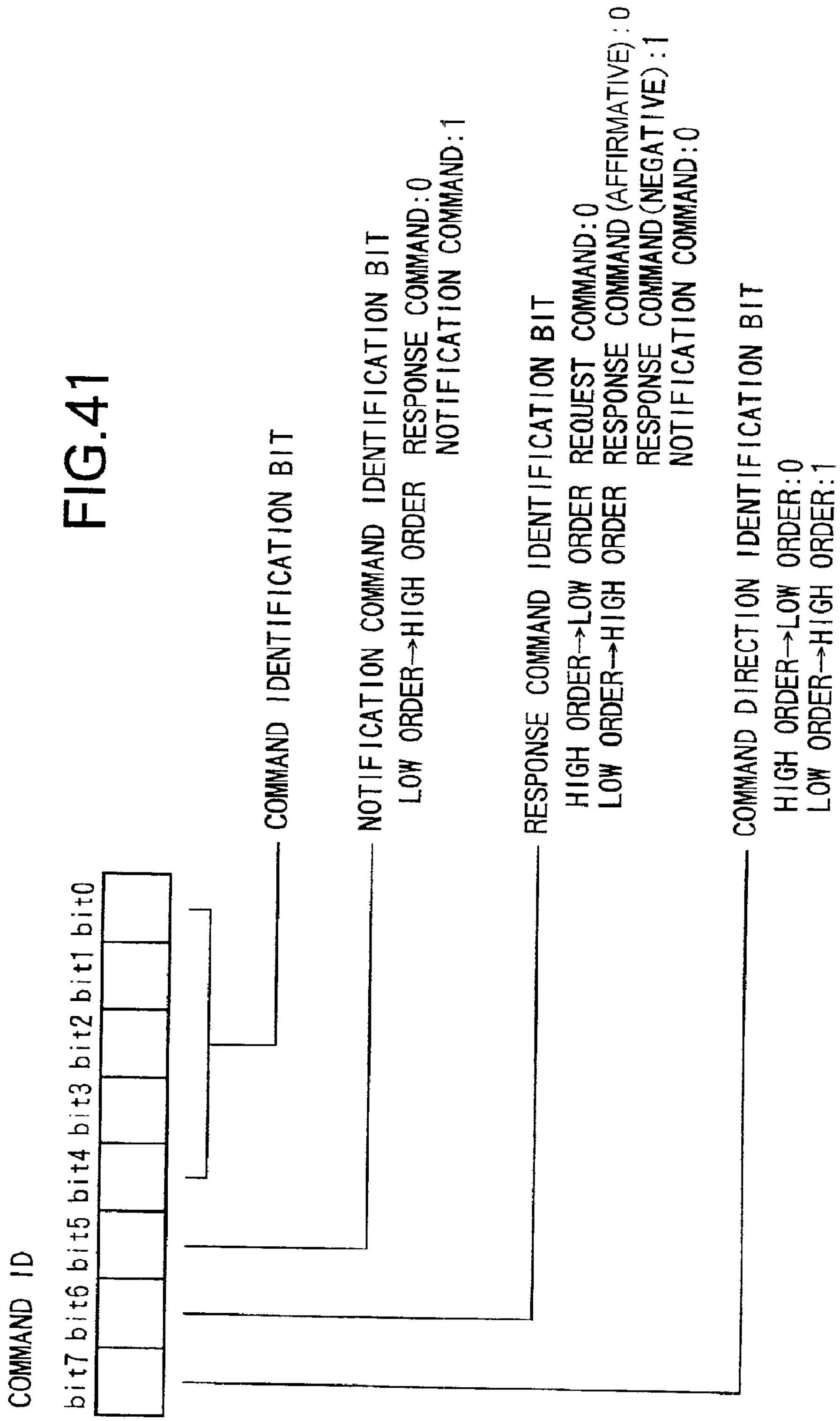
FIG. 41 is an illustration for explaining the format of a command ID of the image pickup apparatus of the tenth embodiment.

FIG. 41 is an illustration showing the data structure of the command ID section 1504 of a command frame.

Command identification bits (bit 0 to bit 4) are bits for identifying the type of a command. The command type is described later by referring to FIGS. 42A to 42C.

A notification-command identification bit (bit 5) is effective in the case of the direction from a low-order module to a high-order module. This bit is used to identify a response command (0) or notification command (1). A response command identification bit (bit 6) is effective in the case of the direction from a low-order module to a high-order module. In this case, the bit is used to identify a notification command (0), positive response (0), or negative response (1). A command direction identification bit (bit 7) is used to identify a command (0) from a high-order module to a low-order module or a command (1) from a low-order module to a high-order module.

Moreover, the type-of-error information shown in FIG. 43A is added to the negative response command or error notification command.

In FIG. 43A, "v-α cable omission" is communicated when the image processing section 4200 is not connected with the camera section 4100. When the host terminal 4500 receives the error of the cable omission, it communicates the cable omission to a user. V-α communication error" is used when a communication error occurs in the communication between the image processing section 4200 and the camera section 4100. "IM-α communication error" is used when a communication error occurs in the communication between the camera section 4100 and the pan tilting section 4300. In the case of this error, a code showing the reason of a serial communication error in FIG. 43B is added to the next octet as an error reason.

"RS232C communication error" is used when a communication error occurs in the communication between the host terminal 4500 and the image processing section 4200. In the case of this error, a code showing the reason of a serial communication error in FIG. 43B is added to the next octet as an error reason. "Command for unconnected module" is used when an unconnected module is designated in module designation bits of a frame ID. "Undefined command" is used when an undefined command is designated in type-of-command designation bits of a command ID. "Undefined parameter" is used when a parameter is designated which is not defined by the parameter section of a command or which is out of a specified range. "Command state mismatch" is used when a command designated by the type-of-command designation bits of a command ID is not accepted under the present state. "Parameter state mismatch" is used when a parameter designated by the parameter section of a command is not accepted under the present state. "Time-out" is used when an operation designated by a high-order module is not normally terminated due to time-out.

By referring to FIGS. 42A to 42C, commands to be processed by the camera section 4100, image processing section 4200, and pan tilting section 4300 are described below.

FIG. 42A is an illustration for explaining image processing section commands. An image processing section ("1000" of binary notation) is set to module identification bits (FIG. 40) of the frame ID of an image processing section command. When the image processing section 4200 recognizes a command addressed to an image processing section from the host terminal 4500, it analyzes the contents of the command and executes the command. An "error notification" command is used to communicate an error detected by each module to the host terminal 4500. The parameter section of the "error notification command" is shown in FIG. 45. The "error notification command" is used by the image processing section 4200, camera section 4100, and pan tilting section 4300.

Factors for setting the errors shown in FIG. 43A are set to types of error. In the case of serial data communication errors, the errors shown in FIG. 43A are also added.

A state request command is used for the host terminal 4500 to obtain the state of each module. Parameters of the state request command are shown in FIGS. 45A and 45B.

In FIGS. 45A and 45B, a parameter 1 sets a state to be obtained. A code "00h" designates a system state, "01h" designates a white balance state, "02h" designates a fade state, and "03h" designates a switch state. Symbol "h" denotes a hexadecimal number.

FIG. 46 shows parameters of a response command when setting a system state to the state designation parameter of a state request command.

In FIG. 46, the product code shows the version of the hardware of a module and the product version shows the version of software.

FIG. 47 shows the parameters of a response command when setting a white balance state to the state designation parameters of a state request command.

FIG. 48 shows the parameters of a response command when setting a fade state to the state designation parameters of a state request command.

FIGS. 49A and 49B show the parameters of a response command when setting a switch state to the state designation parameters of a state request command.

The value of the DIP switch 4229 shown in FIG. 26 is set to low-order four bits of a setting state parameter. In FIG. 26, switch-off corresponds to "0" and switch-on corresponds to "1".

A white balance request/response command is used for the host terminal 4500 to control white balance. FIG. 50A shows the parameters of the white balance request/response command. In FIG. 50A, symbol X denotes a command direction identification bit and (denotes a response command identification bit.

White balance mode designation designates the operation mode of white balance.

When the parameter 1 shows an auto mode, the auto white balance mode is set. When the parameter 1 shows a correction mode, a user corrects white balance through correction operation. Shift to the correction mode may not be smoothly performed depending on a video. In this case, a negative response is returned in which white balance correction NG is added to the type of error. Even when white balance correction is NG, the correction mode is set. When the parameter 1 is set to a manual mode, a user sets white balance through manual operation. Moreover, a correction designation parameter designates the direction to be corrected by the parameter 1 when white balance is set to the correction mode. This is an operation effective when WB mode is the correction mode. A set value ranges between "00h" (red enhancement) and "1ffh" (blue enhancement). A manual setting parameter sets color tones R and B by the parameters 1 and 2 when the WB mode is manual. It is effective when the WB mode is manual.

A fade request/response command is used to fade in or fade out a video signal. When the system control section 4250 of the image processing section 4200 receives the command, it controls the signal processing circuit 4202 to perform fade-in or fade-out.

Figure 51:
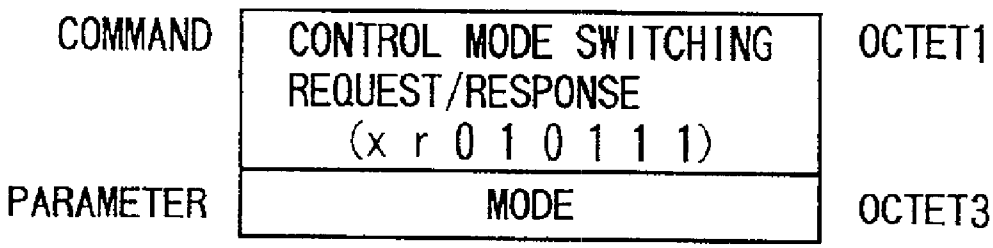
FIG. 51 is an illustration for explaining the parameter of a control-mode-switching request/response.

A control mode switching request/response is used to switch control modes when operating an image pickup apparatus from the remote controller 4310. FIG. 51 shows the parameter of the control mode switching request/response.

In FIG. 51, the mode setting parameter includes "00h" for a host control mode and "01h" for a local control mode 1.

When the host control mode is set, the image processing section 4200 communicates a command supplied from the remote controller 4310 to the host terminal 4500 without decoding the command. The host terminal 4500 controls an image pickup apparatus in accordance with the command. When a local control mode 1 is set, the image processing section 4200 decodes a code sent from the remote controller 4310 in accordance with the remote-controller control task of the system control section 4250 of the section 4200 and performs the control corresponding to the key operation of the remote controller 4310.

Then, commands of the camera section 4100 in FIG. 42B are described below.

A camera module is set to module designation bits of the frame ID of a camera-section command. When the camera section 4100 receives a command addressed to the camera section 4100 from a high-order module (e.g. host terminal 4500 or image processing section 4200), it analyzes the contents of the command and executes the command. The "state request command" in FIG. 42B is used for a high-order module to obtain the state of the camera section 4100. Version, focus, zoom, and exposure are states obtained by the command.

A focus command is used for focus control and parameters of a focus request/response command are shown in FIGS. 52A and 52B.

The parameters for operations in FIGS. 52A and 52B include focus mode designation, manual focus start, position designation, manual focus stop, speed setting, and one-push AF.

Figure 53:
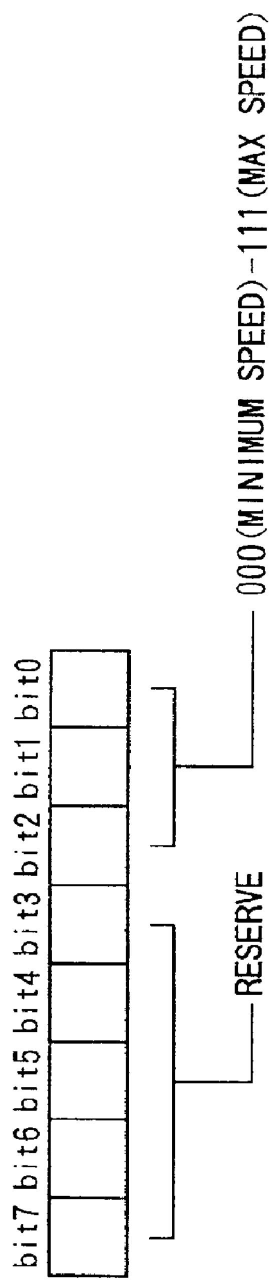
FIG. 53 is an illustration for explaining the parameter of a response command in which a white balance state is set to the state designation parameter of a state request command.

In the focus mode, a mode for focus is set by the parameter 1. The parameter 1 includes auto focus (AF) or manual focus (MF). The manual focus start designates the start of the focus operation designated by the parameter 1 when the focus mode is set to manual focus. The parameter 1 is FAR or NEAR. FAR moves a focus ring in the FAR direction. NEAR moves the focus ring in the NEAR direction. Position designation reads and sets the position of the focus ring by the parameter 1. "Read" reads the present position of the focus ring and returns it in accordance with a response command. "Set" moves the focus ring to a position designated by the parameters 2 and 3. "Range read" reads the minimum and maximum movable positions of a focus and returns them in accordance with a response command. These values depend on the position of a zoom ring. There is a solid difference because there is the fluctuation of the setting position of a photosensor for positioning. "Manual focus (MF) stop" stops a focus operation under manual focus. When the designation of this operation is received in the auto focus mode, a negative response command is returned. "Speed" reads and sets a focus driving speed. The speed is set in eight levels as shown in FIG. 53.

Moreover, "one-push AF" starts auto focus operation when receiving manual-focus-mode operation in the manual focus mode and shifts to manual focus mode to return a response command when deciding that the focus is adjusted. When it cannot be decided that the focus is adjusted even after a certain time elapses, "one-push AF" shifts to the manual mode and returns a negative response to which a reason code for "time-out" is added. When "one-push AF" receives this operation in the auto focus mode and decides that the focus is adjusted, "one-push AF" shifts to the manual mode to return a response command. When it is impossible to decide that the focus is adjusted even after a certain time elapses, "one-push AF" shifts to the manual mode to return a negative response to which a reason code for "time-out" is added.

Figure 54:
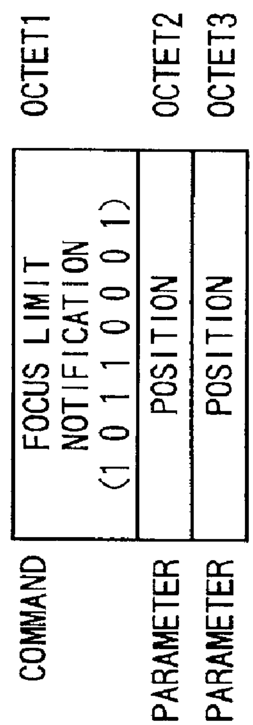
FIG. 54 is an illustration for explaining the parameters of focus limit notification.

"Focus limit notification" is communicated to a high-order module when the focus reaches FAR end or NEAR end. The position of an end is set to a position parameter. FIG. 54 shows position parameters.

A zoom request/response command is used to control zoom. FIGS. 55A and 55B show parameter structures.

Then, each operation parameter shown in FIGS. 55A and 55B is described below.

Figures 56, 57:
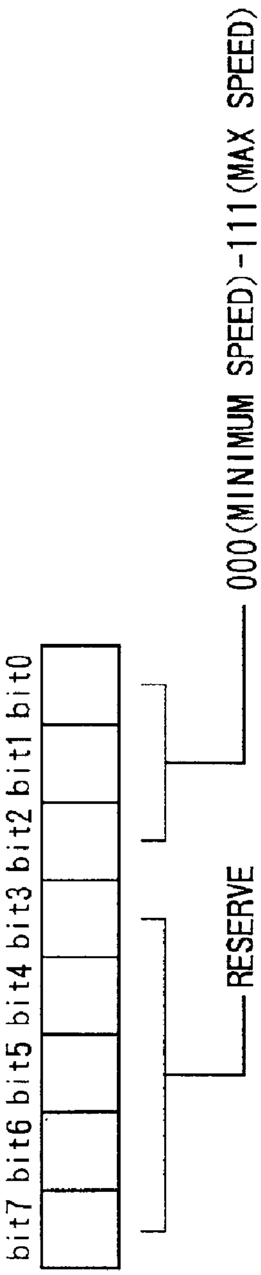
FIG. 56 is an illustration for explaining a command for setting a zoom speed.
FIG. 57 is an illustration for explaining the parameter of zoom limit notification.

"Start" is used to start a zoom operation designated by the parameter 1. When this operation is already performed and the command is further received, a negative response showing parameter state mismatch is returned. "TELE" moves a zoom ring in the TELE direction by the parameter 1. "WIDE" moves the zoom ring in the WIDE direction. "Read" in the case of "position designation" reads the present position of the zoom ring and returns the position by a response command. "Set" moves the zoom ring to a position designated by the parameters 2 and 3. A set value ranges between 0 and maximum movable position. A response command for this operation is issued after the zoom ring has moved to a designated position. "MAX read" reads the maximum movable position of the zoom ring. This value includes a solid difference due to the fluctuation of the setting position of a photosensor for zoom positioning. "Stop" stops the zoom operation started by the start operation or position designation operation. "Speed" reads and sets a zoom driving speed. The speed is set in eight levels as shown in FIG. 56.

"Zoom limit notification" performs notification in accordance with the command when the zoom ring reaches TELE end or WIDE end after starting the zoom operation.

An exposure request/response command is used to perform the exposure control operation. FIGS. 58A and 58B show the parameters of the command.

The operation parameters in FIGS. 58A and 58B are described below.

"Exposure mode designation" designates an exposure operation by the parameter 1. "AE mode" is a mode for automatically controlling exposure and a control mode can be selected by the AE mode designation. "Manual mode" controls exposure when a user controls shutter speed, iris, and gain. "Type-of-AE designation" designates the type of AE when the exposure operation mode is the AE mode. When this operation is received in the manual mode, a negative response command is transmitted. "Full auto AE" sets full auto AE. "Shutter-speed priority AE" performs AE by fixing a shutter speed to the shutter speed designated by the parameter 2. FIG. 59 shows the relation between codes and shutter speeds. "Iris priority AE" performs AE by fixing an iris value to the iris value designated by the parameter 2. FIG. 60 shows the relation between codes and iris values.

"AE lock" locks exposure under the state in which the exposure mode is the AE mode. When this operation is received in the manual mode, a negative response command is transmitted. "AE target value corrections corrects the target value of brightness of AE. When the operation is received in the manual mode, a negative response command is transmitted. "Shutter speed" sets a shutter speed. When this operation is received in the exposure mode set to a mode other than the manual mode, a negative response command is transmitted. The camera section 100 converts the parameter 2 in accordance with FIG. 59 and sets it to TG. "AGC gain" sets an AGC gain. When this operation is received in the exposure mode set to a mode other than the manual mode, a negative response command is transmitted. The camera section 4100 converts the parameter 2 in accordance with FIG. 60 and sets it to AGC. "Iris" sets an iris. When this operation is received in the exposure mode set to a mode other than the manual mode, a negative response command is transmitted. The diaphragm can be set in the range between "54h" (close) and "A9h" (open).

Then, commands for the pan tilting section in FIG. 42C are described below.

A pan tilting module is set to the module designation bits of the frame ID of a pan-tilting-section command. When the pan tilting section 4300 receives a command addressed to the image processing section 4200 from a high-order module, it analyzes the contents of the command and executes the command.

A state command is used to obtain the state of a pan tilting head. FIG. 61 shows the parameter of a state request command and FIGS. 62A to 62D show the parameters of a state corresponding command.

"Setup request/response" in FIG. 42C is a command for detecting a home position. When the pan tilting section 4300 receives the command, it detects the home position of an absolute position and returns to the original position. Original positional information is added to "setup response". It is not permitted to transmit other tripod-head-system request command before the "setup response" is received. FIG. 61 shows the parameters of the "setup response". The operation space in the pan tilting section 4300 is shown in FIG. 27 described above.

A "home position request" command is transmitted to return a pan tilting head to its home position. A "pan tilting request/response" command is used to control a pan motor and a tilt motor. FIGS. 64A and 64B show the parameters of the command.

Figure 65:
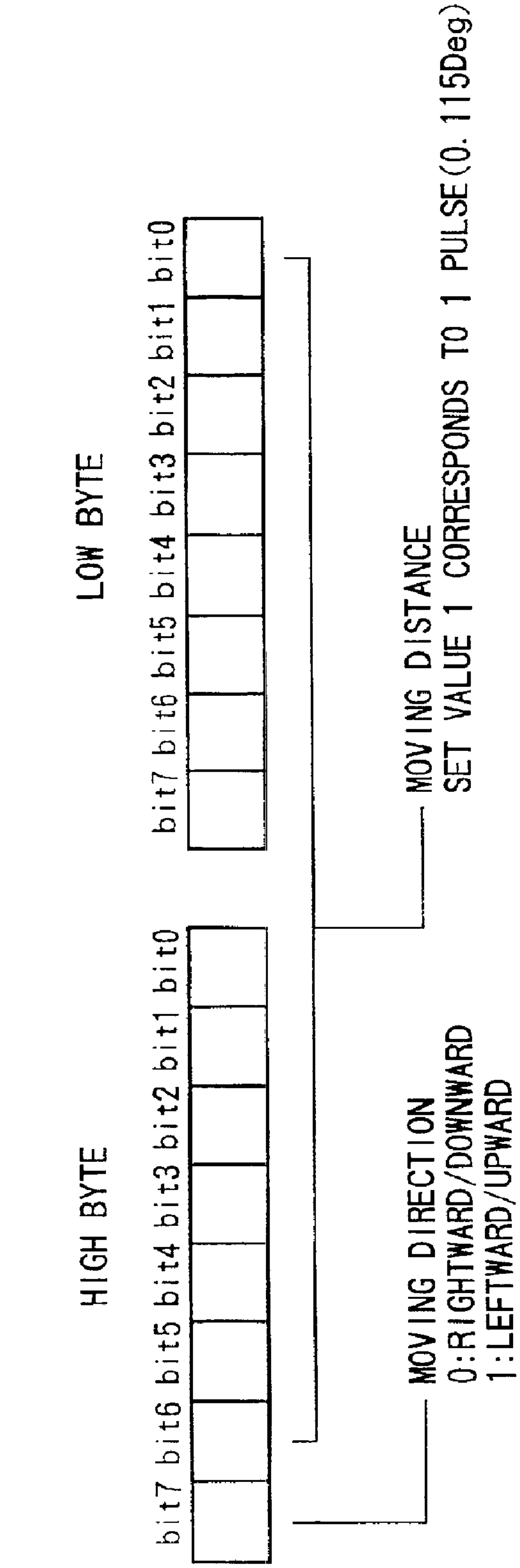
FIG. 65 is an illustration for explaining the format of parameters for designating relative positions.

In FIGS. 64A and 64B, "start" starts the operation of the pan/tilt section 4300. When the operation is already started, a negative response for parameter state mismatch is returned if the above command is received. "Stop" stops the pan/tilt operation started in accordance with the start operation and position designation operation. "Speed" reads and sets a speed for performing pan tilting. "Relative position designation" moves the pan/tilt section to the position designated by the parameters 2 and 3 on the basis of the present position. A response command for this operation is issued after the movement to a designated position is completed. FIG. 65 shows the formats of the parameters 2 and 3.

Absolute position designation" is a command for moving a pan tilting head to the position designated by the parameters 2 and 3. To designate an absolute position, "setup command" is transmitted. It is possible to detect "0" (home position) of the absolute position with this setup command. When receiving this command before detecting the home position, the home position is detected. When receiving a command to which a position out of range is set, a negative response of an undefined parameter is returned. A response command for this operation is issued after the movement to a designated position is completed.

"Limit notification command" in FIG. 42C is a command communicated after starting the pan tilting operation or when reaching a pan end or tilt end. FIGS. 66A and 66B show the parameters of the command.

"Remote controller notification command" is used to communicate a code received from the remote controller 4310 to a high-order module. FIGS. 67A and 67B show the parameters of the command. The parameter "operation" in FIG. 67A is used for key-up (0) or key-down (1). Moreover, "code" corresponds to each key of the remote controller 4310 in FIG. 33A.

Furthermore, the "LED request/response" command in FIG. 42C is used to control the indication of the LED 4304. FIGS. 68A and 68B show the parameters of the command. "Default operation" in FIG. 68B is a mode for the pan tilting section 4300 to control the LED 4304. Green LED normally lights up for power on. Green LED is flickered while the key of the remote controller 4310 is pressed. When an ID is mismatched, green and red LEDs are turned on to turn on orange LED. "Forced turn-off" turns off an LED designated by the parameter 1. "Forced turn-on" turns on an LED designated by the parameter 1. "Forced flicker" flickers an LED designated by the parameter 1 at a cycle designated by the parameter 2. The flicker cycle is shown in FIG. 69.

Finally, the "power supply notification command" in FIG. 42C is used to notify a high-order module when the power of the pan tilting section 4300 is input.

A data frame is transferred between the camera head section 4100 and the image processing section 4200.

Figure 70:
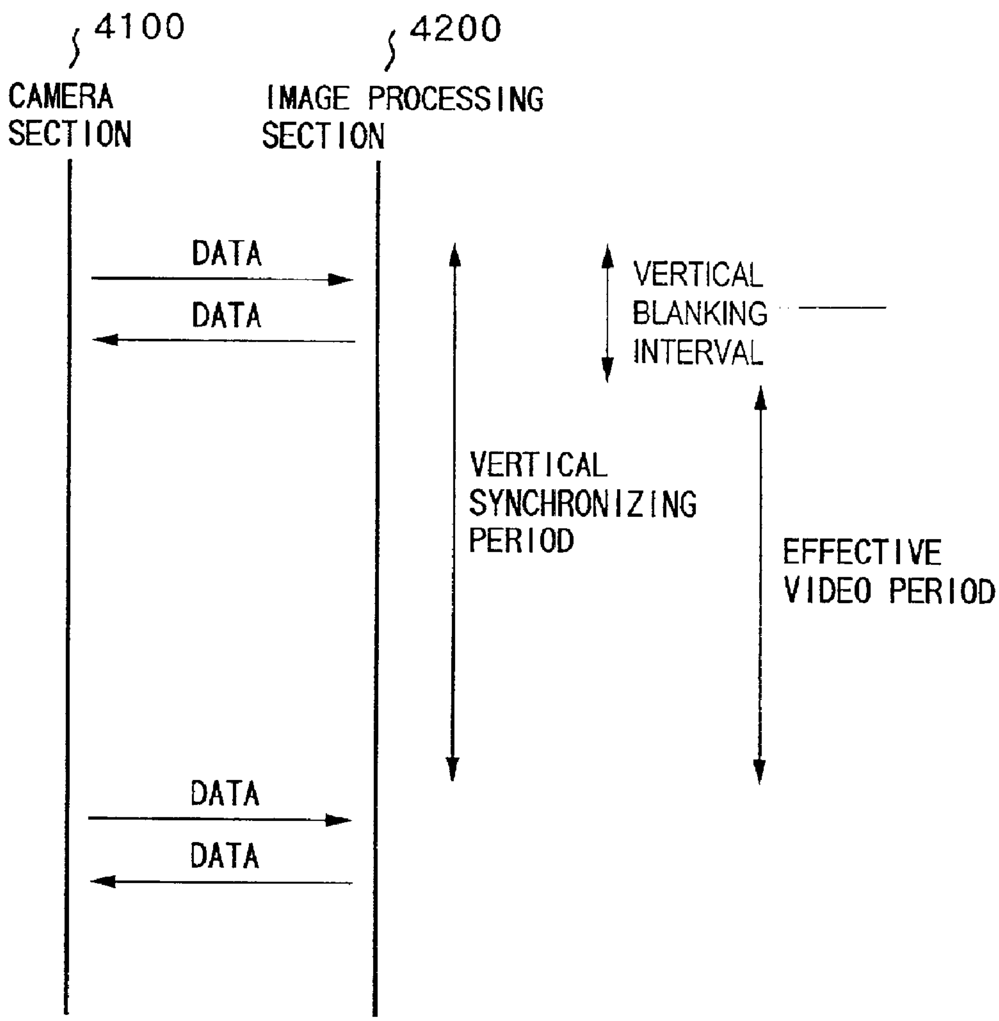
FIG. 70 is an illustration for explaining the timing for data transfer between a camera section and an image processing section.

As shown in FIG. 70, a data frame is transferred between the camera section 4100 and the image processing section 4200 every vertical blanking (V blanking) interval. There is not any confirmation frame corresponding to an ACK/NACK frame of a command frame. Focus data and brightness data are transmitted to the camera section 4100 from the image processing section 4200 by data frames. Data values for shutter speed and AGC gain are sent to the image processing section 4200 from the camera section 4100.

Figure 71:
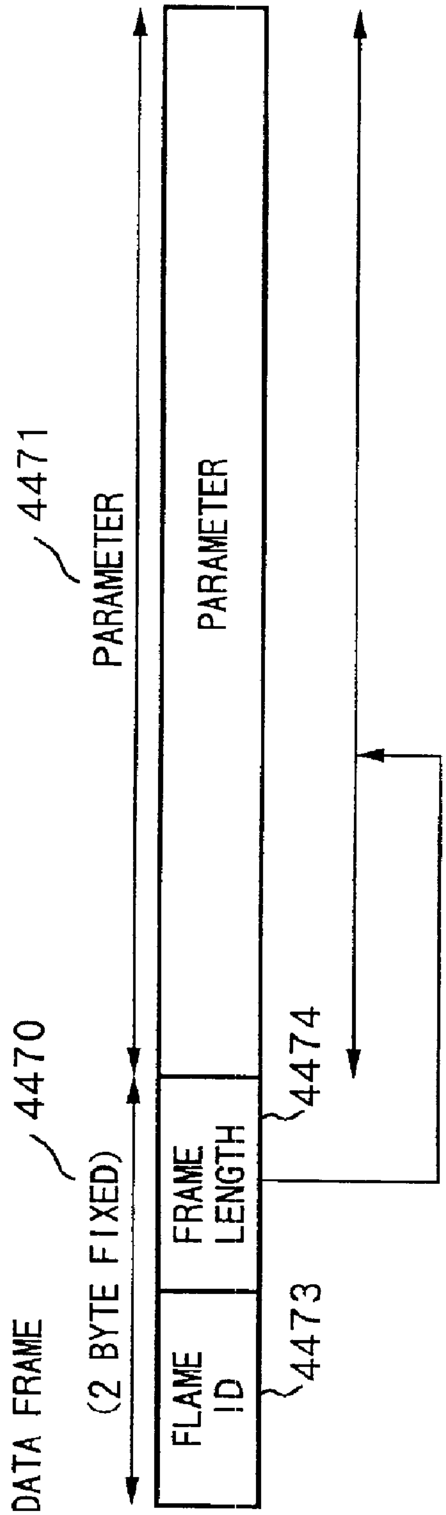
FIG. 71 is an illustration for explaining the data format of a data frame.

FIG. 71 is an illustration showing the format of a data frame.

This data frame is provided with a frame header section 4470 and a parameter section 4471. The frame header section 4470 comprises two bytes of a frame ID 4473 and a frame length 4474. When the value of the frame ID 4473 is "f0h", it shows a data frame from the image processing section 4200 to the camera section 4100. When the value of the frame ID 4473 is "f1h", it shows a data frame from the camera section 4100 to the image processing section 4200.

An image pickup apparatus is operated through the remote controller 4310 or the operation panel 4510 of the host terminal 4500. When operating the image pickup apparatus through the remote controller 4310, local control mode and host control mode are set depending on whether a module for decoding and executing a notification command sent from the remote controller 4310 is the host terminal 4500 or image processing section 4200. The local control mode is a mode for the image processing section 4200 to control an image pickup apparatus under operation by the remote controller 4310. Default setting after turning on the power supply is performed in the local control mode. In the local control mode, the image processing section 4200 decodes a command generated by operating the remote controller 4310 and the image pickup apparatus is controlled in accordance with the command.

The host control mode is a mode for the host terminal 4500 to control an image pickup apparatus by operating the remote controller 4310. To shift from the local control mode to the host control mode, the modes are switched by transmitting a "control mode switching request command" from the host terminal 4500 to the image processing section 4200. When the host control mode is set, the image processing section 4200 transmits a command supplied from the remote controller 4310 to the host terminal 4500. Moreover, the host terminal 4500 decodes the command supplied from the remote controller 4310 to control the image pickup apparatus.

Figure 72A:
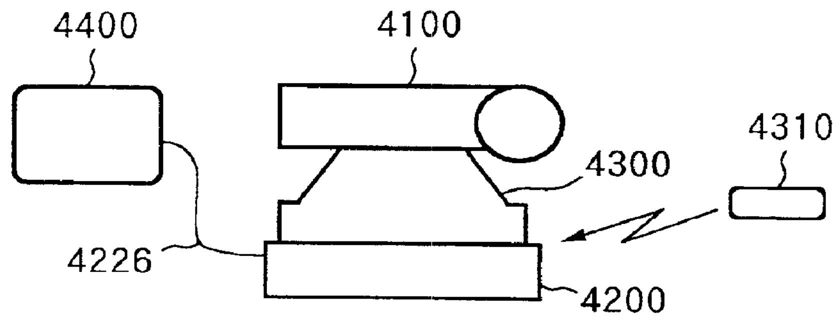
FIGS. 72A to 72C are illustrations for explaining the connection between the camera section, pan tilting section, image processing section, and monitor and host terminals of the image pickup apparatus of the tenth embodiment.
Figure 72B:
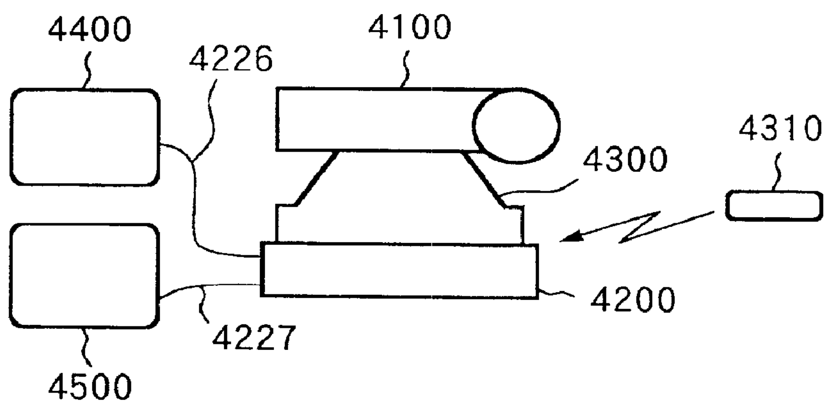
Figure 72C:
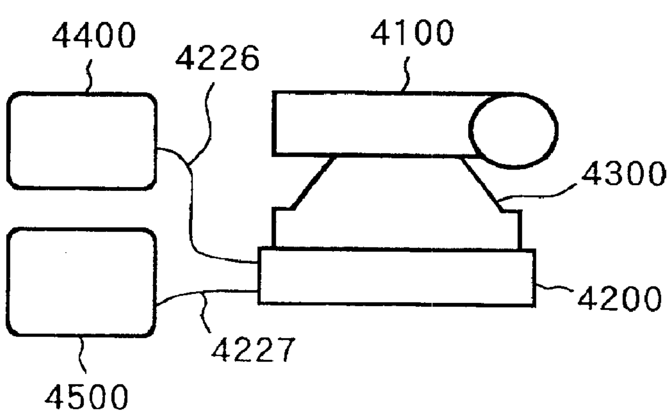

FIGS. 72A to 72C are illustrations for explaining the configuration for operating the image pickup apparatus of the tenth embodiment. FIG. 72A shows the configuration for operating the image pickup apparatus in the local control mode by using the remote controller 4310 as an operation section. FIG. 72B shows the configuration for operating the image pickup apparatus in the host control mode by using the remote controller 4310 as an operation section. Moreover, FIG. 72C shows the configuration for operating the image pickup apparatus from the host terminal 4500 by using the operation panel 4510 as an operation section.

Figure 73A:
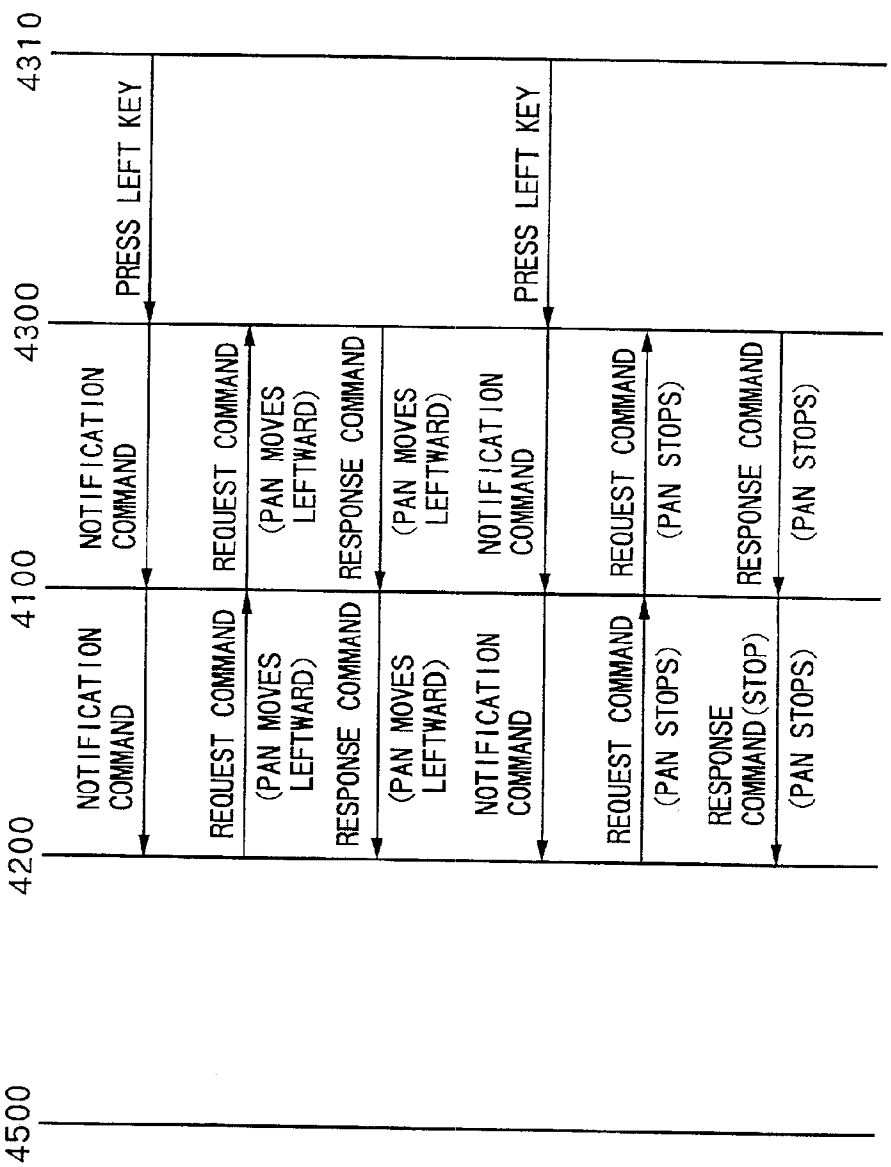
FIGS. 73A to 73C are illustrations for explaining the transfer of commands between the camera section, pan tilting section, image processing section, and monitor and host terminals of the image pickup apparatus of the tenth embodiment.
Figure 73B:
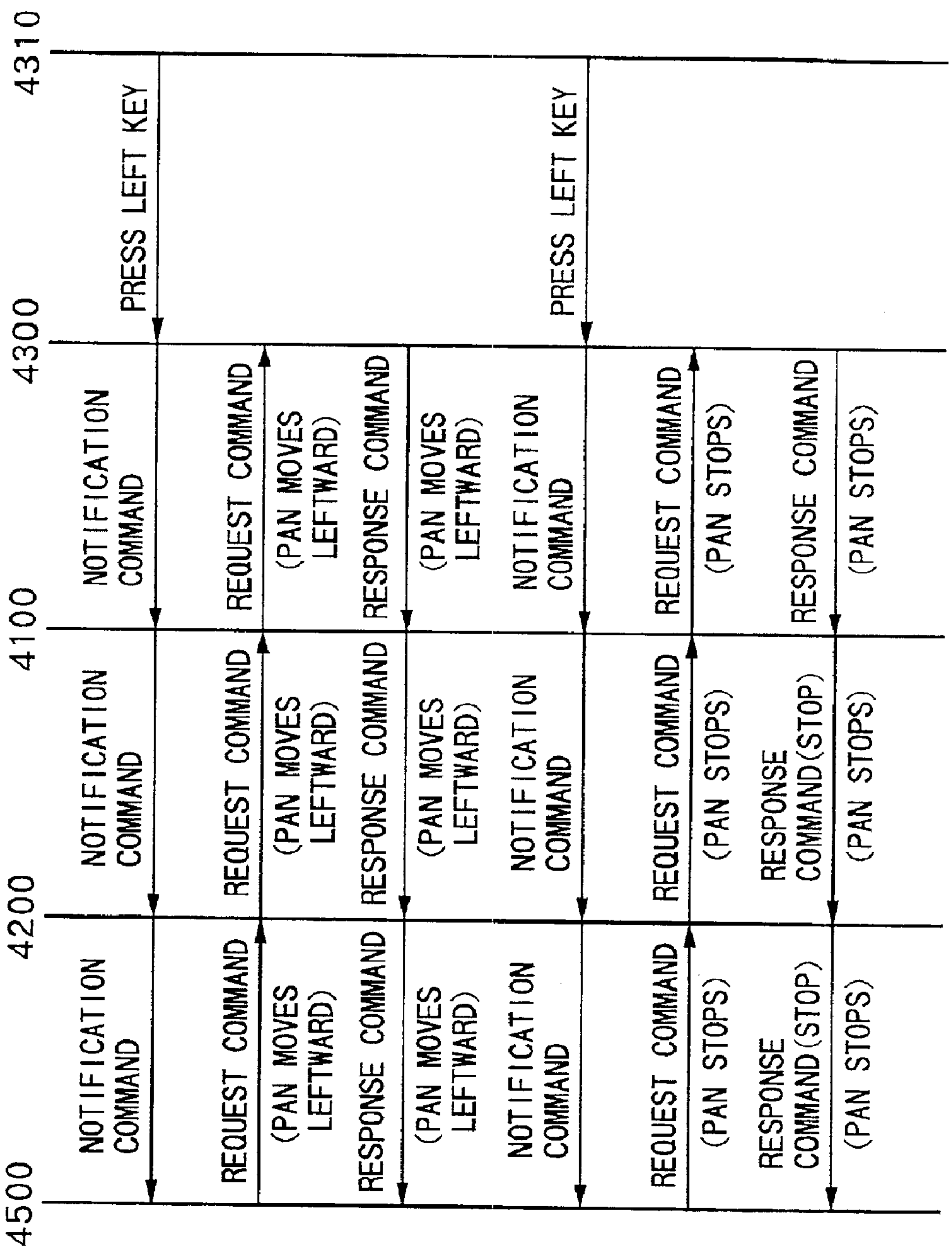
Figure 73C:
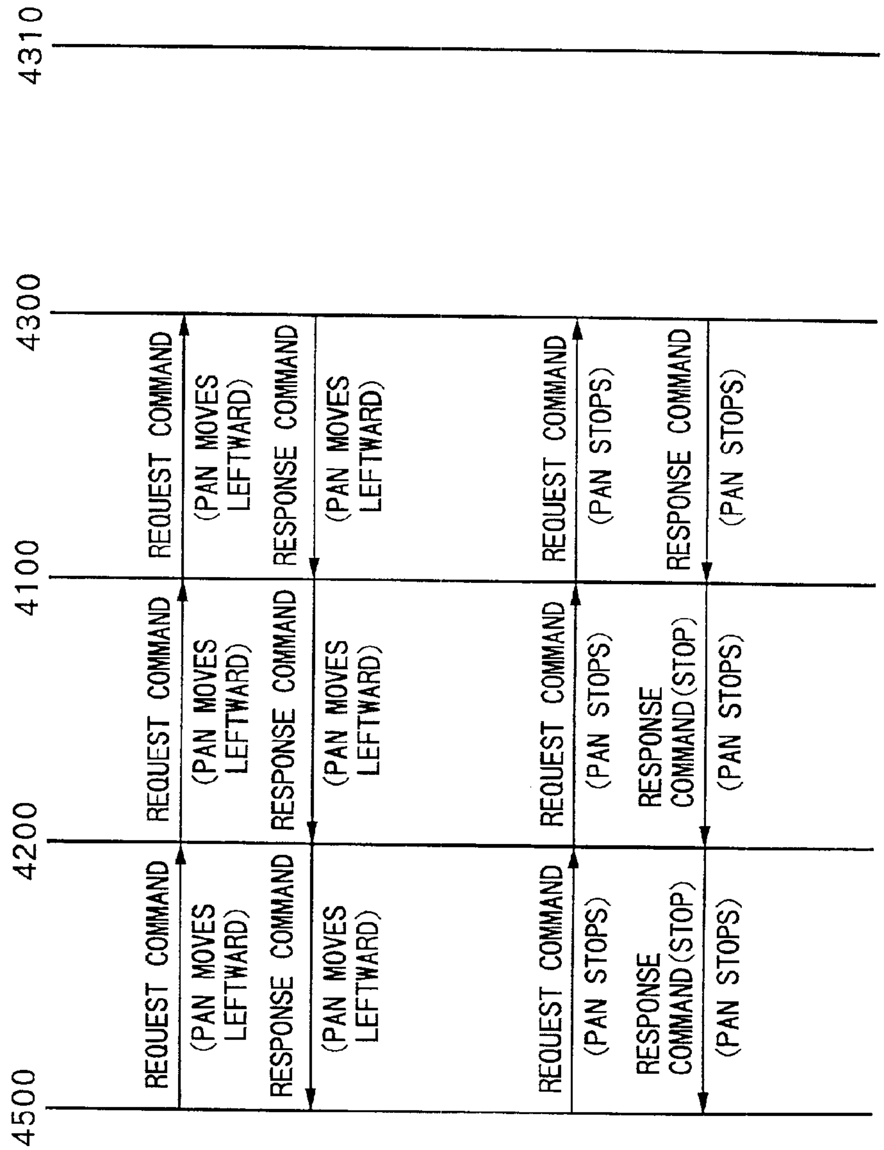

FIGS. 73A to 73C are illustrations for explaining flows of commands corresponding to FIGS. 72A to 72C, in which flows of commands are shown as examples when moving the pan tilting section 4300 of the image pickup apparatus and moving the video displayed on the monitor 4400 leftward.

FIG. 73A show sequences in the local control mode when controlling the image pickup apparatus from the remote controller 4310 without connecting the host terminal 4500. In this case, the user moves the video displayed on the monitor 4400 by pressing the LEFT key of the remote controller 4310 and stops the video by releasing the LEFT key. When the user presses the LEFT key of the remote controller 4310, infrared radiation corresponding to the LEFT key is generated and the remote-controller light receiving section 4320 of the pan tilting section 4300 receives the infrared radiation. The system control section 4301 of the pan tilting section 4300 converts the code of the received infrared radiation into a command from the remote controller 4310 and transmits the command to the camera section 4100. The parameter of the command has the content of "LEFT key is pressed". The camera section 4100 thus receiving the command from the remote controller 4310 transmits the command to the image processing section 4200. Then, the image processing section 4200 receiving the command transmits the command to the host terminal 4500 when the control mode of the remote controller 4310 is the host control mode but decodes and executes the command received from the remote controller 4310 when the control mode of the remote controller is the local control mode.

Because the control mode of the remote controller is the local control mode, this sequence decodes the command sent from the remote controller 4310 and transmits a request command for moving a pan tilting head leftward to the camera section 4100. The module identification bit of a frame ID in the above case is set to "pan tilting". The camera section 4100 receiving the request command transmits the received command to the pan tilting section 4300 because the module identification bit of the request command is "pan tilting". Moreover, the pan tilting section 4300 receiving the request command decodes the type and parameter of the command and performs a designated operation because the module identification bit of the request command is "pan tilting". In this case, the pan tilting section 4300 rotates the pan motor counterclockwise.

Then, when the start operation is completed, the section 4300 transmits a positive-response command to a high-order module. It is necessary to return the response command by setting "1" to the command direction identification bit of the command ID of the received request command. The camera section 4100 receiving the response command transmits the received command to the image processing section 4200. Thereby, the image processing section 4200 analyzes the response command. In this case, because of a positive response command, it is possible to recognize that the operation for moving the video leftward requested to a pan tilting head normally ends. Thus, the user can move the video displayed on the monitor 4400 leftward by pressing the LEFT key of the remote controller 4310.

Moreover, when the user releases the LEFT key of the remote controller 4310, pan tilting is stopped. That is, when the user releases the LEFT key of the remote controller 4310, the infrared radiation corresponding to the LEFT key is not generated. Thereby, the remote-controller light receiving section 4320 of the pan tilting section 4300 recognizes that the infrared radiation is not generated and transmits a command to the camera section 4100. The parameter of the command has the content of "LEFT key is released". The command is communicated up to the image processing section 4200 similarly to the case in which a key is pressed. The image processing section 4200 decodes the received command and transmits a request command for stopping pan tilting to the camera section 4100. The request command is communicated up to the pan tilting section 4300 and thereby, the pan tilting section 4300 stops the pan operation and returns a positive response. Thus, the user can stop the pan operation by releasing the LEFT key of the remote controller 4310.

FIG. 73B is an illustration showing a sequence in the host control mode when connecting the host terminal 4500 and controlling an image pickup apparatus from the remote controller 4310.

The user moves a video displayed on the monitor 4400 leftward by pressing the LEFT key of the remote controller 4310. In FIG. 73A, the image processing section 4200 decodes a command supplied from the remote controller 4310 and controls the pan tilting section 4300. In FIG. 73B, however, the host terminal 4500 decodes the command and controls the section 4300. The image processing section 4200 receiving the command transmits the received command to the host terminal 4500 because the control mode of the remote controller 4310 is the host control mode. The host terminal 4500 decodes the command and transmits a request command for moving the pant tilting section 4300 leftward to the pan tilting section 4300.

FIG. 73C shows a sequence for directly controlling an image pickup apparatus from the host terminal 4500 by connecting the host terminal 4500 without using the remote controller 4310.

In this case, the user designates a button for moving a video displayed on the monitor 4400 leftward by the application of the host terminal 4500 through a mouse. The host terminal 4500 transmits a request command for moving a pan tilting head leftward to the pan tilting section 4300. When the user releases a mouse button, the host terminal 4500 transmits a request command for stopping the pan tilting head to the pan tilting section 4300.

Figure 74:
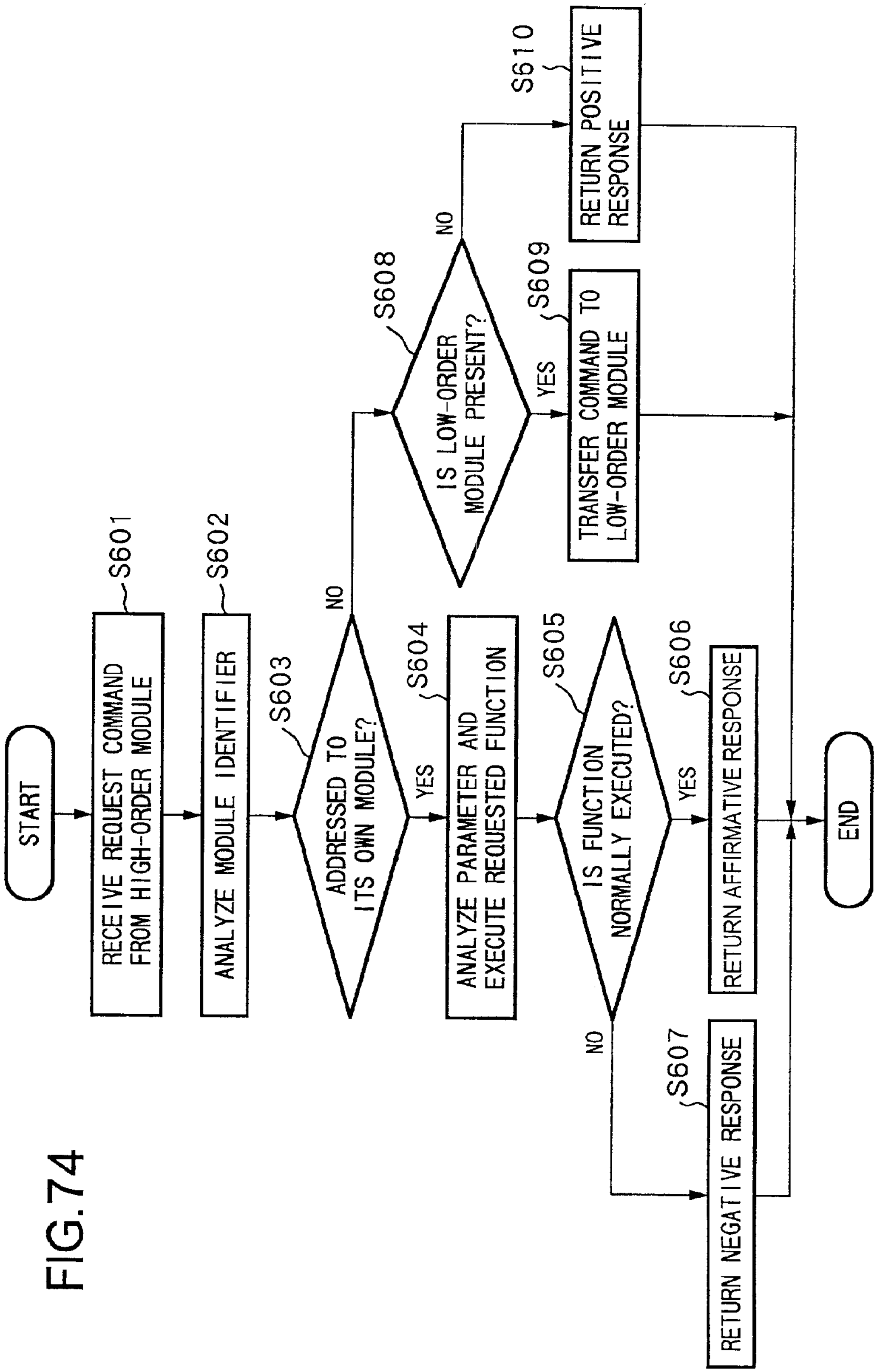
FIG. 74 is a flow chart showing the command reception processing by each module of the tenth embodiment.

FIG. 74, in connection with the sequences of FIGS. 38A to 38C and FIGS. 73A to 73C, is a flow chart for explaining operations of the system control section of each module when each module (camera section 4100, image processing section 4200, or pan tilting section 4300) of an image pickup apparatus receives a command from a high-order module.

First, in step S601, a command is received from a high-order module. The type of command received from the high-order module is a request command. Then, in step S602, the module identification bit of the frame ID of the command frame received in step S601 (see FIG. 40) is analyzed. Then, in step S603, it is analyzed whether the address of the module identification bit is its own address. When the address is its own address, the process proceeds to a step S604. When the address is the address of other module, then proceeds to a step S608. In the step S604, because the received request command is addressed to the module of its own, the parameter of the request command is analyzed to execute a function designated by the parameter. Then, in step S605, it is determined whether the designated function is correctly executed. If the function is correctly executed, then proceeds to a step S606, a positive response (see FIG. 41) is transmitted to a high-order module. If the function is not correctly executed in the step S605, then proceeds to a step S607, a negative response (see FIG. 41) is transmitted to the high-order module. Moreover, a type-of-error code for showing the reason for negation is added to the tail of the negative response frame (see FIG. 43A).

When the received request command is not addressed to the module of its own in the step S603, the process proceeds to a step S608, it is determined whether the addressed module is a module at lower-order than the module of its own. If a lower-order module is present, then the process proceeds to a step S609. If a lower-order module is not present, then proceeds to a step S610. That is, if a module receiving the request command is the pan tilting section 4300, the processing in the step S610 is implemented because no low-order module is present. On the other hand, if the module receiving the request command is the camera section 4100, then there are cases in which a low-order module (pan tilting section 4300) is present (connected) or absent depending on the structure of the system. Therefore, the camera section 4300 decides at the time of initialization whether the pan tilting section 4300 is connected and stores the decision result in the memory 4707 of the system control section 4108. Moreover, when a module receiving a request command is the image processing section 4200, a low-order module (camera section 4100) is always present because of the system structure as described above. In this case, the step S609 is always implemented after the step S608.

In the step S609, a request command received by a low-order module is transmitted. However, when no low-order module is present, the step S610 is implemented. In this case, because no low-order module is present, "1" is set to the command direction identification bit and response command identification bit of a command ID to return a negative response command to a high-order module. Moreover, a type-of-error code showing the reason for negation "command for unconnected module" is added to the tail of a negative response frame (see FIG. 43A).

Figure 75:
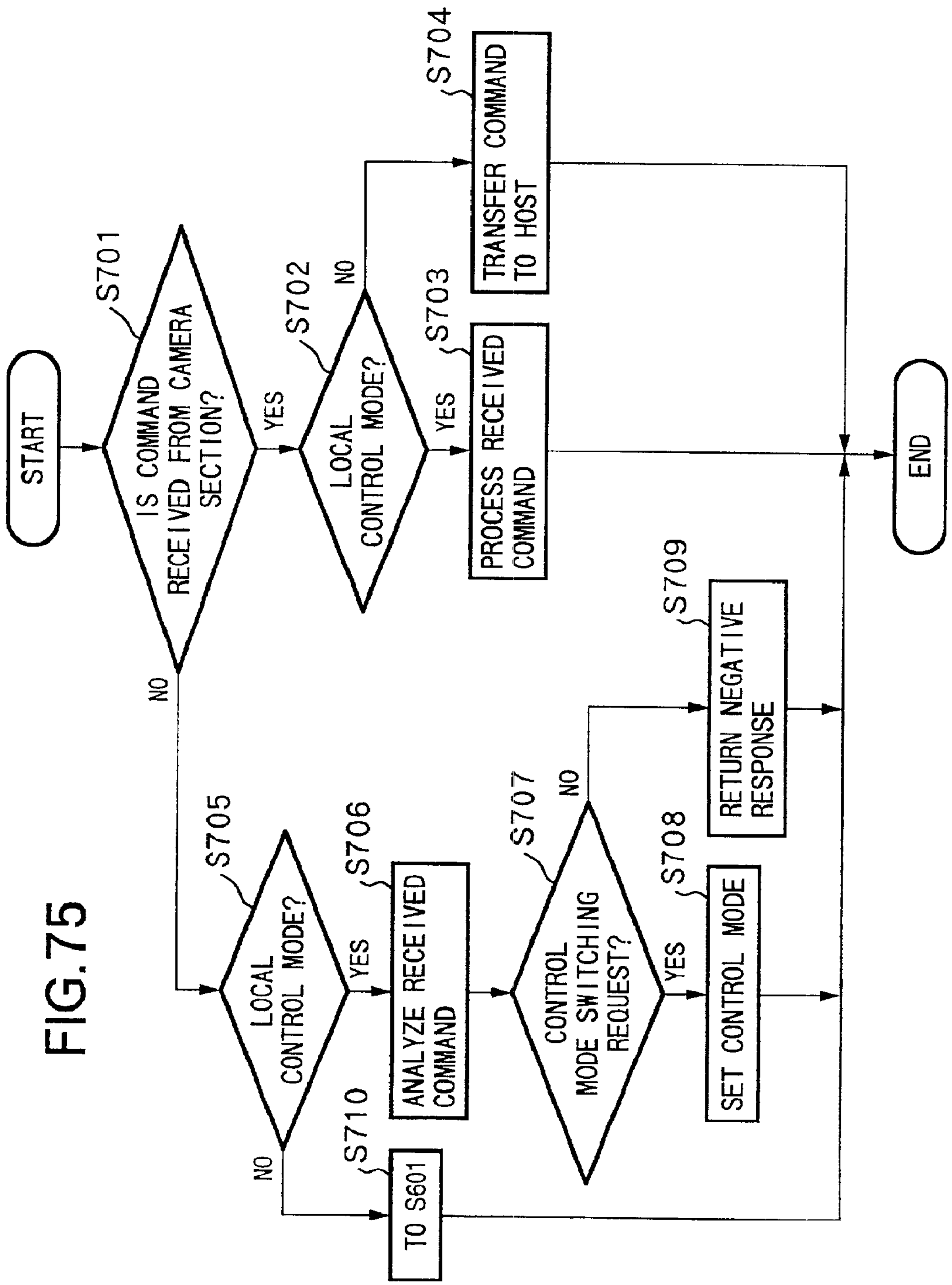
FIG. 75 is a flow chart showing the command reception processing by a module of the tenth embodiment.
Figure 76:
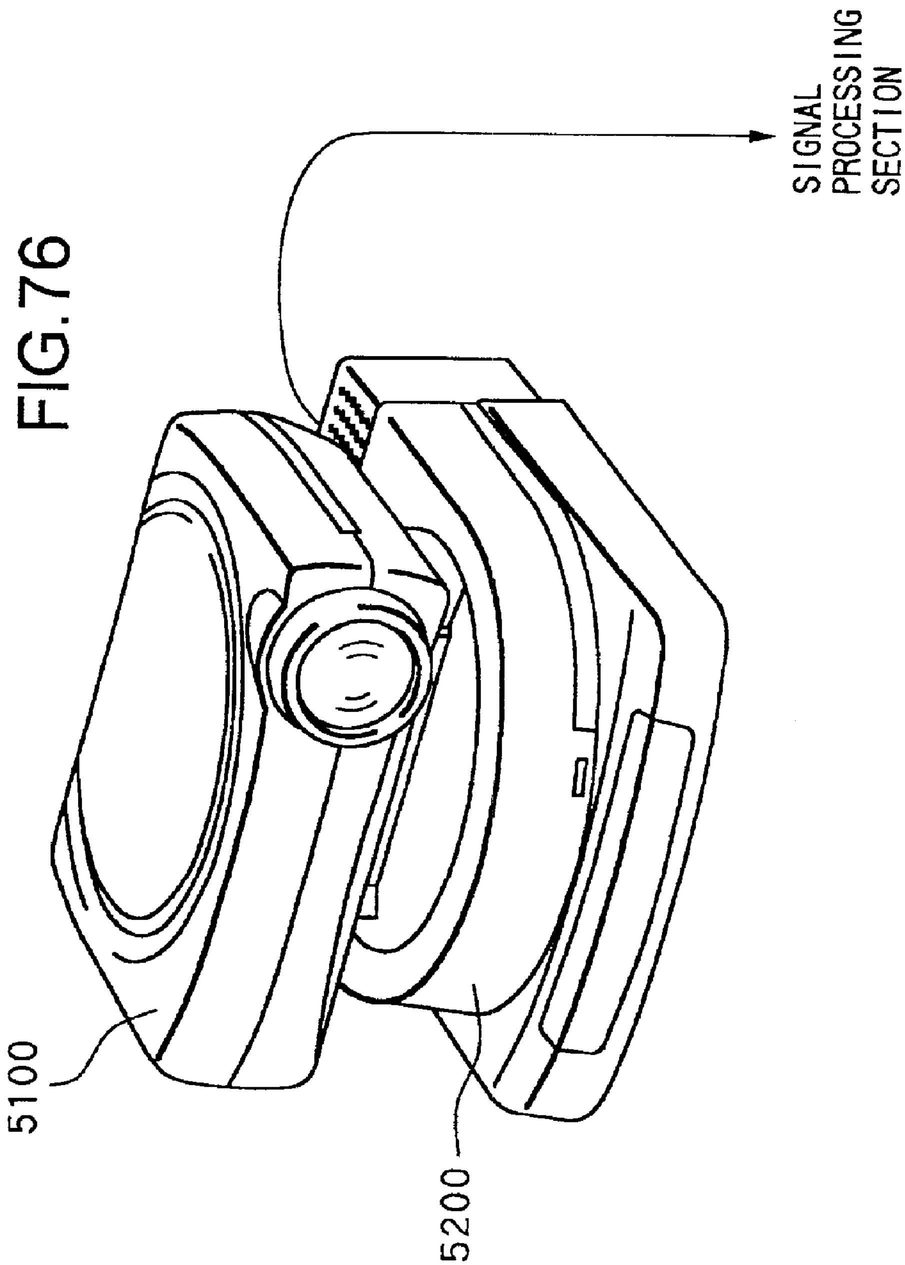
FIG. 76 is a full view of a camera system.
Figure 77:
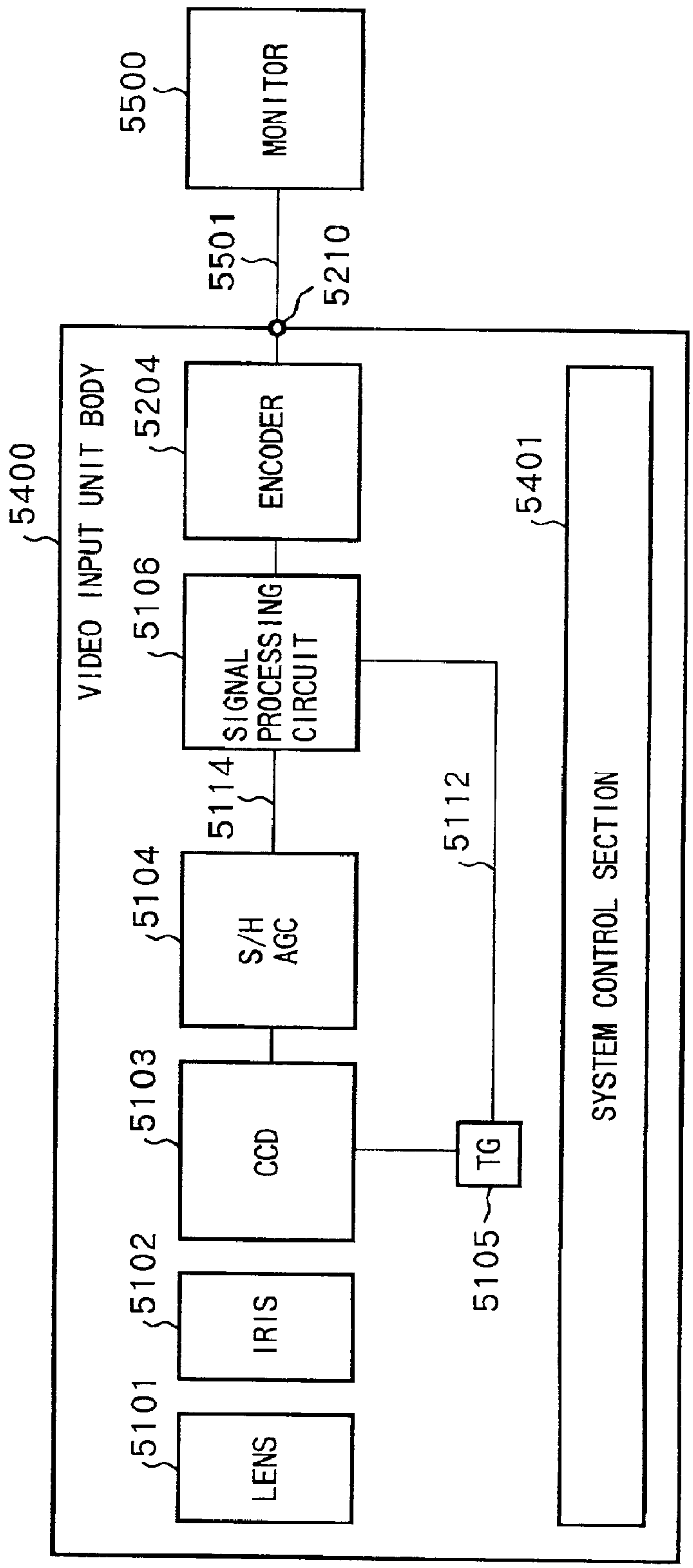
FIG. 77 is a block diagram showing the structure of a conventional video input unit.

FIG. 75, in connection with the sequences of FIGS. 73A to 73C, is a flow chart for explaining operations of a system control section when the image processing section 4200 receives a command from the camera section 4100 or host terminal 4500, which shows how the image processing section 4200 processes a received command according to the difference between control modes of the remote controller 4310 (host control mode and local control mode).

First in step S701, it is determined whether a received command is supplied from the camera section 4100 or host terminal 4500. If the command is supplied from the camera section 4100, the process proceeds to a step S702. However, if the command is supplied from the host terminal 4500, then proceeds to a step S705. In the step S702, it is determined whether the control mode is the local control mode or the host control mode when operating an image pickup apparatus through the remote controller 4310. When the control mode is the local control mode, then the process proceeds to a step S703. When the control mode is the host control mode, the process proceeds to a step S704. In the step S703, the parameter of a command received from the camera section 4100 (notification command or response command) is analyzed to perform the processing corresponding to the parameter. For example, the sequence in FIG. 73A passes through this step.

When a command received from the camera section 4100 is a command supplied from the remote controller 4310 (see FIG. 42*c*) and its parameter is "LEFT key down", a pan tilting request command (parameter: "start, pan left") is transmitted to the pan tilting section 4300. Moreover thereby, the buffer of the received command is released. When a command supplied from the camera section 4100 is a positive pan-tilting response command (see FIG. 42C) and its parameter is "start, pan left", it is recognized that a requested operation normally ends to release the buffer of the received command.

Moreover in the step S704, a command (notification command or response command) received from the camera section 4100 is transmitted to the host terminal 4500 because of the host control mode. The sequence in FIG. 73B passes through this step.

However, in the case of a command not supplied from the camera section 4100, then proceeds to a step S705, it is determined whether the control mode for operating an image pickup apparatus with the remote controller 4310 is the local control mode or host control mode. In the case of the local control mode, proceeds to a step S706. In the case of the host control mode, the process proceeds to a step S710. In the step S706, the type-of-command bits of the command ID of a received command are analyzed (see FIG. 41). In this case, the received command is a request command. Then, the process proceeds to a step S707 and then a step S708 is implemented in the case of the control mode switching request command (see FIG. 42A), but a step S709 is implemented in the case of a command other than the request command.

In the step S708, the host control mode or local control mode is set in accordance with the parameter of the remote controller control mode. Moreover, in the step S709, "1" is set to the command direction identification bit and response command identification bit of a command ID to add a command-state mismatch error code and return a negative response command to the host terminal 4500. That is, in the local control mode, a request command supplied from the host terminal 4500 returns a negative response except the case of a control mode switching request. Step S710 shows a case of receiving a command from the host terminal 4500 in the host control mode. In this case, the step S601 in FIG. 74 is implemented.

The present invention can be applied to a system comprising a plurality of units (e.g. host computer, interface unit, reader, and printer) and an apparatus comprising one unit (e.g. copying machine or facsimile device).

Moreover, the purpose of the present invention can be also achieved by supplying a recording medium recording the program code of software for realizing the functions of the above embodiments to a system or apparatus so that the computer (or CPU or MPU) of the system or apparatus reads and executes the program code stored in the recording medium.

In this case, the program code read from the recording medium realizes the functions of the above embodiments and the recording medium storing the program code constitutes the present invention.

A recording medium for supplying a program code can use a floppy disk, hard disk, optical disk, photomagnetic disk, CD-ROM, CD-R, magnetic tape, nonvolatile memory card, or ROM.

Moreover, by executing a program code read by a computer, the functions of the above embodiments are realized and moreover, a case is included in which an OS (Operating System) working on a computer performs a part or the whole of actual processing in accordance with the designation of the program code and thereby, the functions of the embodiments are realized.

Furthermore, a case is included in which a program code read from a recording medium is written in a memory provided for a function extension board set in a computer or function extension unit connected to a computer and thereafter, a CPU provided for the function extension board or function extension unit performs a part or the whole of actual processing and thereby, the functions of the above embodiments are realized.

As described above, the present invention makes it possible to construct a video-signal input apparatus corresponding to the purpose of a user by separating a camera section, image processing section, and pan tilting section from each other, connecting them by a removable cable, transferring data between them, and controlling a picked-up image.

The present invention is not limited to the above embodiments and various changes and modifications can be made within the spirit and scope of the present invention. Therefore, to apprise the public of the scope of the present invention, the following claims are made.

What is claimed is:

1. A video input apparatus having a camera section with a plurality of cameras and a video processing section separated from the camera section, and for transmitting a video signal to a host terminal and displaying an image on the host terminal, comprising:

an obtaining unit of the video processing section, adapted to input a video clock generated by a timing generator of the camera section and measure an interval between pulses generated in accordance with the frequency of the video clock; and a control unit adapted to discriminate between said plurality of cameras to select a mode out of first and second modes for an operation of the video processing section based on the interval measured by said obtaining unit and to control the video processing section to cause the host terminal to display an image in accordance with the video signal from the video processing section on the basis of the mode set for the operation of the video processing section.

2. The video input apparatus according to claim 1, wherein said control unit controls a frequency of a horizontal synchronizing signal supplied to the camera section, on the basis of the video clock.

3. The video input apparatus according to claim 1, wherein said control unit controls a frequency of a vertical synchronizing signal supplied to the camera section, on the basis of the video clock.

4. A video processing section of a video input apparatus, the video input apparatus has a camera section with a plurality of cameras that is separated from the video processing section, and transmits a video signal to a host terminal and displays an image on the host terminal, the video processing section comprising:

an obtaining unit adapted to input a video clock generated by a timing generator of the camera section and measure an interval between pulses generated in accordance with the frequency of the video clock; and a control unit adapted to discriminate between said plurality of cameras and select a mode of a first mode for an operation of the video processing section and a second mode for an operation of the video processing section based on a first interval measured by said obtaining unit, and to control the video processing section to cause the host terminal to display an image display window, on the basis of the mode set for the operation of the video processing section.

5. The video processing section according to claim 4, wherein said control unit controls a frequency of a horizontal synchronizing signal supplied to the camera section, on the basis of the video clock.

6. The video processing section according to claim 4, wherein said control unit controls a frequency of a vertical synchronizing signal supplied to the camera section, on the basis of the video clock.

7. The video processing section according to claim 4, wherein a case where the interval is within a first time period, said control unit selects the first made, and in a case where the interval is within a second time period different from the first time period, said control unit selects the second mode.

8. The video processing section according to claim 4, wherein in a case where the interval is not within a predetermined time period, said control unit notifies users of that no camera section is connected.

9. The video processing section according to claim 4, wherein in a case where the interval is not within a predetermined time period, said control unit controls the video processing section to cause the host terminal not to display the image display window.

10. The video processing section according to claim 4, wherein said video processing section generates the pulses by counting the video clock as a horizontal synchronizing signals.

* * * * *